US009936198B2

(12) United States Patent
Nishitani et al.

(10) Patent No.: US 9,936,198 B2
(45) Date of Patent: *Apr. 3, 2018

(54) MOVING PICTURE CODING DEVICE, MOVING PICTURE CODING METHOD, AND MOVING PICTURE CODING PROGRAM, AND MOVING PICTURE DECODING DEVICE, MOVING PICTURE DECODING METHOD, AND MOVING PICTURE DECODING PROGRAM

(71) Applicant: JVC KENWOOD Corporation, Yokohama-shi (JP)

(72) Inventors: Masayoshi Nishitani, Yokosuka (JP); Hiroya Nakamura, Yokosuka (JP); Shigeru Fukushima, Yokosuka (JP); Motoharu Ueda, Yokosuka (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/498,150

(22) Filed: Apr. 26, 2017

(65) Prior Publication Data

US 2017/0230663 A1  Aug. 10, 2017

Related U.S. Application Data

(63) Continuation of application No. 14/296,032, filed on Jun. 4, 2014, now Pat. No. 9,667,986, which is a
(Continued)

(30) Foreign Application Priority Data

Dec. 21, 2011 (JP) .................................. 2011-280220
Dec. 21, 2011 (JP) .................................. 2011-280221
(Continued)

(51) Int. Cl.
H04N 7/12        (2006.01)
H04N 19/124   (2014.01)
H04N 19/176   (2014.01)

(52) U.S. Cl.
CPC ......... *H04N 19/124* (2014.11); *H04N 19/176* (2014.11)

(58) Field of Classification Search
None
See application file for complete search history.

(56) References Cited

U.S. PATENT DOCUMENTS 9,135,724 B2 *  9/2015 Sato .................... H04N 19/61
2009/0177952 A1  7/2009 Yokosato et al.
2013/0022108 A1 * 1/2013 Panusopone ......... H04N 19/159
                                                                              375/240.03

FOREIGN PATENT DOCUMENTS

JP        2011-091772 A       5/2011
WO        2012/124461 A1      9/2012
WO        WO2012124461 A1 *   9/2012  ............. H04N 19/61

OTHER PUBLICATIONS

Aoki et al. (Document: JCTVC-G1028, Joint Collaborative Team on Video Coding (JCT-VC) of ITU-T SG16 WP3 and ISO/IEC JTC1/SC29/WG11, 7th Meeting: Geneva, CH, Nov. 21-30, 2011) (hereinafter Aoki).*

(Continued)

*Primary Examiner* — Dakshesh Parikh
(74) *Attorney, Agent, or Firm* — Venable LLP; Michael A. Sartori; Miguel A. Lopez

(57) ABSTRACT

In a moving picture coding device that further divides a first block acquired by dividing each picture of a moving picture into a predetermined size into one or a plurality of second blocks and codes the moving picture in units of blocks, a quantization parameter calculation unit calculates a quantization parameter of the second block. A predictive quanti-
(Continued)

zation parameter deriving unit derives a predictive quantization parameter of the second block by using the quantization parameter of one or a plurality of third blocks that are neighboring to the second block. The predictive quantization parameter deriving unit derives the predictive quantization parameter of the second block by using a quantization parameter of a fourth block coded before the second block in a case where the third block neighboring to the second block is located at a position beyond a boundary of the first block.

3 Claims, 54 Drawing Sheets

Related U.S. Application Data continuation of application No. PCT/JP2012/008199, filed on Dec. 21, 2012.

(30) Foreign Application Priority Data

Dec. 21, 2012 (JP) .................................. 2012-279014
Dec. 21, 2012 (JP) .................................. 2012-279015

(56) References Cited

OTHER PUBLICATIONS

Hirofumi Aoki et al., "Non-CE4: Rate control friendly spatial QP prediction," Joint Collaborative Team on Video Coding (JCT-VC) of ITU-T SG16 WP3 and ISO/IEC JTC1/SC29/WG11 7th Meeting: Geneva, CH, Nov. 27, 2011, [JCTVC-G1028].

Hiroya Nakamura et al., "Non-CE4: Compatible QP prediction with RC and AQ," Joint Collaborative Team on Video Coding (JCT-VC) of ITU-T SG16 WP3 and ISO/IEC JTC1/SC29/WG11 8th Meeting: San Jose, CA, Feb. 7, 2012, [JCTVC-H0204].

International Search Report in PCT International Application No. PCT/JP2012/008199, dated Mar. 12, 2013.

International Preliminary Report on Patentability and Written Opinion in PCT International Application No. PCT/JP2012/008199, dated Jun. 24, 2014.

Kato et al. "Description of Core Experiment of Core Experiment 4: Quantization," Joint Collaborative Team on Video Coding (JCT-VC) of ITU-T SG16 WP3 and ISO/IEC JTC1/SC29/WG11, 7th Meeting: Geneva, CH, Nov. 21-30, 2011.

\* cited by examiner

FIG.12

| DIFFERENCE ABSOLUTE VALUE | CODE WORD |
|---|---|
| 0 | 1 |
| 1 | 010 |
| −1 | 011 |
| 2 | 00100 |
| −2 | 00101 |
| 3 | 00110 |
| −3 | 00111 |
| 4 | 0001000 |
| −4 | 0001001 |
| 5 | 0001010 |
| −5 | 0001011 |
| 6 | 0001100 |
| −6 | 000101 |
| 7 | 0001110 |
| −7 | 0001111 |
| ⋮ | ⋮ |

FIG.29

| intraPredMode  | 2  | 6  | 25 | 13 | 24 | 5  | 23 | 12 | 22 | 0  | 21 | 11 |
|----------------|----|----|----|----|----|----|----|----|----|----|----|----|
| intraPredDirec | 0  | 1  | 2  | 3  | 4  | 5  | 6  | 7  | 8  | 9  | 10 | 11 |

| intraPredMode  | 20 | 4  | 19 | 10 | 18 | 3  | 26 | 14 | 27 | 7  | 28 | 15 |
|----------------|----|----|----|----|----|----|----|----|----|----|----|----|
| intraPredDirec | 12 | 13 | 14 | 15 | 16 | 17 | 18 | 19 | 20 | 21 | 22 | 23 |

| intraPredMode  | 29 | 1  | 30 | 16 | 31 | 8  | 32 | 17 | 33 | 9  |
|----------------|----|----|----|----|----|----|----|----|----|----|
| intraPredDirec | 24 | 25 | 26 | 27 | 28 | 29 | 30 | 31 | 32 | 33 |

MOVING PICTURE CODING DEVICE, MOVING PICTURE CODING METHOD, AND MOVING PICTURE CODING PROGRAM, AND MOVING PICTURE DECODING DEVICE, MOVING PICTURE DECODING METHOD, AND MOVING PICTURE DECODING PROGRAM

CROSS-REFERENCE TO RELATED APPLICATIONS

This application is a Continuation of U.S. patent application Ser. No. 14/296,032, filed Jun. 4, 2014, which is a Continuation of International Application No. PCT/JP2012/008199, filed Dec. 21, 2012, which claims the benefit of Japanese Patent Application Nos. 2011-280220 and 2011-280221, filed Dec. 21, 2011, and 2012-279014 and 2012-279015, filed Dec. 21, 2012.

BACKGROUND

The present invention relates to moving picture coding and decoding technologies, and more particularly, to moving picture coding and decoding technologies using predictive coding of quantization parameters.

In digital moving picture coding according to MPEG-2 Part 2 (hereinafter, referred to as MPEG-2), MPEG-4 Part 10/H.264 (hereinafter, referred to as AVC), or the like, a picture is divided into blocks of a predetermined size and is coded, and a quantization parameter that represents the roughness of the quantization with respect to a predictive error signal (or simply referred to as a picture signal) is transmitted. On the coding side, by performing variation control of the quantization parameter in units of predetermined blocks, the amount of coding can be controlled, and the subject picture quality can be improved.

As control of the quantization parameter for improving the subjective picture quality, adaptive quantization is frequently used. In the adaptive quantization, the quantization parameter is changed in accordance with the activity of each block such that fine quantization is performed for a flat portion in which deterioration is more easily noticeable visually, and rough quantization is performed for a complex pattern portion in which deterioration is not easily noticeable visually. In other words, the quantization parameter is changed such that a large quantization scale is set in a macro block having a high activity level in which the amount of assigned bits after coding may be easily increased. As a result, the subjective picture quality is improved while the number of bits of coded picture data is controlled to be as small as possible.

According to the MPEG-2, it is determined whether or not the quantization parameter of a previous block in the sequence of coding/decoding and the quantization parameter of a coding target block are the same. In a case where the quantization parameters are not the same, the quantization parameters are transmitted. Meanwhile, according to the AVC, differential coding of the quantization parameter of a coding target block is performed by using as a prediction value the quantization parameter of the previous block in the sequence of coding/decoding. The reason for this is that, generally, since the coding amount control is performed in the coding sequence, the quantization parameter of the previous block in the coding sequence tends to be closest to the quantization parameter of the coding block, and this is for suppressing the information amount of the quantization parameter to be transmitted.

Japanese Patent Application Laid-Open No. 2011-91772

In a conventional control process of the quantization parameter, a difference between the quantization parameter of a coding target block and the quantization parameter of a coded block, which is disposed on the left side thereof, serving as a predictive quantization parameter is calculated, and the calculated differential quantization parameter is coded, whereby the coding amount of the quantization parameter is decreased. However, depending on the content within the screen, for example, as illustrated in FIG. 8, in a case where the characteristic of a picture disposed inside the coding target block and the characteristic of a picture disposed inside a left block, which has been coded, are different from each other, a difference between the quantization parameters that are calculated by the adaptive quantization process is large, and accordingly, even when a prediction of a quantization parameter in relation with the left block is uniquely made, the differential quantization parameter is large, whereby there is a problem that the coding amount increases.

In addition, since the quantization parameter calculated in the coding amount control process is acquired in the raster scanning order from the upper left side to the lower right side of a normal screen, when the block size of the coding target is small, the processing sequence between slices is separated away. Accordingly, in a case where the quantization parameter of a coded block that is neighboring to the upper side of the coding target block is used for a prediction of the coding target block, although the upper block is neighboring to the coding target block, the processing sequence in the coding amount control process is separate from each other, and accordingly, there is no probability that the quantization parameter calculated in the coding amount control process necessarily has the same value or a close value between the coding target block and the coded block neighboring to the upper side. Therefore, there is a problem in that the coding amount of the differential quantization parameter cannot be determined to be reduced.

SUMMARY

The present invention is contrived in consideration of such a situation, and an object thereof is to provide a technology for improving the coding efficiency by reducing the coding amount of the quantization parameter.

In order to solve the problem described above, a moving picture coding device according to an aspect of the present invention is a moving picture coding device that further divides a first block acquired by dividing each picture of a moving picture into a predetermined size into one or a plurality of second blocks and codes the moving picture in units of blocks, the moving picture coding device including:

a quantization parameter calculation unit (110) configured to calculate a quantization parameter of the second block;

a predictive quantization parameter deriving unit (114) configured to derive a predictive quantization parameter of the second block by using the quantization parameter of one or a plurality of third blocks that are neighboring to the second block;

a differential quantization parameter generation unit (111) configured to generate a differential quantization parameter of the second block based on a difference between the quantization parameter and the predictive quantization parameter of the second block; and a coding unit configured to code the differential quantization parameter of the second block. The predictive quantization parameter deriving unit (114) derives the predictive quantization parameter of the second block by using a quantization parameter of a fourth block coded before the second block in a case where the third block neighboring to the second block is located at a position beyond a boundary of the first block.

According to another aspect of the present invention, there is also provided a moving picture coding device. This device is a moving picture coding device that codes a moving picture by using a motion-compensated prediction in units of coding blocks that are acquired by further dividing a block acquired by dividing each picture of the moving picture into a predetermined size into one or a plurality of coding blocks. The moving picture coding device includes: a quantization parameter calculation unit (110) configured to calculate a quantization parameter of the coding block; a predictive quantization parameter deriving unit (114) configured to derive a predictive quantization parameter of the coding block by using the quantization parameter of a coded neighboring block neighboring to the coding block in accordance with a prediction mode of the motion-compensated prediction of the coding block; a differential quantization parameter generation unit (111) configured to generate a differential quantization parameter of the coding block based on a difference between the quantization parameter and the predictive quantization parameter of the coding block; and a coding unit configured to code the differential quantization parameter of the coding block. The predictive quantization parameter deriving unit (114), in a case where a neighboring block neighboring to the coding block in a predetermined direction is located at a position beyond a boundary of the block of the predetermined size, derives the predictive quantization parameter of the coding block by using the quantization parameter of another coded block other than the neighboring block neighboring in the predetermined direction.

According to a further another aspect of the present invention, there is provided a moving picture coding method. This method is a moving picture coding method for further dividing a first block acquired by dividing each picture of a moving picture into a predetermined size into one or a plurality of second blocks and coding the moving picture in units of blocks. The moving picture coding method includes: calculating a quantization parameter of the second block; deriving a predictive quantization parameter of the second block by using the quantization parameter of one or a plurality of third blocks that are neighboring to the second block; generating a differential quantization parameter of the second block based on a difference between the quantization parameter and the predictive quantization parameter of the second block; and coding the differential quantization parameter of the second block. In the deriving of a predictive quantization parameter, the predictive quantization parameter of the second block is derived by using a quantization parameter of a fourth block coded before the second block in a case where the third block neighboring to the second block is located at a position beyond a boundary of the first block.

A moving picture decoding device according to an aspect of the present invention is a moving picture decoding device that further divides a first block acquired by dividing each picture of a moving picture into a predetermined size into one or a plurality of second blocks and decodes a bitstream in which the moving picture is coded, the moving picture decoding device including:

a decoding unit configured to extract a differential quantization parameter of the second block by decoding the bitstream;

a predictive quantization parameter deriving unit (205) configured to derive a predictive quantization parameter of the second block by using the quantization parameter of one or a plurality of third blocks neighboring to the second block; and a quantization parameter generation unit (203) configured to generate a quantization parameter of the second block by adding the differential quantization parameter and the predictive quantization parameter of the second block. The predictive quantization parameter deriving unit (205) derives the predictive quantization parameter of the second block by using a quantization parameter of a fourth block decoded before the second block in a case where the third block neighboring to the second block is located at a position beyond a boundary of the first block.

According to another aspect of the present invention, there is also provided a moving picture decoding device. This device is a moving picture decoding device that further divides a block acquired by dividing each picture of a moving picture into a predetermined size into one or a plurality of coding blocks and decodes a bitstream in which the moving picture is coded in units of the coding blocks. The moving picture decoding device includes: a decoding unit configured to extract a differential quantization parameter of a decoding block by decoding the bitstream in units of decoding blocks; a predictive quantization parameter deriving unit (205) configured to derive a predictive quantization parameter of the decoding block by using the quantization parameter of a decoded neighboring block neighboring to the decoding block in accordance with the prediction mode of the motion-compensated prediction of the decoding block; and a quantization parameter generation unit (203) configured to generate a quantization parameter of decoding block by adding the differential quantization parameter and the predictive quantization parameter of the decoding block. The predictive quantization parameter deriving unit (205) derives the predictive quantization parameter of the decoding block by using a quantization parameter of another decoded block other than a neighboring block neighboring in a predetermined direction in a case where the neighboring block neighboring to the decoding block in the predetermined direction is located at a position beyond a boundary of the block of the predetermined size.

According to a further another aspect of the present invention, there is provided a moving picture decoding method. This method is a moving picture decoding method for further dividing a first block acquired by dividing each picture of a moving picture into a predetermined size into one or a plurality of second blocks and decoding a bitstream in which the moving picture is coded. The moving picture decoding method includes: extracting a differential quantization parameter of the second block by decoding the bitstream; deriving a predictive quantization parameter of the second block by using the quantization parameter of one or a plurality of third blocks neighboring to the second block; and generating a quantization parameter of the second block by adding the differential quantization parameter and the predictive quantization parameter of the second block. In the deriving of a predictive quantization parameter, the predictive quantization parameter of the second block is derived by using a quantization parameter of a fourth block decoded before the second block in a case where the third block neighboring to the second block is located at a position beyond a boundary of the first block.

Furthermore, an arbitrary combination of the constituent elements described above and a conversion of the representation of the present invention among a method, a device, a recording medium, a computer program, and the like are valid as aspects of the present invention.

BRIEF DESCRIPTION OF THE DRAWINGS

FIG. 12 is a diagram that illustrates an example of a signed exponential Golomb coding table of a differential quantization parameter;

FIG. 29 is a diagram that illustrates a table converting an intra prediction mode into an intra prediction direction;

DETAILED DESCRIPTION

The invention will now be described by reference to the preferred embodiments. This does not intend to limit the scope of the present invention, but to exemplify the invention.

An embodiment of the present invention provides a coding amount control technology for deriving an optimal predictive quantization parameter from coding information of a coded block disposed on the periphery, calculating a difference from the predictive quantization parameter, and coding the difference for reducing the coding amount of the quantization parameter of a processing target block in moving picture coding in which a picture is divided into rectangular blocks of a predetermined size, the block is further divided into one or a plurality of coding blocks, and quantization and coding are performed in units of the coding blocks.

Figure 1:
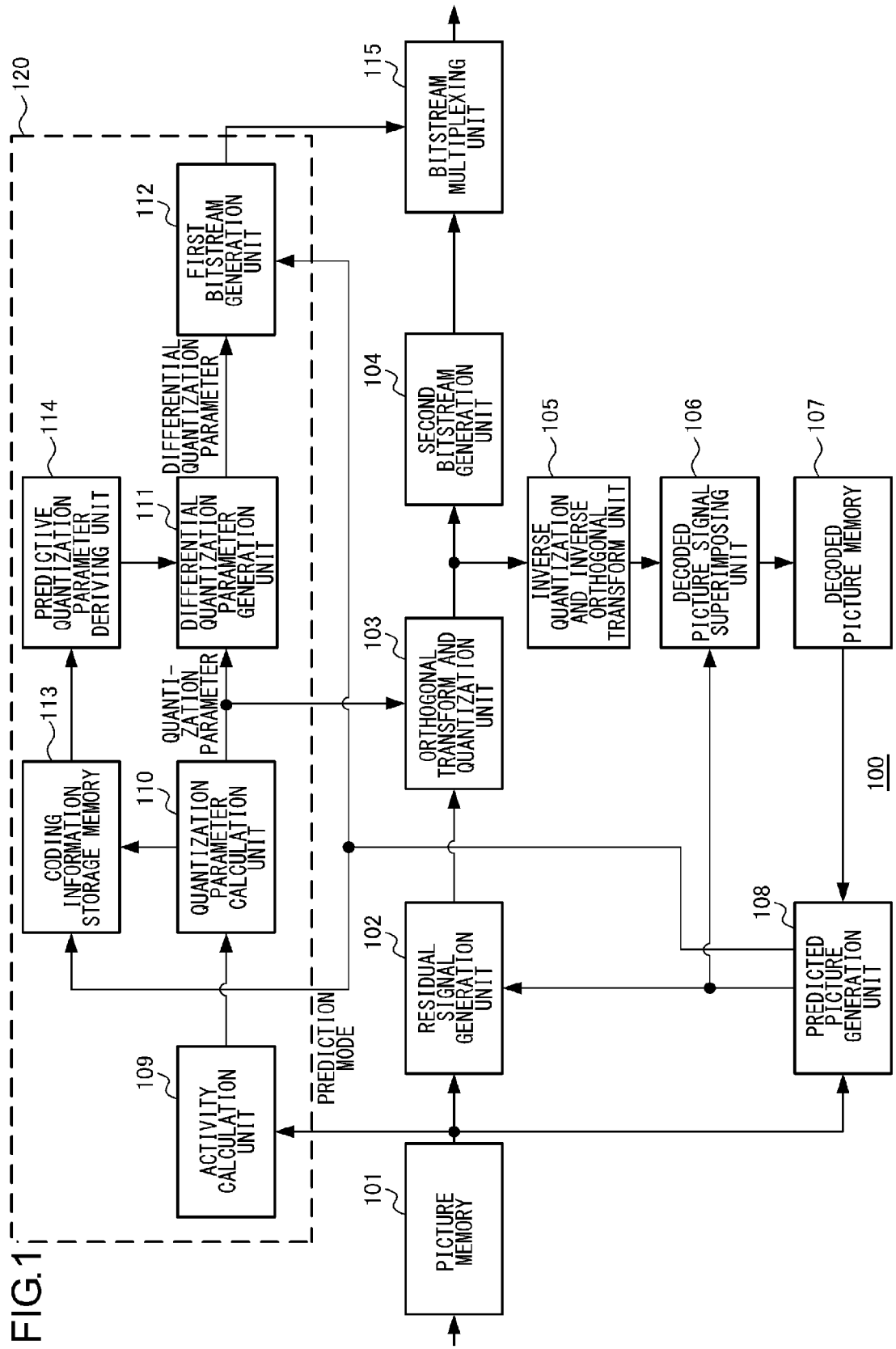
FIG. 1 is a block diagram that illustrates the configuration of a moving picture coding device using a predictive quantization parameter deriving method according to an embodiment.

A preferred moving picture coding device 100 and a preferred moving picture decoding device 200 according to the present invention will now be described. FIG. 1 is a block diagram that illustrates the configuration of the moving picture coding device 100 according to the present invention. The moving picture coding device 100 is configured by: a picture memory 101; a residual signal generation unit 102; an orthogonal transform and quantization unit 103; a second bitstream generation unit 104; an inverse quantization and inverse orthogonal transform unit 105; a decoded picture signal superimposing unit 106; a decoded picture memory 107; a predicted picture generation unit 108; an activity calculation unit 109; a quantization parameter calculation unit 110; a differential quantization parameter generation unit 111; a first bitstream generation unit 112; a coding information storage memory 113; a predictive quantization parameter deriving unit 114; and a bitstream multiplexing unit 115. Here, each thick solid-line arrow that joins bocks represents a picture signal of a picture, and each thin solid-line arrow represents the flow of a parameter signal used for controlling coding.

The picture memory 101 temporarily stores picture signals of coding targets that are supplied in order of capture/display time. The picture memory 101 supplies the stored picture signals of the coding targets in units of predetermined pixel blocks to the residual signal generation unit 102, the predicted picture generation unit 108, and the activity calculation unit 109. At that time, the pictures stored in order of the capture/display time are rearranged in order of coding and are output from the picture memory 101 in units of pixel blocks.

The residual signal generation unit 102 performs subtraction between a picture signal to be coded and a prediction signal generated by the predicted picture generation unit 108 to generate a residual signal and supplies the residual signal to the orthogonal transform and quantization unit 103.

The orthogonal transform and quantization unit 103 generates an orthogonally-transformed and quantized residual signal by performing orthogonal transform and quantization of the residual signal and supplies the generated orthogonally-transformed and quantized residual signal to the second bitstream generation unit 104 and the inverse quantization and inverse orthogonal transform unit 105.

The second bitstream generation unit 104 generates a second bitstream by performing entropy coding of the orthogonally-transformed and quantized residual signal in accordance with a regulated syntax rule and supplies the generated second bitstream to the bitstream multiplexing unit 115.

The inverse quantization and inverse orthogonal transform unit 105 calculates a residual signal by performing inverse quantization and an inverse orthogonal transform of the orthogonally-transformed and quantized residual signal supplied form the orthogonal transform and quantization unit 103 and supplies the calculated residual signal to the decoded picture signal superimposing unit 106.

The decoded picture signal superimposing unit 106 generates a decoded picture by superimposing a predictive picture signal generated by the predicted picture generation unit 108 and a residual signal that is inversely quantized and inversely orthogonally-transformed by the inverse quantization and inverse orthogonal transform unit 105 each other and stores the generated decoded picture in the decoded picture memory 107. In addition, there is also a case where a filtering process decreasing a distortion such as a block distortion according to coding is performed for the decoded picture, and the processed decoded picture is stored in the decoded picture memory 107. In such a case, as is necessary, predicted coding information such as a flag used for identifying information of a post filter such as a deblocking filter is stored in the coding information storage memory 113.

The predicted picture generation unit 108 makes an in-frame prediction (intra prediction) or an inter-frame prediction (inter prediction) based on a prediction mode in accordance with a picture signal supplied from the picture memory 101 and a decoded picture signal supplied from the decoded picture memory 107, thereby generating a predictive picture signal. In the intra prediction, a predictive picture signal is generated by using pixel signals of a coding target block out of blocks, which are acquired by dividing a picture signal supplied from the picture memory 101 in units of predetermined blocks, and a coded neighboring block located close to the coding target block that is present within the same frame as that of the coding target block supplied from the decoded picture memory 107. In the inter prediction, a coded frame that is stored in the decoded picture memory 107 that is separated from a frame (coding frame) of the coding target block acquired by dividing a picture signal supplied from the picture memory 101 in units of predetermined blocks by several frames before or after is set as the reference frame, and the amount of movement called a motion vector is acquired by performing block matching between the coding block and the reference frame, and a predictive picture signal is generated by performing motion compensation from the reference frame based on the amount of motion. Then, the predictive picture signal generated in such a way is supplied to the residual signal generation unit 102. The coding information of a motion vector or the like acquired by the predicted picture generation unit 108 is stored in the coding information storage memory 113 as is necessary. In addition, in the predicted picture generation unit 108, in a case where a plurality of prediction modes can be selected, by evaluating the amount of distortion between the generated predictive picture signal and the original picture signal or the like, an optimal prediction mode is determined, a predictive picture signal that is generated by a prediction according to the determined prediction mode is selected, the selected predictive picture signal is supplied to the residual signal generation unit 102, and, in a case where the prediction mode is the intra prediction, the intra prediction mode is supplied to the coding information storage memory 113 and the first bitstream generation unit. The intra prediction mode will be described in detail later.

The activity calculation unit 109 calculates an activity that is a coefficient representing the complexity or the smoothness of the picture of the coding target bock that is supplied from the picture memory 101 and supplies the calculated activity to the quantization parameter calculation unit 110. The detailed configuration and the operation of the activity calculation unit 109 will be described in an example to be described later.

The quantization parameter calculation unit 110 calculates a quantization parameter of the coding target block based on the activity calculated by the activity calculation unit 109 and supplies the calculated quantization parameter to the differential quantization parameter generation unit 111 and the coding information storage memory 113. The detailed configuration and the operation of the quantization parameter calculation unit 110 will be described in an example to be described later.

The differential quantization parameter generation unit 111 calculates a differential quantization parameter by performing subtraction between the quantization parameter calculated by the quantization parameter calculation unit 110 and the predictive quantization parameter derived by the predictive quantization parameter deriving unit 114 and supplies the calculated differential quantization parameter to the first bitstream generation unit 112.

The first bitstream generation unit 112 generates a first bitstream by coding the differential quantization parameter calculated by the differential quantization parameter generation unit 111 in accordance with a regulated syntax rule and supplies the generated first bitstream to the bitstream multiplexing unit 115.

The coding information storage memory 113 stores the quantization parameter of a coded block. While a connection line is not illustrated in FIG. 1, coding information such as a prediction mode and a motion vector generated by the predicted picture generation unit 108 is also stored as information that is necessary for coding the next coding target block. In addition, coding information generated in units of pictures or slices is also stored as is necessary.

The predictive quantization parameter deriving unit 114 derives a predictive quantization parameter using the quantization parameter and the coding information of a coded block that is located close to the periphery of the coding target block and supplies the derived predictive quantization parameter to the differential quantization parameter generation unit 111. The detailed configuration and the operation of the predictive quantization parameter deriving unit 114 will be described in an example to be described later.

The bitstream multiplexing unit 115 multiplexes the first bitstream and the second bitstream in accordance with a regulated syntax rule and outputs the multiplexed bitstream.

Figure 2:
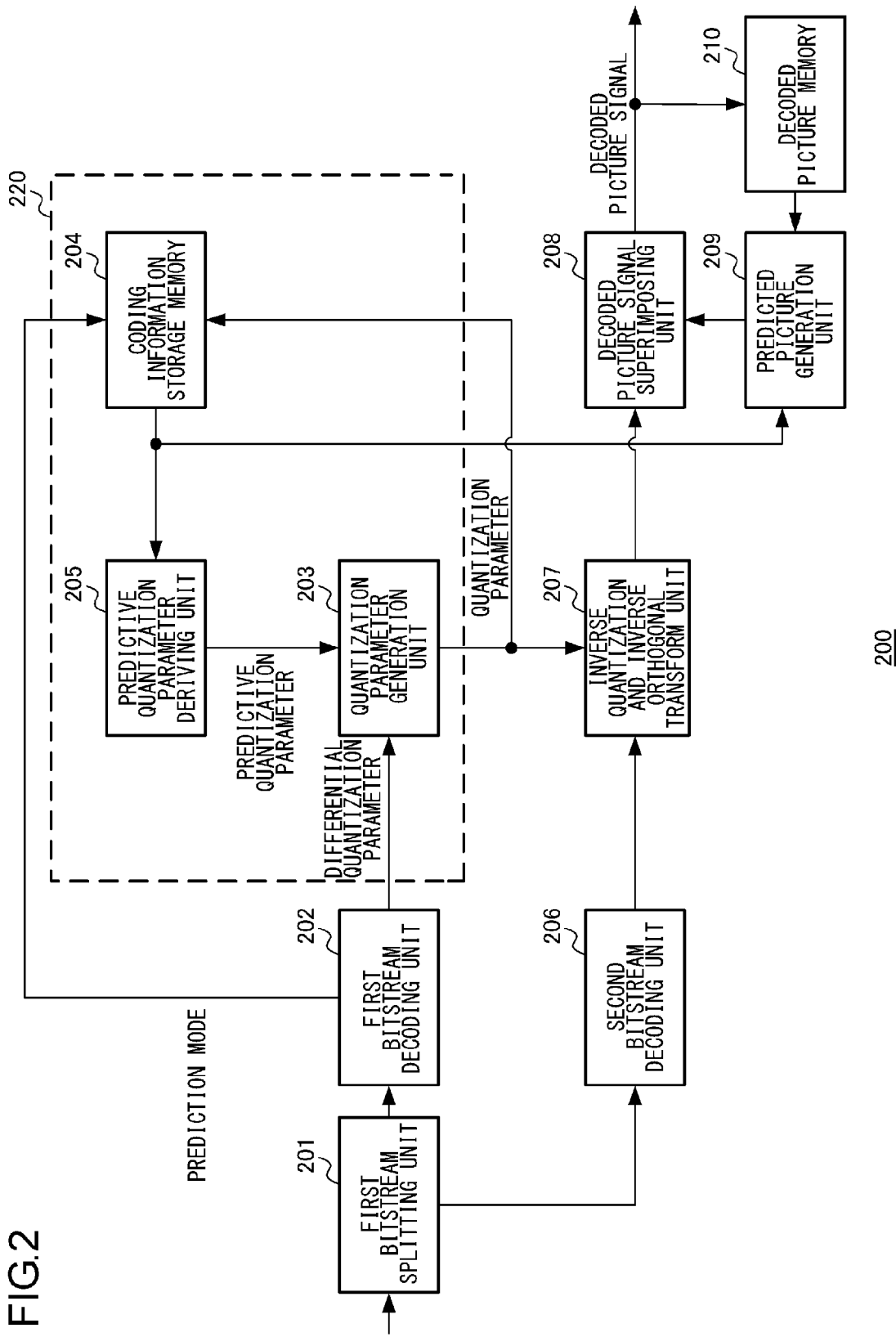
FIG. 2 is a block diagram that illustrates the configuration of a moving picture decoding device using a predictive quantization parameter deriving method according to an embodiment.

FIG. 2 is a block diagram that illustrates the configuration of a moving picture decoding device 200 according to an embodiment corresponding to the moving picture coding device 100 illustrated in FIG. 1. The moving picture decoding device 200 according to the embodiment includes: a bitstream separation unit 201; a first bitstream decoding unit 202; a quantization parameter generation unit 203; a coding information storage memory 204; a predictive quantization parameter deriving unit 205; a second bitstream decoding unit 206; an inverse quantization and inverse orthogonal transform unit 207; a decoded picture signal superimposing unit 208; a predicted picture generation unit 209; and a decoded picture memory 210. Similarly to the moving picture coding device 100 illustrated in FIG. 1, each thick solid-line arrow that joins bocks represents a picture signal of a picture, and each thin solid-line arrow represents the flow of a parameter signal used for controlling coding.

Since the decoding process of the moving picture decoding device 200 illustrated in FIG. 2 corresponds to the coding process provided inside the moving picture coding device 100 illustrated in FIG. 1, the configurations of the inverse quantization and inverse orthogonal transform unit 207, the decoded picture signal superimposing unit 208, the predicted picture generation unit 209, the decoded picture memory 210, and the coding information storage memory 204 illustrated in FIG. 2 have functions that respectively correspond to the configurations of the inverse quantization and inverse orthogonal transform unit 105, the decoded picture signal superimposing unit 106, the predicted picture generation unit 108, decoded picture memory 107, and the coding information storage memory 113 of the moving picture coding device 100 illustrated in FIG. 1.

The bitstream supplied to the bitstream separation unit 201 is separated in accordance with a regulated syntax rule, and separated bitstreams are supplied to the first bitstream decoding unit 202 and the second bitstream decoding unit 206.

The first bitstream decoding unit 202 decodes the supplied bitstream, outputs coding information relating to a prediction mode, a motion vector, a differential quantization parameter, and the like, supplies the differential quantization parameter to the quantization parameter generation unit 203, and stores the coding information in the coding information storage memory 204.

The quantization parameter generation unit 203 calculates a quantization parameter by adding the differential quantization parameter supplied from the first bitstream decoding unit 202 and the quantization parameter derived by the predictive quantization parameter deriving unit 205 together and supplies the calculated quantization parameter to the inverse quantization and inverse orthogonal transform unit 207 and the coding information storage memory 204.

The coding information storage memory 113 stores the quantization parameter of a block that has decoded. In addition, not only the coding information in units of blocks decoded by the first bitstream decoding unit 202 but also coding information generated in units of pictures or slices is also stored as is necessary. While a connection line is not illustrated in FIG. 2, the coding information such as a prediction mode, a motion vector, and the like that have been decoded to the predicted picture generation unit 209.

The predictive quantization parameter deriving unit 205 derives a predictive quantization parameter by using the quantization parameter and the coding information of a decoded block that is located close to the periphery of the decoding target block and supplies the predictive quantization parameter to the quantization parameter generation unit 203. The predictive quantization parameter deriving unit 205 has a function that is equivalent to the function of the predictive quantization parameter deriving unit 114 of the moving picture coding device 100, and the detailed configuration and the operation thereof will be described in an example to be described later.

The second bitstream decoding unit 206 calculates an orthogonally transformed and quantized residual signal by decoding the supplied bitstream and supplies the orthogonally transformed and quantized residual signal to the inverse quantization and inverse orthogonal transform unit 207.

The inverse quantization and inverse orthogonal transform unit 207 performs an inverse orthogonal transform and inverse quantization of the orthogonally transformed and quantized residual signal decoded by the second bitstream decoding unit 206 by using the quantization parameter generated by the quantization parameter generation unit 203, thereby acquiring an inversely orthogonally-transformed and inversely quantized residual signal.

The decoded picture signal superimposing unit 208 generates a decoded picture signal by superimposing the predictive picture signal that is generated by the predicted picture generation unit 209 and the residual signal that is inversely orthogonally-transformed and inversely quantized by the inverse quantization and inverse orthogonal transform unit 207 each other, outputs the generated decoded picture signal, and stores the generated decoded picture signal in the decoded picture memory 210. When the generated decoded picture signal is stored in the decoded picture memory 210, there is also a case where a filtering process reducing a block distortion or the like according to coding is performed for the decoded picture, and the processed decoded picture is stored in the decoded picture memory 210.

The predicted picture generation unit 209 generates a predictive picture signal using the decoded picture signal supplied from the decoded picture memory 210 based on the coding information of a prediction mode, a motion vector, and the like decoded by the second bitstream decoding unit 206 and the coding information stored in the coding information storage memory 204 and supplies the generated predictive picture signal to the decoded picture signal superimposing unit 208.

Next, a method of deriving a predictive quantization parameter that is used to be common to several units 120 of the moving picture coding device 100 that are surrounded by a thick dotted line, particularly, the predictive quantization parameter deriving unit 114 and several units 220 of the moving picture decoding device 200 that are surrounded by a thick dotted line, particularly, the predictive quantization parameter deriving unit 205 will be described in detail.

First, the operation of each of the units 120 of the moving picture coding device 100 according to this embodiment that are surrounded by the thick dotted line will be described. In the units 120, a pixel block formed in units of a predetermined pixel size, which is supplied from the picture memory 101, is set as a coding block, and a quantization parameter used for quantizing the block is determined. The quantization parameter is determined mainly based on algorithms of coding amount control and adaptive quantization. First, a technique for the adaptive quantization that is used in the activity calculation unit 109 will be described.

Generally, since the visual characteristics of humans are sensitive to a low frequency component in which the number of edges is small, the activity calculation unit 109 calculates an activity representing the complexity and the smoothness of a picture in units of predetermined blocks such that quantization is performed more finely for a flat portion in which visual deterioration can easily stand out visually, and quantization is performed more roughly for a portion having a complex pattern in which deterioration cannot easily stand out visually.

As an example of the activity, a value according to a variance value of pixels inside a coding block described in MPEG-2 Test Model 5 (TM5) may be calculated. The variance value represents the degree of dispersion from the average of pixels that configure a picture within a block. The variance value decreases in accordance with the degree of the flatness of a picture within a block (a small change in luminance) and increases in accordance with the degree of complexity of a pattern of the picture (a large change in luminance). Accordingly, the variance value is used as the activity of the block. When a pixel value within a block is represented by p(x, y), the activity "act" of the block is calculated by using the following equation.

$$act = \sum_{x,y}^{BLK} (p(x, y) - p\_mean)^2 \qquad \text{[Expression 1]}$$

Here, BLK represents the total number of pixels of a coding block, and p_mean represents an average value of pixels disposed within the block.

However, the activity is not limited to the variance as described above, but a total sum of the absolute values of differences between the value of each pixel disposed within the coding block and the values of pixels neighboring thereto in the horizontal and vertical directions within the block may be used as the activity. Even in such a case, the total sum is small in a case where the picture is flat and is large in a portion of a complex pattern in which the number of edges is large and can be used as the activity. The total sum is calculated by using the following equation.

$$act = \sum_{x,y}^{BLK} (|p(x, y) - p(x+1, y)| + |p(x, y) - p(x, y+1)|) \quad \text{[Expression 2]}$$

The activity "act" calculated in this way is supplied to the quantization parameter calculation unit 110.

Next, the coding amount control will be described. In the moving picture coding device 100 according to this embodiment, while a unit that realizes the coding amount control is not particularly provided, in order to determine a quantization parameter of a coding block based on the generated coding amount in the coding amount control, the function will be described as being included in the quantization parameter calculation unit 110.

An object of the coding amount control is to adjust the generated coding amount that is generated in a predetermined unit such as a frame to near a target coding amount. Thus, in a case where the generated coding amount of coding blocks is determined to be larger than the target coding amount, relatively rough quantization is applied to blocks to be subsequently coded. On the other hand, in a case where the generated coding amount of the coding blocks is determined to be smaller than the target coding amount, relatively fine quantization is applied to blocks to be subsequently coded.

Figure 3:
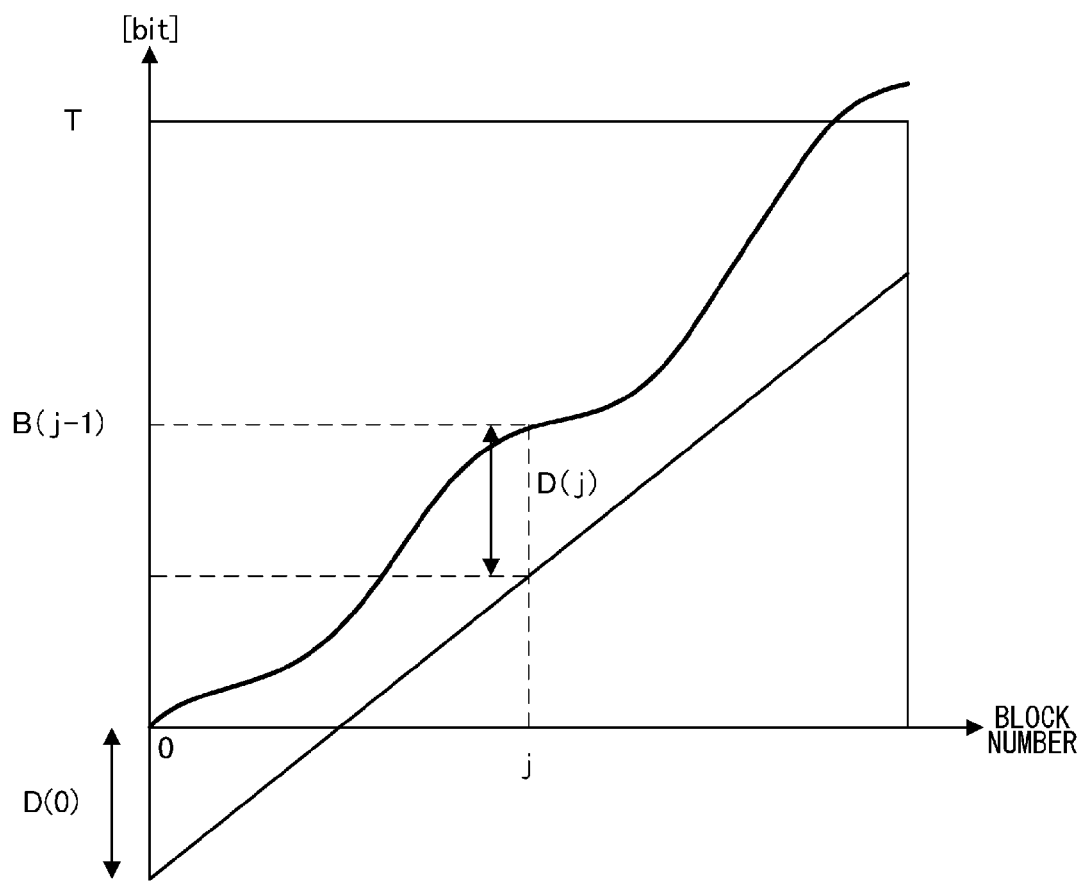
FIG. 3 is a diagram that illustrates the control of the amount of coding within a screen of MPEG-2 TM5.

The detailed algorithm of the coding amount control will be described with reference to FIG. 3.

First, a target coding amount (T) is determined for each frame. Generally, the target coding amount T is determined such that "I picture>P picture>reference B picture>non-reference B picture" is satisfied. For example, in a case where the target bit rate of a moving picture is 5 Mbps, and there are one I picture, three P pictures, 11 reference B pictures, and 15 non-reference B pictures, when the target coding amounts of picture types are denoted by Ti, Tp, Tbr, and Tb, Ti=400 kbit, Tp=300 kbit, Tbr=200 kbit, and Tb=100 kbit in a case where the target coding amounts are desired to be controlled such that the ratio Ti:Tp:Tbr:Tb=4:3:2:1. However, the coding amounts assigned to the picture types do not have an effect on the essence of the present invention.

Next, in-frame coding amount control will be described. When the number of blocks that is a unit for determining the quantization parameter is denoted by N, a generated coding amount is denoted by B, and a difference bit that is different from the target coding amount is denoted by D, the following equation is formed.

$$D(j) = D(0) + B(j-1) - \frac{T(j-1)}{N} \quad \text{[Expression 3]}$$

Here, j is a coding process sequence count number of a coding block. In addition, D(0) is an initial value of a difference from the target coding amount.

A quantization parameter bQP according to the coding amount control is determined as below.

$$bQP(j) = D(j) \times r \quad \text{[Expression 4]}$$

Here, r denotes a proportional coefficient used for converting the difference from the target coding amount into a quantization parameter. This proportional coefficient r is determined in accordance with a usable quantization parameter.

The quantization parameter calculation unit 110, by using the activity "act" calculated by the activity calculation unit 109 for each coding block, changes the quantization parameter of the coding block that is calculated in the coding amount control. Hereinafter, since the quantization parameter is calculated for each coding block, the coding process sequence count number of the quantization parameter according to the coding amount control will be removed, and the quantization parameter will be represented as bQP.

The quantization parameter calculation unit 110 calculates a quantization parameter QP that is optimal to the coding block based on the activity "act" calculated by the activity calculation unit 109.

The quantization parameter calculation unit 110 records an average activity within the frame that has been immediately previously coded as avg_act and calculates a normalized activity Nact of the coding block by using the following equation.

$$Nact = \frac{2 \times act + \text{avg\_act}}{act + 2 \times \text{avg\_act}} \quad \text{[Expression 5]}$$

Here, the coefficient "2" of the equation represented above is a value representing a dynamic range of the quantization parameter, and a normalized activity Nact that is in the range of 0.5 to 2.0 is calculated.

In addition, regarding avg_act, before the coding process, activities may be calculated in advance for all the blocks within the frame, and the average value thereof may be set as avg_act. Furthermore, avg_act may be stored in the coding information storage memory 113. In such a case, the quantization parameter calculation unit 110 may be configured to derive avg_act from the coding information storage memory 113 as is necessary.

The calculated normalized activity Nact is multiplied by the quantization parameter bQP that is the reference as in the following equation, whereby a quantization parameter QP of the coding bock is acquired.

$$QP = Nact \times bQP \quad \text{[Expression 6]}$$

Here, while bQP is set as the quantization parameter in units of blocks that is calculated in the coding amount control as described above, it may be set as a quantization parameter that represents a frame or a slice including the coding block as a fixed value. In addition, bQP may be set as an average quantization parameter of a frame that has been immediately previously coded, and, in this embodiment, the method of calculation thereof is not particularly limited.

The quantization parameter of the coding block that is calculated in such a way is supplied to the coding information storage memory 113 and the differential quantization parameter generation unit 111.

In the coding information storage memory 113, not only the quantization parameter calculated by the quantization parameter calculation unit 110 and the quantization parameter of the past coding block for which coding has been completed are stored but also coding information such as a motion vector and a prediction mode of the coding block that are to be coded is stored, and each unit derives the coding information as is necessary.

The predictive quantization parameter deriving unit 114 derives a predictive quantization parameter for efficiently coding and transmitting the quantization parameter of the coding block by using the quantization parameter of a coded neighboring block disposed on the periphery of the coding block and the other coding information that are acquired from the coding information storage memory 113.

Figure 4:
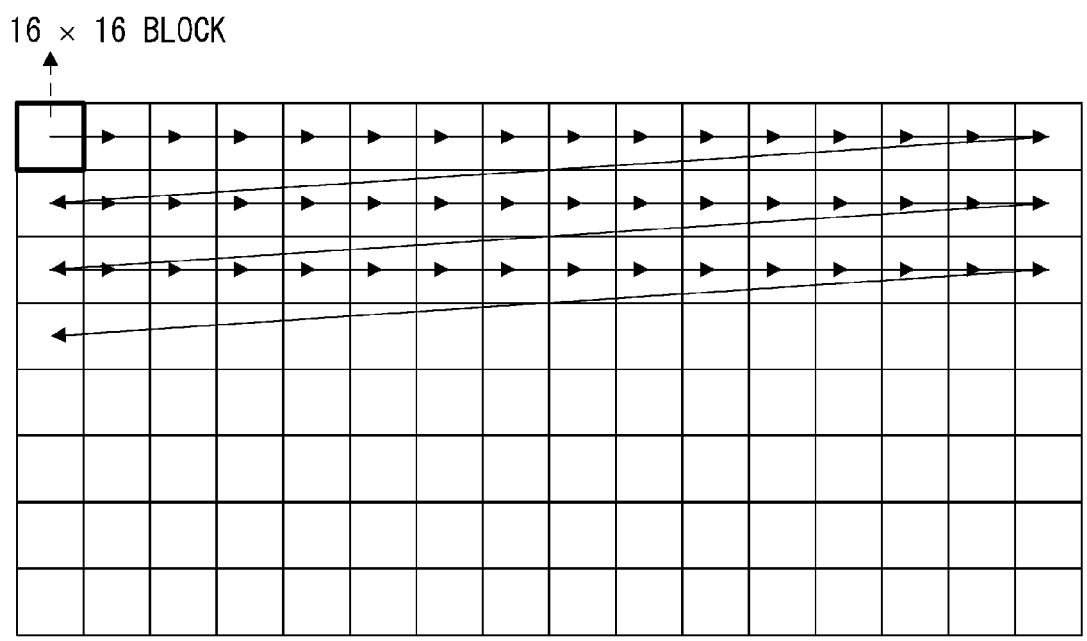
FIG. 4 is a diagram that illustrates a quantization parameter prediction method according to H.264.

From the aspect of efficiently coding and transmitting the quantization parameter, the efficiency of a case where a difference (differential quantization parameter) from the quantization parameter of a coded block is taken, and the differential quantization parameter is coded and transmitted is higher than that of a case where the quantization parameter is directly coded. From the viewpoint of the coding amount control, by setting the quantization parameter of an immediately previous coded block in the coding process sequence as the predictive quantization parameter, the value of the differential quantization parameter to be transmitted decreases, whereby the coding amount decreases. On the other hand, from the viewpoint of adaptive quantization, since a coding block and a neighboring block disposed on the periphery thereof are close to each other, the patterns thereof are frequently the same or similar to each other, and accordingly, the activity of a block close to the coding block has a value close to that of the activity of the coding block. Accordingly, by setting the quantization parameter of a neighboring block as the predictive quantization parameter, the value of the differential quantization parameter decreases, whereby the coding amount decreases. Thus, according to H.264, as illustrated in FIG. 4, a method is employed in which the unit, in which the quantization parameter is transmitted, is fixed to a macro block (16×16 pixel group), the quantization parameter of a block arranged before the coding block in the raster scanning sequence or a neighboring block close to the left side, which has been immediately previously coded, is set as the predictive quantization parameter, a difference between the quantization parameter of the coding block and the predictive quantization parameter is taken, and a differential quantization parameter is coded and transmitted. In other words, H.264 is optimized to a prediction of the quantization parameter that is made in consideration of the coding amount control. However, since hierarchical tree coding to be described later is not performed in H.264, the immediately previous block is a left block except for the case of the left end of a picture, the quantization parameter of a neighboring block is used as the predictive quantization parameter, and accordingly, H. 264 can be regarded as being approximately optimized also to a prediction that is made in consideration of the adaptive quantization. Accordingly, in the case of a configuration like H. 264 such as a configuration in which the unit, in which the quantization parameter is transmitted, is fixed, and the hierarchical tree coding is not performed, an immediately previously coded block can be regarded as being optimal for the prediction of the quantization parameter.

However, in a case where the hierarchical tree coding is performed, similarly to H. 264, by using the quantization parameter of the immediately previous block as the predictive quantization parameter, while the prediction is optimized to the coding amount control, in a case where the quantization parameter is transmitted in using the adaptive quantization, an optimal prediction value is not acquired, and there is a problem in that the coding amount of the differential quantization parameter increases.

Here, the hierarchical tree coding will be described. In the hierarchical tree coding described here, each depth representing a coding unit is determined in units of tree blocks (here, 64×64 blocks), and coding is performed in units of coding blocks using determined depths. Accordingly, the coding can be performed with each optimal depth depending on the fineness of the picture being determined, and the coding efficiency is improved to a large extent.

Figure 5:
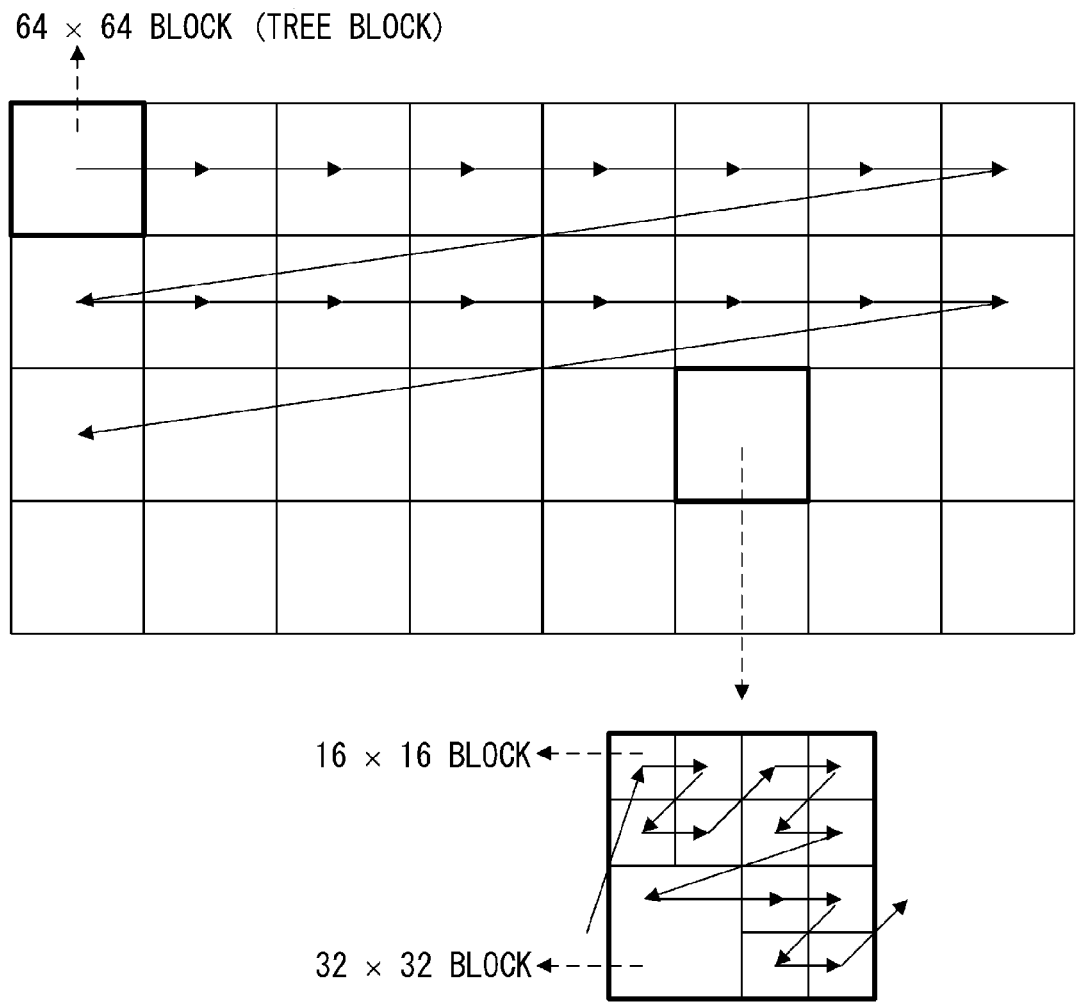
FIG. 5 is a diagram that illustrates an example of a coding process sequence in a case where hierarchical tree coding is used.

FIG. 5 illustrates a coding process sequence of a hierarchical tree coding structure. As illustrated on the upper side of FIG. 5, the inside of the screen is equally divided in units of squares having a predetermined same size. These units are called tree blocks and are basic units used for managing addresses for specifying coding/decoding blocks within a picture. In order to optimize the coding process in accordance with a texture and the like arranged inside the picture, the inside of the tree block may be hierarchically divided into four parts as is necessary so as to acquire blocks having a small size. The hierarchical block structure configured as above by dividing blocks into the small blocks is called a tree block structure, and the divided blocks are called coding blocks (CU: coding unit) and are set as basic units of the process at the time of performing coding and decoding. On the lower side of FIG. 5, an example is illustrated in which three CUs acquired by excluding a lower left CU from CUs formed by dividing a tree block into four parts are divided into four parts. In this example, the quantization parameters are assumed to be set in units of the CUs. The tree block is a coding block of a maximum size.

Figure 6:
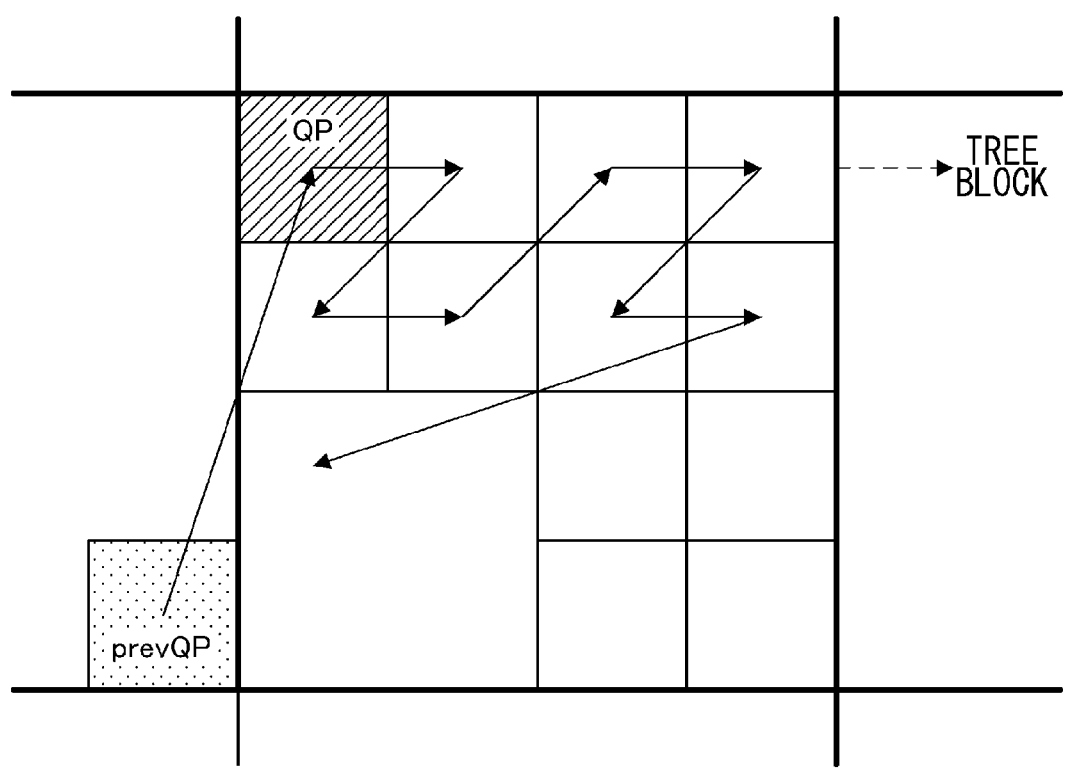
FIG. 6 is a diagram that illustrates the prediction of a quantization parameter of an upper left coding block arranged inside a tree block divided by the hierarchical tree coding.
Figure 7:
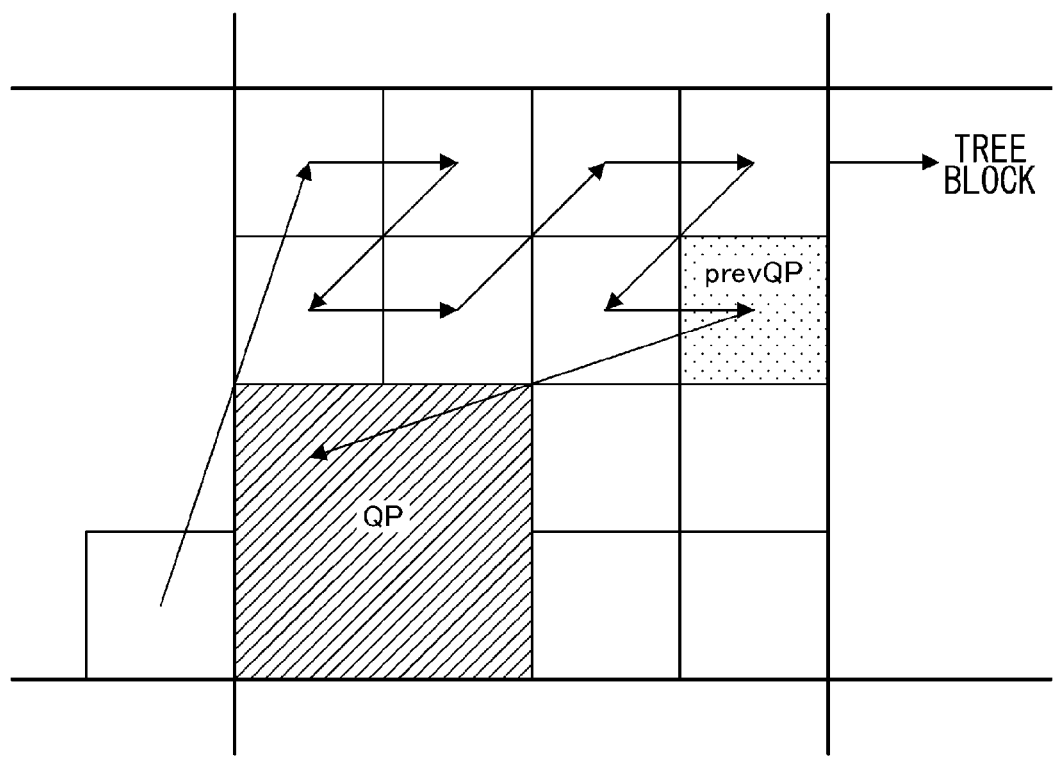
FIG. 7 is a diagram that illustrates an example of the sequence of a coding process inside a tree block divided by the hierarchical tree coding.

In such hierarchical tree coding, since the coding sequence is different from the raster scanning sequence (the left side to the right side) of H.264 illustrated in FIG. 4, there is a case where the quantization parameter of an immediately previously coded block and that of a neighboring block disposed on the left side are not the same. For example, as illustrated in FIG. 6 as an example of the hierarchical tree coding, for a prediction of an upper left coding block (a hatched rectangle illustrated in FIG. 6) disposed inside a tree block that is a coding target, the quantization parameter of a lower right coding block (a gray rectangle illustrated in FIG. 6) that has been coded last out of blocks divided inside a tree block that is neighboring to the left side is used. In addition, as illustrated in FIG. 7, for a prediction of a lower left coding block (a hatched rectangle illustrated in FIG. 7) disposed inside a tree block that is a coding target, the quantization parameter of a block (a gray rectangle illustrated in FIG. 7) that is divided in the same tree block and has been immediately previously coded is used. Accordingly, by only predicting the quantization parameter from a block that has been immediately previously coded, while a prediction that is optimized to the coding amount control is made, a distance between the blocks according to the division is long, and accordingly, a prediction that is appropriate for the adaptive quantization cannot be made, whereby the coding amount of the differential quantization parameter increases so as to decrease the coding efficiency.

Figure 8:
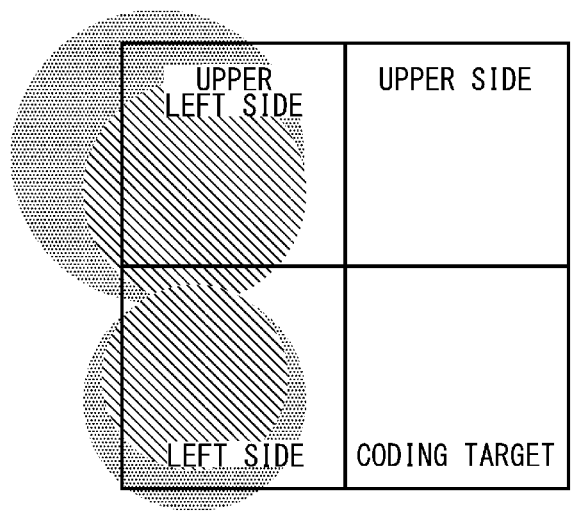
FIG. 8 is a diagram that illustrates an example in which patterns are included in a left and upper left blocks that are neighboring coded blocks close to a coding block that is a coding target.

In addition, as in H.264, in a case where the quantization parameter of a left block is uniquely set as the predictive quantization parameter, for example, in a case illustrated in FIG. 8, patterns of pictures of a coding block and a neighboring block disposed on the left side are different from each other, and accordingly, the quantization parameters are affected. Therefore, the differential quantization parameter has a large value so as to increase the amount of generated coding, and accordingly, there is concern that the coding and the transmission cannot be efficiently performed.

As a solution thereof, a method may be considered in which, instead of uniquely selecting the predictive quantization parameter from the neighboring block disposed on the left side, the quantization parameter of the upper neighboring block that has been coded is set as the predictive quantization parameter.

Figure 9:
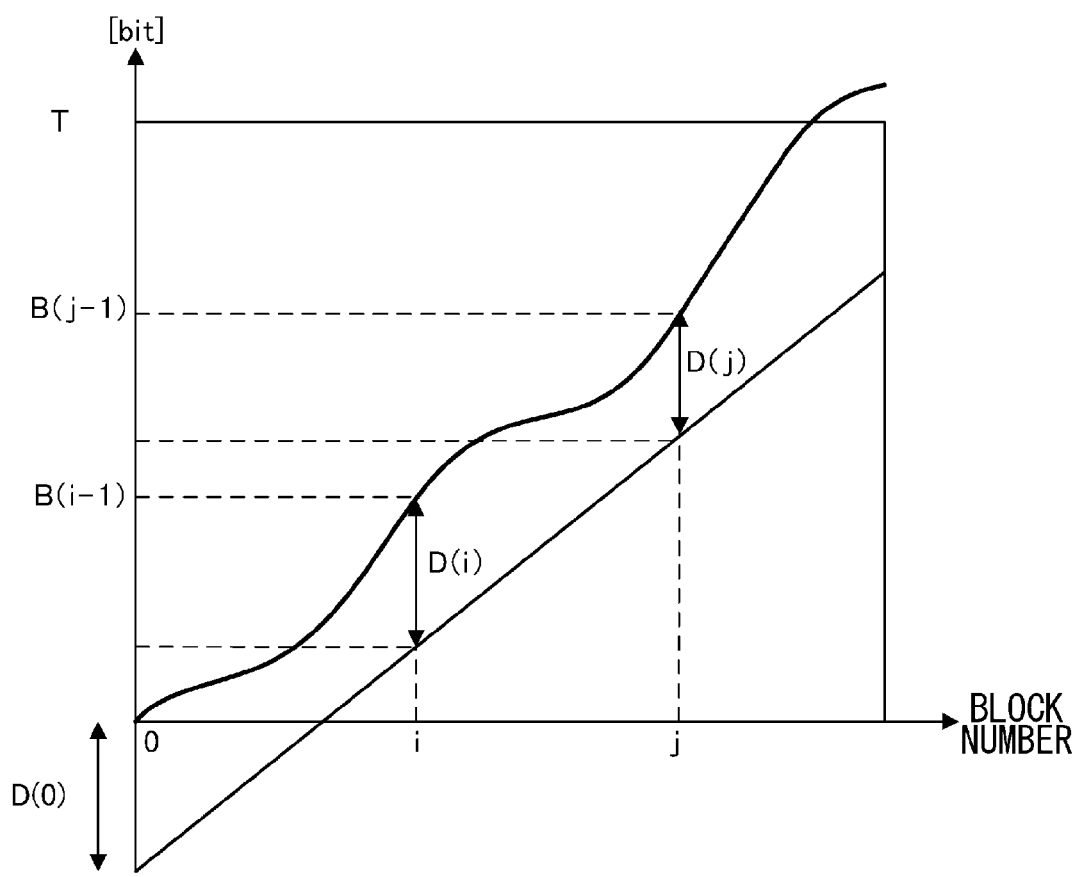
FIG. 9 is a diagram that illustrates the positions of coding blocks that are vertically adjacent to each other in the control of the amount of coding within the screen of the MPEG-2 TM5.

However, in a case where the quantization parameter is predicted from the upper neighboring block beyond the boundary of the tree block, when the calculation of the quantization parameter according to the coding amount control is considered, the quantization parameter is calculated at a quite past time point from that of the coding block. Accordingly, as illustrated in FIG. 9, with respect to the process sequence j of the coding block, the process sequence i of the upper neighboring block is i<<j in the coding process sequence even in a case where the blocks are close to each other within a picture. Therefore, from the viewpoint of the coding amount control, it cannot be necessarily determined that the quantization parameter of the coding block has high correlation with the quantization parameter of the upper neighboring block.

Furthermore, in order to increase the speed of the decoding process, in a case where parallel processing is performed for each tree block slice, the quantization parameter of the upper neighboring block beyond the boundary of the tree block cannot be used for a prediction. Accordingly, by referring to the upper neighboring block beyond the boundary of the tree block, there is concern that the coding and the transmission cannot be efficiently performed.

Therefore, the predictive quantization parameter deriving unit 114 according to the embodiment of the present invention derives an optimal predictive quantization parameter from a coded block disposed on the periphery instead of using the neighboring block of the tree block that is located close to the upper side of the coding block for a prediction of the quantization parameter, thereby improving the efficiency of the generated coding amount of the differential quantization parameter.

Figure 10:
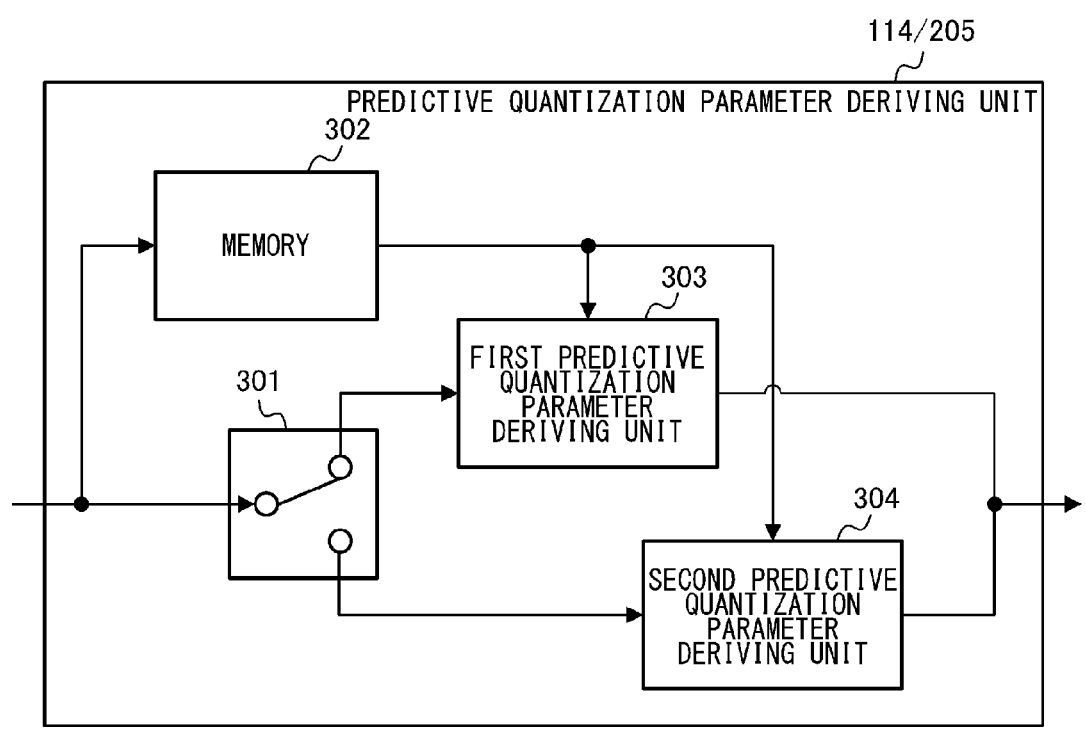
FIG. 10 is a block diagram that illustrates a detailed configuration of a predictive quantization parameter deriving unit according to this embodiment.

FIG. 10 is diagram that illustrates a detailed configuration of the predictive quantization parameter deriving unit 114. The predictive quantization parameter deriving unit 114 is configured by: a switch 301; a memory 302; a first predictive quantization parameter deriving unit 303; and a second predictive quantization parameter deriving unit 304.

The coding information such as the quantization parameter of the coded neighboring block disposed on the periphery of the coding block and the prediction mode of the coding block, which is supplied from the coding information storage memory 113, is temporarily stored in the memory 302, and the prediction mode of the coding block is supplied to the switch 301.

The switch 301 performs switching between deriving units that predict the quantization parameter in accordance with the prediction mode. The quantization parameter is derived by using the first predictive quantization parameter deriving unit 303 in a case where the prediction mode is the inter prediction and is derived by using the second predictive quantization parameter deriving unit 304 in a case where the prediction mode is the intra prediction.

The first predictive quantization parameter deriving unit 303 derives the predictive quantization parameter by performing a relative comparison of the quantization parameter of the coded neighboring block disposed on the periphery of the coding block that is acquired from the memory 302.

On the other hand, the second predictive quantization parameter deriving unit 304 derives the predictive quantization parameter based on the quantization parameter of the coded neighboring block disposed on the periphery of the coding block that is supplied from the memory 302 and the intra prediction mode (hereinafter, referred to as an intraPredMode) representing the direction of pixels of the neighboring block that is referred to in the intra prediction in a case where the intra prediction is selected by the predicted picture generation unit 108 as the prediction mode.

Here, the intra prediction will be described in detail. In the intra prediction, the value of a pixel of the coding block is predicted from the value of a pixel of a decoded neighboring block within the same screen. The moving picture coding device 100 and the moving picture decoding device 200 according to the present invention select an intra prediction mode from among intra prediction modes of 34 kinds and make an intra prediction.

Figure 11:
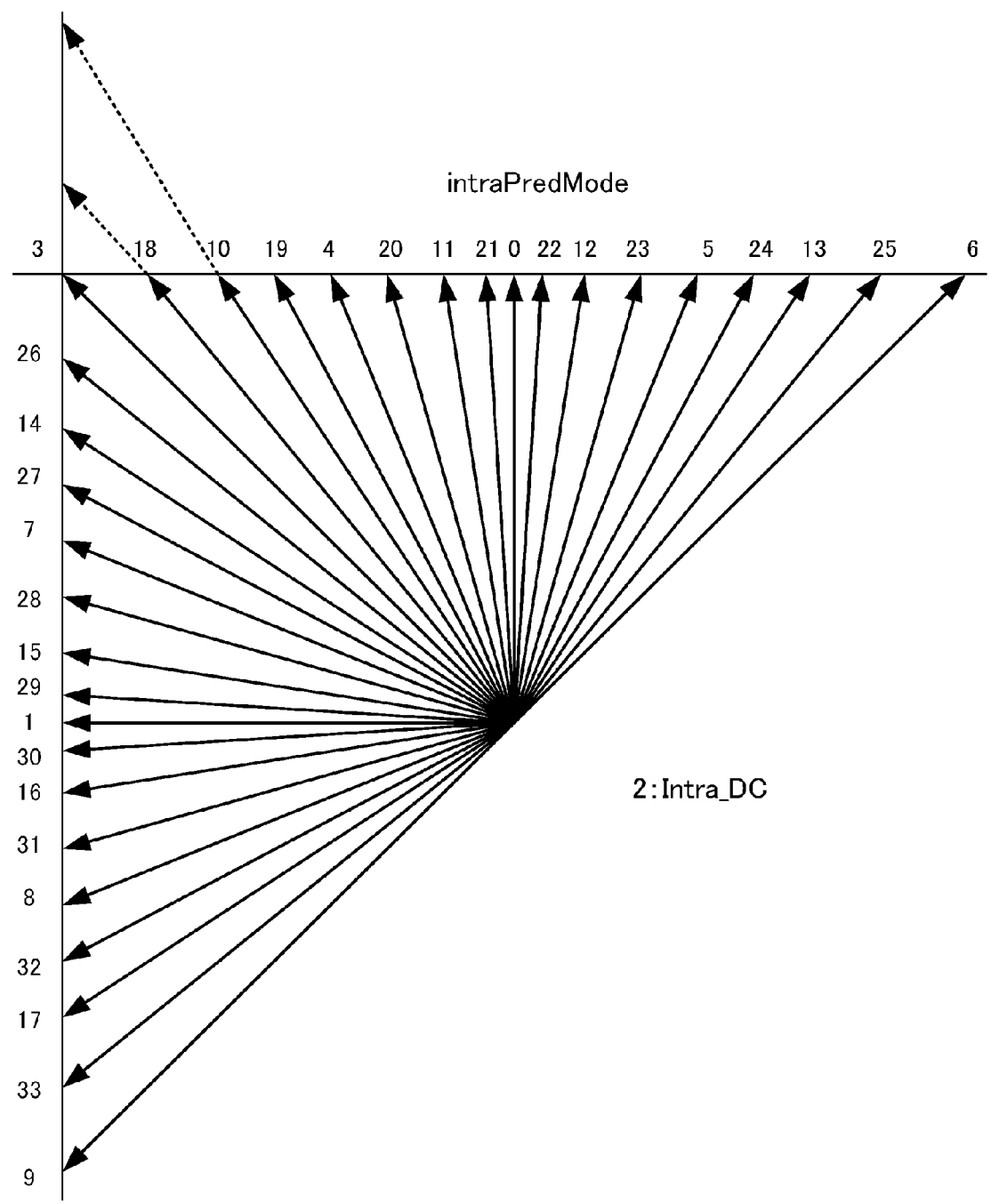
FIG. 11 is a diagram that illustrates values of intra prediction modes defined in this embodiment and prediction directions.

FIG. 11 is a diagram that illustrates values of intra prediction modes defined in this embodiment and prediction directions. Each solid-line arrow represents a direction to be referred to in the intra prediction, and the intra prediction is made from the endpoint to the start point of the arrow. In addition, each number represents the value of the intra prediction mode. As the intra prediction modes, in addition to a vertical prediction (intra prediction mode intraPredMode=0) making a prediction in the vertical direction from a decoded block disposed on the upper side, a horizontal prediction (intra prediction mode intraPredMode=1) making a prediction in the horizontal direction from a decoded block disposed on the left side, an average value prediction (intra prediction mode intraPredMode=2) making a prediction by calculating an average value from decoded blocks disposed on the periphery, and an average value prediction (intra prediction mode intraPredMode=3) making a prediction in a lower rightward direction from decoded blocks disposed on the periphery at an angle of 45 degrees, angle predictions (intra prediction modes intraPredMode=4, 5, . . . , 33) of 30 kinds making predictions in inclined directions at various angles from decoded blocks disposed on the periphery are defined.

The intra prediction modes are prepared for each of a luminance signal and a color difference signal, and the intra prediction mode for a luminance signal is defined as an intra luminance prediction mode, and an intra luminance mode for a color difference signal is defined as an intra color difference prediction mode. In coding and decoding in the intra luminance prediction mode, a structure is used in which information specifying the block that is referred to is transmitted in a case where it is determined that a prediction can be made from the intra luminance prediction mode of the neighboring block on the coding side by using the correlation with the intra luminance prediction mode of a neighboring block, and the value of the intra luminance prediction mode is further coded or decoded in a case where setting another value to the intra luminance prediction mode is determined to be better than making a prediction from the intra luminance prediction mode of the neighboring block. By predicting the intra luminance prediction mode of the coding/decoding target block from the intra luminance prediction mode of the neighboring block, the amount of codes to be transmitted can be reduced. On the other hand, in coding and decoding in the intra color difference prediction mode, a structure is used in which the value of the intra color difference prediction mode is predicted from the value of the intra luminance prediction mode in a case where it is determined that a prediction can be made from the intra luminance prediction mode on the coding side by using the correlation with the intra luminance prediction mode of the prediction block of a luminance signal that is located at the same position as that of the prediction block of the color difference signal, and the value of the intra color difference prediction mode is coded or decoded in a case where setting an independent value to the intra color difference prediction mode is determined to be better than making a prediction from the intra luminance prediction mode. By predicting the intra color difference prediction mode from the intra luminance prediction mode, the amount of codes to be transmitted can be reduced. In this embodiment, unless otherwise noted, the intra luminance prediction mode is set as the intra prediction mode.

The predicted picture generation unit 108 selects an intra prediction mode having the highest coding efficiency from among the intra prediction modes of the 34 kinds and, in a case where an intra prediction is selected as the prediction mode, supplies the intra prediction mode together with the prediction mode to the predictive quantization parameter deriving unit 114 through the coding information storage memory 113.

The second predictive quantization parameter deriving unit 304 derives a predictive quantization parameter based on the intra prediction mode. The predictive quantization parameter derived in this way is supplied to the differential quantization parameter generation unit 111.

The differential quantization parameter generation unit 111 generates a differential quantization parameter by performing subtraction between the quantization parameter of the coding block that is calculated by the quantization parameter calculation unit 110 and the predictive quantization parameter that is derived by the predictive quantization parameter deriving unit 114. Since the predictive quantization parameter is derived from a coded neighboring block disposed on the periphery also at the time of decoding similarly to that at the time of decoding, by setting the differential quantization parameter as a coding target, the amount of coding of the quantization parameter can be reduced without generating a contradiction in the coding and the decoding. The calculated differential quantization parameter is supplied to the first bitstream generation unit 112.

The first bitstream generation unit 112 generates a first bitstream by performing entropy coding of the differential quantization parameter calculated by the differential quantization parameter generation unit 111 in accordance with a regulated syntax rule. FIG. 12 illustrates an example of a coding conversion table used for entropy coding of the differential quantization parameter. This is a table called a signed exponential Golomb coding table and provides a shorter code length as the absolute value of the differential quantization parameter is smaller. Generally, in a case where a picture is divided into blocks, in neighboring blocks, pictures are similar, and activities have values close to each other, and calculated quantization parameters of the blocks have values close to each other. Accordingly, the occurrence frequency of the differential quantization parameter is the highest for zero and tends to be lowered as the absolute value is larger. In the table illustrated in FIG. 12, such a characteristic is reflected, and a short code length is assigned to a value having a high occurrence frequency. When the predictive quantization parameter is predicted to be a value close to the quantization parameter of the coding block, a differential quantization parameter close to zero is calculated, whereby the generated coding amount can be suppressed. The first bitstream generation unit 112 extracts a bitstream corresponding to the differential quantization parameter from the table illustrated in FIG. 12 and supplies the extracted bitstream to the bitstream multiplexing unit 115.

The operation of each of the units 220 of the moving picture decoding device 200 corresponding to the moving picture coding device 100 according to this embodiment described above, which are surrounded by the thick dotted line, will now be described.

In the units 220, first, the differential quantization parameter decoded by the first bitstream decoding unit 202 is supplied to the quantization parameter generation unit 203. In addition, coding information other than the differential quantization parameter is stored in the coding information storage memory 204 as is necessary.

The quantization parameter generation unit 203 calculates a quantization parameter of the decoding block by adding the differential quantization parameter supplied from the first bitstream decoding unit 202 and the quantization parameter derived by the predictive quantization parameter deriving unit 205 and supplies the calculated quantization parameter to the inverse quantization and inverse orthogonal transform unit 207 and the coding information storage memory 204.

In the coding information storage memory 204, the quantization parameter of a decoded block is stored. In addition, not only the coding information in units of blocks decoded by the first bitstream decoding unit 202 but also coding information generated in units of pictures or slices is also stored therein as is necessary.

The predictive quantization parameter deriving unit 205 derives a predictive quantization parameter by using the quantization parameter or the coding information of a decoded neighboring block disposed on the periphery of the decoding block and supplies the derived predictive quantization parameter to the quantization parameter generation unit 203. The quantization parameter calculated by the quantization parameter generation unit 203 is stored in the coding information storage memory 204, and, at the time of deriving the predictive quantization parameter of the next decoding block, a decoded neighboring block disposed on the periphery of the decoding block is determined, and the quantization parameter of the neighboring block is derived from the coding information storage memory 204. The quantization parameter of the decoded neighboring block that is derived as above is the same as the quantization parameter derived from the coding information storage memory 113 by the predictive quantization parameter deriving unit 114 of the moving picture coding device 100. The predictive quantization parameter deriving unit 205 has a function that is equivalent to that of the predictive quantization parameter deriving unit 114 of the moving picture coding device 100, and accordingly, in a case where the quantization parameter of the neighboring block, which is supplied from the coding information storage memory 204, is the same, a predictive quantization parameter that is the same as the predictive quantization parameter at the time of coding is derived.

The predictive quantization parameter deriving unit 205 performs the same process except for changing a coded neighboring block to a decoded neighboring block, and thus, the description of the prediction of the quantization parameter will not be presented here.

In this way, the predictive quantization parameter derived on the coding side is derived also on the decoding side without any contradiction.

In this embodiment, in a case where the predictive quantization parameter is derived, the neighboring block referred to by the predictive quantization parameter deriving unit 114 of the moving picture coding device 100 is a coded block, and the neighboring block referred to by the predictive quantization parameter deriving unit 205 of the moving picture decoding device 200 is a decoded block. The coded block that is referred to on the coding side is a block that is locally decoded for the next coding operation inside the coding process and is the same as the decoded block that is referred to on the decoding side. Accordingly, the functions of the predictive quantization parameter deriving units 114 and 205 are common, and predictive quantization parameters derived thereby are the same. In examples to be described below, the deriving of the predictive quantization parameter will be described on the coding side as a common function without being separated into processes for coding and decoding.

Hereinafter, the method of deriving a predictive quantization parameter that is performed to be common to the predictive quantization parameter deriving units 114 and 205 will be described in detail.

First Example

A detailed operation of the first predictive quantization parameter deriving unit 303 according to the first example will now be described. In the first example, in a case where a coding block that is a coding target is close to an upper tree block, while the quantization parameter of a coded block included in the upper tree block that is quite past in the coding sequence is prohibited from being used for the prediction, the quantization parameter of a coded block of a tree block, which is neighboring to the left side, that is past in the coding sequence but is not past long as the upper tree block is used for the prediction.

Figure 13:
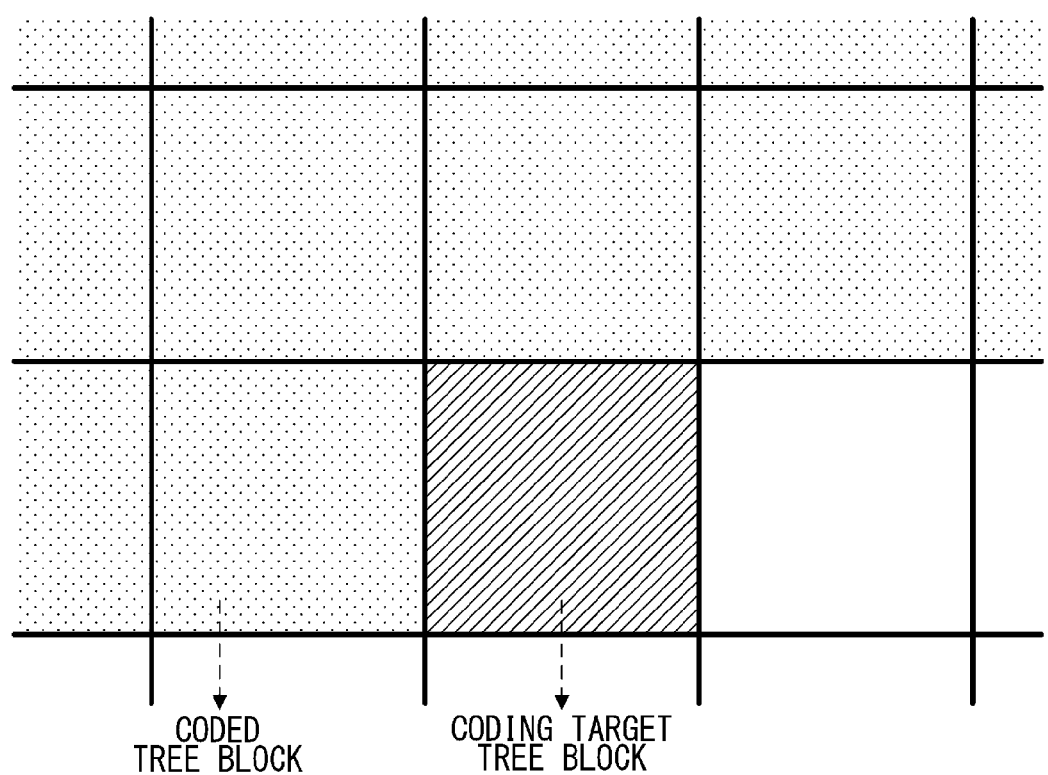
FIG. 13 is a diagram that illustrates relation between a coding target tree block and a coded tree block.

As illustrated in FIG. 13, coding is performed from the upper left side to the lower right side of the screen in the raster scanning sequence in units of tree blocks. Now, when a coding target tree block is represented by a hatched rectangle illustrated in FIG. 13, a coded tree block is represented by a gray portion in FIG. 13. Inside the tree block, hierarchical tree coding is performed in accordance with a coding condition, and thus, the coding block is divided into parts of a size that is smaller than or equal to the size of the tree block. Accordingly, while the coding block disposed inside the coding target tree block and the coded block disposed inside the upper tree block are located close to each other, the blocks are separated far from each other in the coding process sequence. Accordingly, the quantization parameter calculated according to the coding amount control is calculated in the coding process sequence, therefore, it cannot be determined that the quantization parameter of the coding block and the quantization parameter of the coded block disposed inside the upper tree block have values close to each other. Thus, in the first example, the upper tree block is not used for the prediction of the quantization parameter, but only the left tree block located close in the coding process sequence is used.

Figure 14:
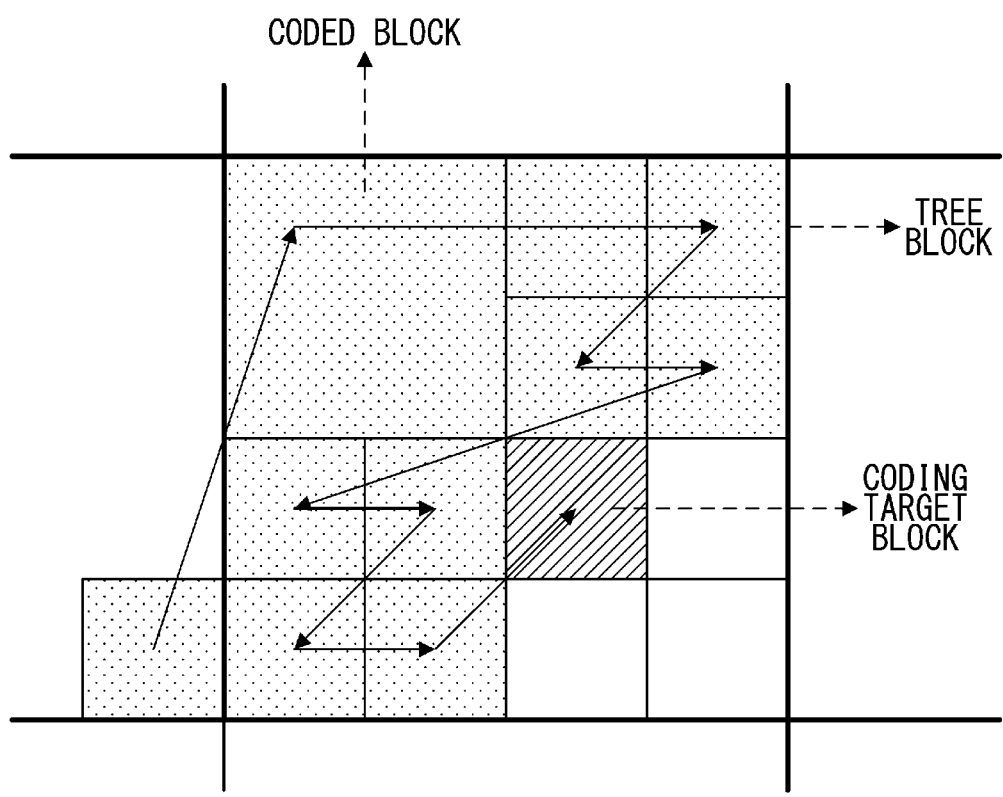
FIG. 14 is a diagram that illustrates relation between a coding block and coded blocks arranged inside a tree block divided through the hierarchical tree coding.

In addition, as illustrated in FIG. 14, when a coding block disposed inside a tree block is represented by a hatched rectangle illustrated in FIG. 14, a solid fine line represents the coding process sequence, and coded blocks up to the coding block are represented as gray portions in FIG. 14. Inside the same tree block, the coding process sequences of the coding block and the coded block are not separated from each other, and the patterns thereof are frequently the same or are similar to each other, and accordingly, it is effective to use the quantization parameter of the upper coded block for a prediction inside the same tree block. In the first example, a neighboring coded block is used for the prediction with high priority beyond the coded block that is located close in the coding process sequence.

Figure 15:
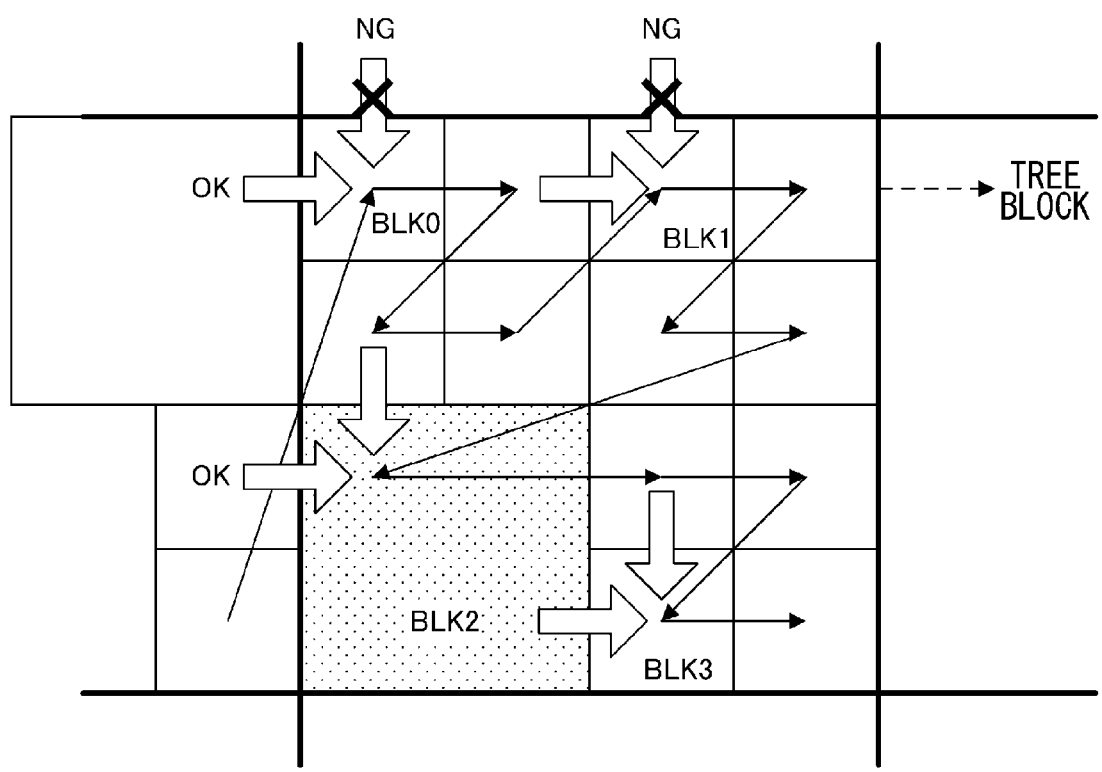
FIG. 15 is a diagram that illustrates a reference destination of a predictive quantization parameter of a coding block of a first example.

In FIG. 15, the direction of a coded block that is referred to by each coding block disposed inside a divided tree block is represented by a thick arrow. The solid fine line illustrated in FIG. 15 represents the coding process sequence, and a neighboring coded block is used with high priority beyond the coded block that is located close in the coding process sequence for the coding block. The blocks BLK0 and BLK1 located at the upper end of a tree block in FIG. 15 are in contact with the boundary of an upper tree block, and accordingly, the quantization parameter of the coded block that is neighboring to the upper side is not used for the prediction, but only the quantization parameter of a coded block that is neighboring to the left side is used. Since blocks BLK2 and BLK3 have coded blocks neighboring to the upper side thereof being disposed inside the same tree block, the quantization parameter of an upper coded block and the quantization parameter of a left coded block are used for the prediction.

Figure 16:
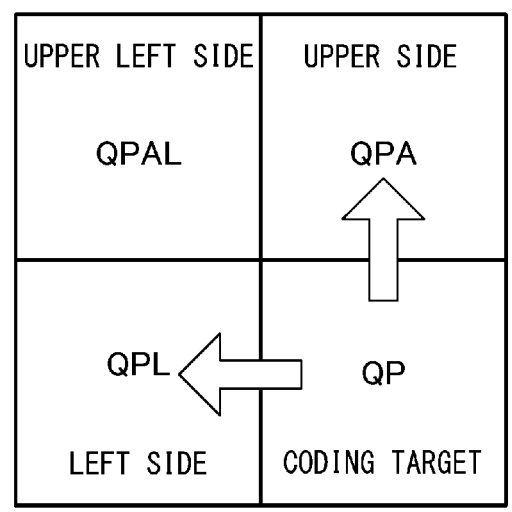
FIG. 16 is a diagram that illustrates an example in which quantization parameters of neighboring coded blocks are illustrated as predictive quantization parameters of a coding block as reference destinations.

FIG. 16 illustrates the arrangement of a coding block and a coded block neighboring to the periphery thereof that is defined in this embodiment. In this embodiment, for the convenience of description, while the sizes of blocks are represented to be the same, for example, by changing the block size in a motion prediction or the like, even in a case where an optimal motion prediction is made, an upper left point of the coding block may be used as the reference, and a block that is neighboring to the periphery thereof may be selected.

A symbol $QP_x$ (x=L, A, or AL) represented in FIG. 16 illustrates the quantization parameter of a coded neighboring block disposed on the periphery. The first predictive quantization parameter deriving unit 303 determines a predictive quantization parameter based on the presence/no-presence of the quantization parameters of neighboring blocks disposed on the left side and the upper side illustrated in FIG. 16.

Figure 17:
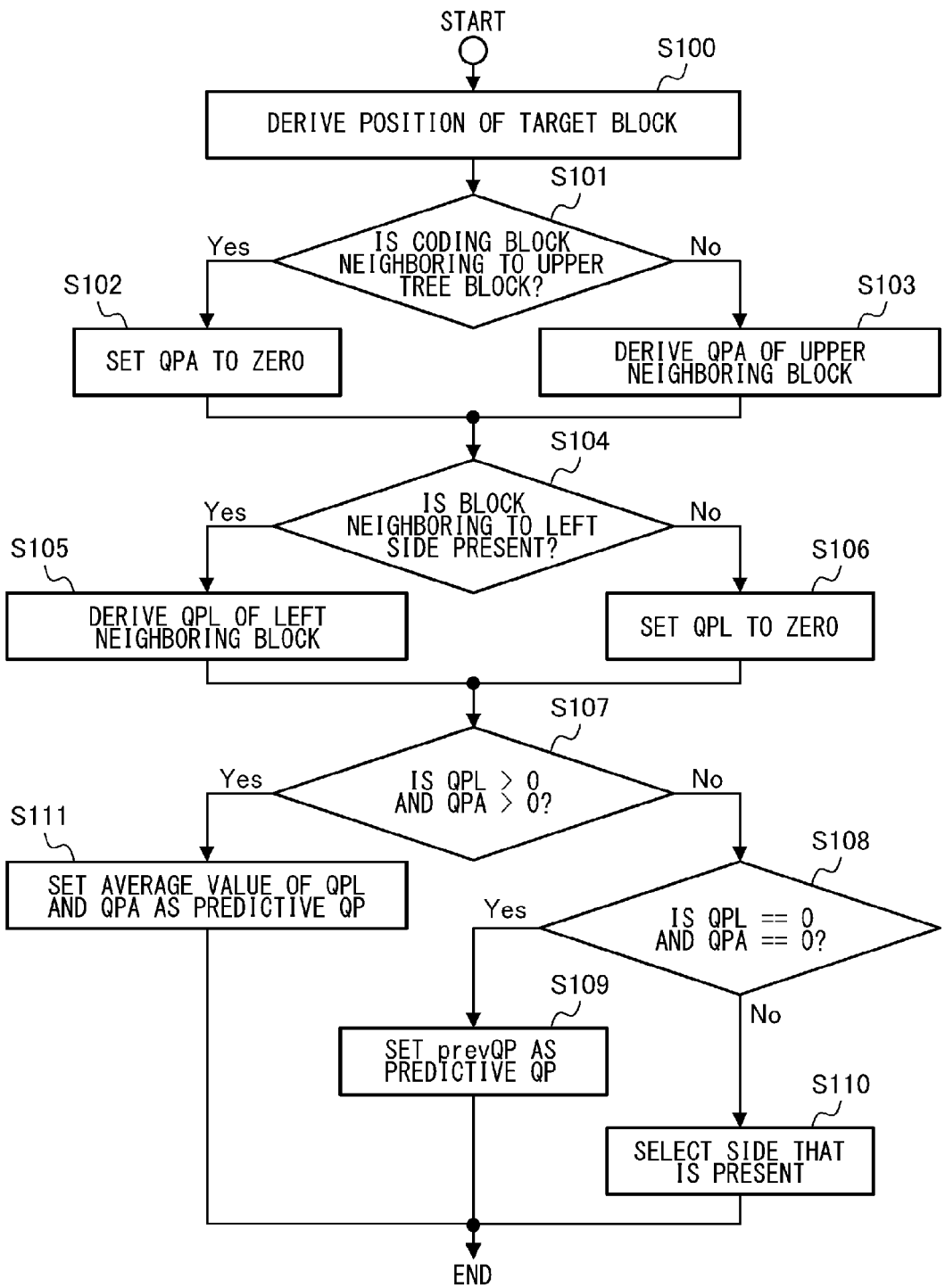
FIG. 17 is a flowchart that illustrates an operation of a first predictive quantization parameter deriving unit of the first example.

The operation of the first predictive quantization parameter deriving unit 303 will now be described. FIG. 17 is a flowchart that illustrates the operation of the first predictive quantization parameter deriving unit 303 of the first example.

First, the position information of a coding block that is the coding target is derived (step S100). As the position information of the coding block, with the upper left side of the screen being used as a starting point, the position of the upper left side of a tree block including the coding block is acquired, and the position of the coding block is acquired based on the position of the upper left side of the tree block. Next, it is determined whether or not the coding block is neighboring to an upper tree block (step S101).

In a case where the coding block is neighboring to the upper tree block (Yes in step S101), in other words, in a case where the coding block is located at the upper end of the tree block, an upper neighboring block is included in the upper tree block so as to be beyond the boundary of the tree block, and accordingly, the upper neighboring block is not used for the prediction of the quantization parameter. Here, considering that the quantization parameter always has a positive value, in a case where the upper neighboring block is not used, the quantization parameter $QP_A$ of the upper neighboring bock is set to zero (step S102).

On the other hand, in a case where the coding block is not neighboring to the upper tree block (No in step S101), in other words, in a case where the upper neighboring block is located within the tree block of the coding block, the quantization parameter QPA of the coded block neighboring to the upper side of the coding block is derived from the memory 302 based on the reference position information of the upper left side of the coding block (step S103). At this time, based on the reference position information of the upper left side of the coding block, an access to a storage area arranged in the coding information storage memory 113 is made, the quantization parameter of the corresponding neighboring coded block is supplied to the memory 302 disposed inside the predictive quantization parameter deriving unit 114, and the quantization parameter of the upper neighboring block is derived from the memory 302.

Subsequently, it is determined whether or not a coded block neighboring to the left side of the coding block is present (step S104). In a case where the block neighboring to the left side is present (Yes in step S104), the quantization parameter QPL of the coded block that is neighboring to the left side of the coding block is derived from the memory 302 (step S105). On the other hand, in a case where the left neighboring block is not present (No in step S104), the quantization parameter QPL of the left neighboring block is set to zero (step S106).

Next, it is determined whether or not both the quantization parameters of left and upper neighboring blocks are positive (step S107). In a case where both the quantization parameters of the left and upper neighboring blocks are positive (Yes in step S107), the neighboring blocks disposed on both the left side and the upper side are present, and an average value of the quantization parameters of the left and the upper neighboring blocks are set as the predictive quantization parameter (step S111). On the other hand, in a case where both the quantization parameters of the left and upper neighboring blocks are not positive (No in step S107), in other words, the quantization parameter of at least one of the neighboring blocks of the left and the upper is zero, and the neighboring block of at least one of the left side and the upper side is not present. In such a case, the process proceeds to step S108.

Next, it is determined whether both quantization parameters of the left and upper neighboring blocks are zero (step S108). In a case where both the quantization parameters of the left and the upper neighboring blocks are zero, both neighboring blocks are not present, and accordingly, the quantization parameters of the left and upper neighboring blocks cannot be referred to as predictive quantization parameters. Thus, the quantization parameter prevQP of a block that is arranged previous to the coding block, which is the coding target, or has been immediately previously coded is set as the predictive quantization parameter. In addition, in a case where a block disposed at the upper left end of a picture is the coding block, the left and upper neighboring blocks and a block that is arranged previous to the coding block, which is the coding target, or has been immediately previously coded are not present, and accordingly, the quantization parameter of the picture or the slice is set as the predictive quantization parameter (step S109). In a case where one of the left and upper-side neighboring blocks is present, one quantization parameter having a positive value is set as the predictive quantization parameter (step S110). The predictive quantization parameter calculated in this way is supplied to the differential quantization parameter generation unit 111.

In addition, the first predictive quantization parameter deriving unit 303 may determine the predictive quantization parameter based on the quantization parameters of the neighboring blocks disposed on the left side, the upper side, and the upper left side of the coding block illustrated in FIG. 16. A difference from the above-described technique is that the quantization parameters of the left and upper neighboring blocks are weighted based on the determination of the predictive quantization parameter, and a derived value is set as the predictive quantization parameter.

Figure 18:
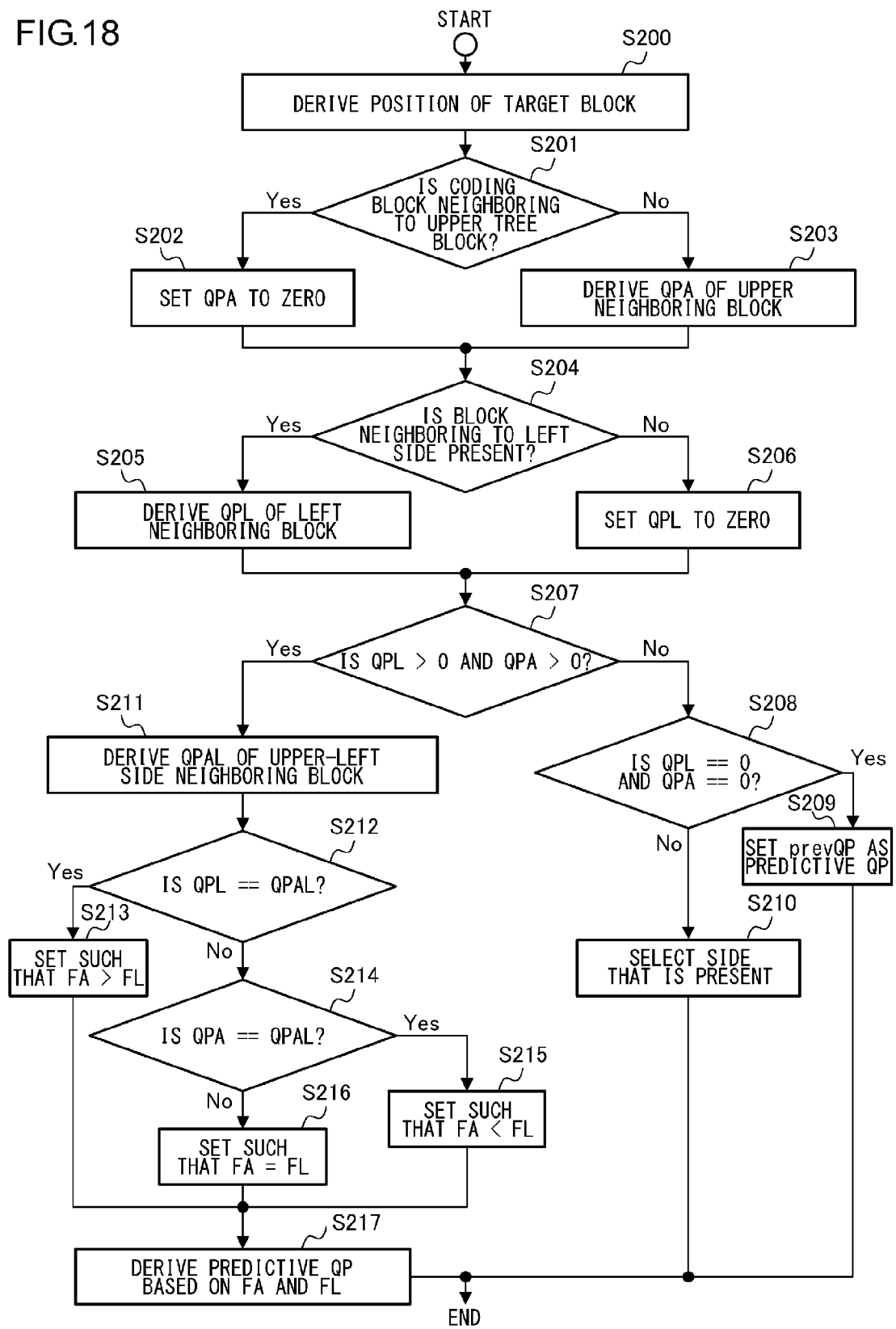
FIG. 18 is a flowchart that illustrates another operation of the first predictive quantization parameter deriving unit of the first example.

FIG. 18 is a flowchart that illustrates the operation of the first predictive quantization parameter deriving unit 303. The process of steps S200 to S210 of the flowchart illustrated in FIG. 18 are the same as that of steps S100 to S110 of the above-described flowchart illustrated in FIG. 17, and description thereof will not be presented here, and the description will be started from a case where both the quantization parameters of the left and upper neighboring blocks have positive values (Yes in step S207) in the determining of whether or not both the quantization parameters of the left and upper neighboring blocks have positive values (step S207). In a case where both the quantization parameters of the left and upper neighboring blocks have positive values, both the left and upper neighboring blocks are present. At this time, since the upper-left side neighboring block is also present, an access to a storage area arranged in the coding information storage memory 113 is made based on the reference position information of the upper left side of the coding block is made, and the quantization parameter QPAL of the corresponding upper-left side neighboring block is supplied to the predictive quantization parameter deriving unit 114 (step S211).

Next, it is determined whether or not the quantization parameter QPL of the left neighboring block and the quantization parameter QPAL of the upper-left side neighboring block coincide with each other (step S212). In a case where the quantization parameters QPL and QPAL coincide with each other, when a weighting coefficient of the quantization parameter of the upper neighboring block is represented by FA, and a weighting coefficient of the quantization parameter of the left neighboring block is represented by FL, the weighting coefficient of the upper neighboring block is set to be large such that FA>FL (step S213). For example, the weighting coefficient FA is set to 3, and the weighting coefficient FL is set to 1. In such a case, as an example, the arrangement of the quantization parameters illustrated in FIG. 8 may be considered, and it can be determined that it is appropriate to set the weighting coefficient of the quantization parameter of the upper neighboring block to be large. In addition, in a case where the quantization parameter QPA also coincides with the quantization parameters QPL and QPAL, the quantization parameters of all the neighboring blocks are the same, and there is no problem. On the other hand, in a case where the quantization parameters QPL and QPAL do not coincide with each other, the process proceeds to step S214, and it is determined whether the quantization parameters QPA and QPAL coincide with each other (step S214). In a case where the quantization parameters QPA and QPAL coincide with each other, the weighting coefficient of the quantization parameter of the left neighboring block is set to be large such that FA<FL (step S215). For example, FA is set to 1, and FL is set to 3. On the other hand, in a case where the quantization parameters QPA and QPAL do not coincide with each other, the weighting coefficients FA and FL are weighted to be the same, and the weighting coefficients of the quantization parameters of the left and upper neighboring blocks are equalized (step S216).

In this case, since the quantization parameters of the left, the upper, and the upper-left side neighboring blocks are different from one another, a sufficient condition for setting one of the weighing coefficients QPL and QPA to be large cannot be determined. Thus, an average of the quantization parameters QPL and QPA is set as an equal determination value as the predictive quantization parameter, and, for example, the weighting coefficient FA is set to 2, and the weighting coefficient FL is set to 2. Then, a predictive quantization parameter predQP is derived using the following equation based on the determined weighing coefficients and the quantization parameters (step S217).

$$predQP = \frac{FA \times QPA + FL \times QPL + 2}{4} \quad \text{[Expression 7]}$$

Here, the denominator of the equation represented above is "FA+FL", and "2" included in the numerator is the value of (FA+FL)/2 that is added for rounding off. The predictive quantization parameter derived in this way is supplied to the differential quantization parameter generation unit 111.

In addition, instead of the determination of coincidence between the quantization parameters QPL and QPAL of step S212 and the determination of coincidence between the quantization parameters QPA and QPAL of step S214, which are illustrated in FIG. 18, when the absolute value of a difference between the quantization parameters of the left and upper-left side neighboring blocks is represented by ΔL and the absolute value of a difference between the quantization parameters of the upper and upper-left side neighboring blocks is represented by ΔA, based on the comparison between the values ΔL and ΔA, the left or upper side quantization parameter may be set as the predictive quantization parameter.

In the coding block and the coded neighboring block disposed on the periphery thereof, ΔL and ΔA represent the absolute values of differences between the quantization parameters of the left and upper-left side neighboring blocks and the upper and upper-left side neighboring blocks and are respectively represented by the following equations.

ΔL=|QPL−QPAL|  [Expression 8]

ΔA=|QPA−QPAL|  [Expression 9]

A case where ΔA is larger than ΔL is a case where a difference between the quantization parameters QPA and QPAL is large, and, in that case, it is estimated that a difference between the smoothness levels or the complexity levels of pictures of the upper and upper-left side neighboring blocks is larger (large change) than that of the left and upper-left side neighboring blocks. Accordingly, in the coding block and the coded neighboring blocks disposed on the periphery thereof, it is considered that there is a difference between the quantization parameters of the left two blocks (the left and upper-left side neighboring blocks) and the right two blocks (the coding block and the upper neighboring block). Accordingly, it is determined that the quantization parameter of the coding block is closer to the quantization parameter of the upper neighboring block than to the quantization parameter of the left neighboring block.

In the case of the decoding process, by replacing the first predictive quantization parameter deriving unit 303 with the predictive quantization parameter deriving unit 205 and replacing the memory 302 with the coding information storage memory 204 and changing the output destination of the predictive quantization parameter from the differential quantization parameter generation unit 111 to the quantization parameter generation unit 203, an equivalent process is realized.

Second Example

The operations of the first predictive quantization parameter deriving unit 303 and 205 in the second example will now be described. While the coding process will be described here, in the case of the decoding process, by paraphrasing coding with decoding, replacing the first predictive quantization parameter deriving unit 303 with the predictive quantization parameter deriving unit 205, replacing the memory 302 with the coding information storage memory 204, and changing the output destination of the predictive quantization parameter from the differential quantization parameter generation unit 111 to the quantization parameter generation unit 203, an equivalent process is realized. In the second example, similarly to the first example, the quantization parameters of the left and upper coded blocks neighboring to the coding block that is the coding target are used for the prediction. A difference from the first example is that, similarly to the case where the coding block is neighboring to the upper tree block, in a case where the coding block is neighboring to the left tree block, the quantization parameter of a coded block disposed inside the left tree block is prohibited from being used for the prediction. The reason for this is that the calculation of the quantization parameter of the coding block is performed based on the coding process sequence of the coding control, and accordingly, the coding process sequences are separated between the coding blocks of tree blocks than between the coding blocks disposed inside a tree block, and, even in a case where the coding blocks are neighboring to each other between the tree blocks, the quantization parameters of the coding blocks calculated in the coding amount control may not necessarily have values close to each other and may not be appropriate as the predictive quantization parameters. Thus, in the second example, in a case where the coding block that is the coding target or the decoding target is neighboring to the left or upper tree block, the quantization parameter of a coded block disposed inside the left or upper tree block is not used for the prediction and is replaced with the quantization parameter of a block that is arranged previous to the coding block, which is the coding target, in the coding process sequence or has been immediately previously coded so as to be used.

Figure 19:
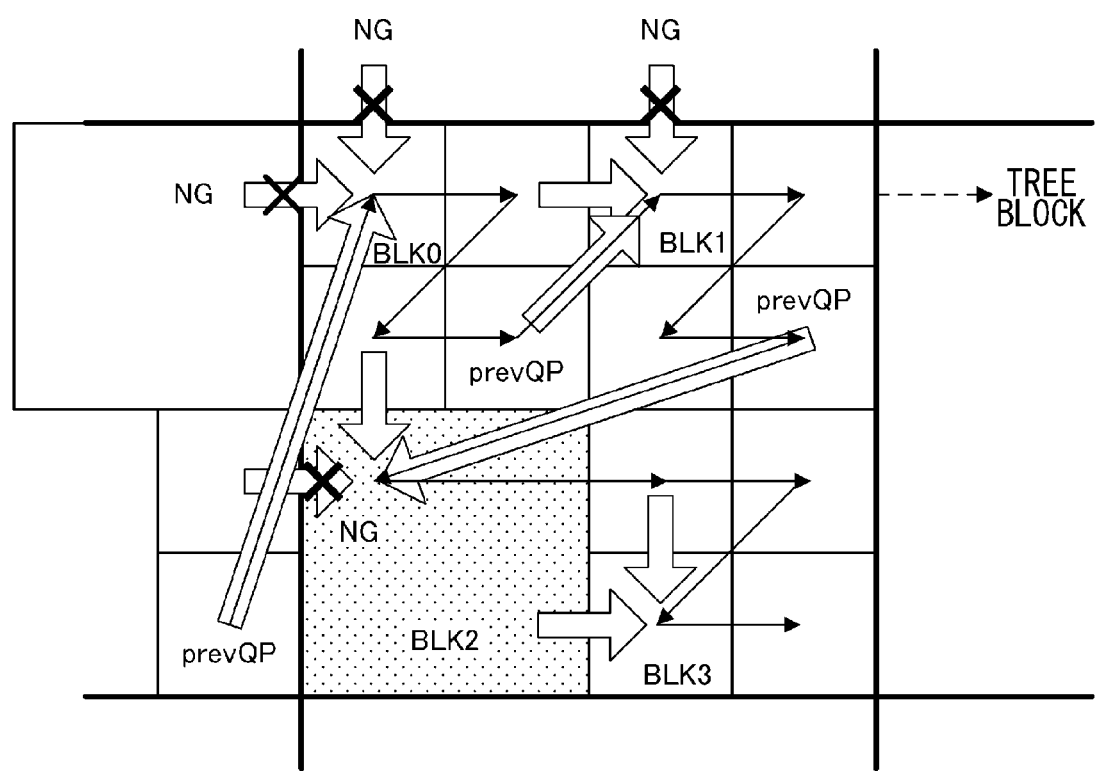
FIG. 19 is a diagram that illustrates a reference destination of a predictive quantization parameter of a coding block of a second example.

In FIG. 19, the direction of a coded block that is referred to by each coding block disposed inside a divided tree block is represented by a thick arrow. The solid fine line illustrated in FIG. 19 represents the coding process sequence, and the quantization parameter of a neighboring coded block disposed inside a tree block including a coding block is used for the coding block as a general rule. A block BLK0 located at the upper end of the tree block illustrated in FIG. 20 has the boundary being in contact with left and upper tree blocks, and accordingly, the quantization parameter of a block arranged previous to a coding block that is the coding target or a block that has been immediately previously coded replaces the quantization parameters of coded bocks that are neighboring to the left side and the upper side so as to be used for the prediction. In addition, since a block BLK1 has the boundary being in contact with the upper tree block, the quantization parameter of a coded block that is neighboring to the upper side is not used for the prediction but is replaced with a quantization parameter of a block that is arranged previous to the coding block, which is the coding target, or has been immediately previously coded, and the quantization parameter is used for the prediction together with the quantization parameter of a coded block neighboring to the left side. Since a block BLK2 has the boundary being in contact with the left tree block, the quantization parameter of a coded block that is neighboring to the left side is not used for the prediction but is replaced with a quantization parameter of a block that is arranged previous to the coding block, which is the coding target, or has been immediately previously coded, and the quantization parameter is used for the prediction together with the quantization parameter of a coded block neighboring to the upper side. In addition, for a block BLK3, since coded blocks that are neighboring to the left side and the upper side are disposed inside the same tree block, the quantization parameters of the upper coded block and the quantization parameter of the left coded block are used for the prediction.

Figure 20:
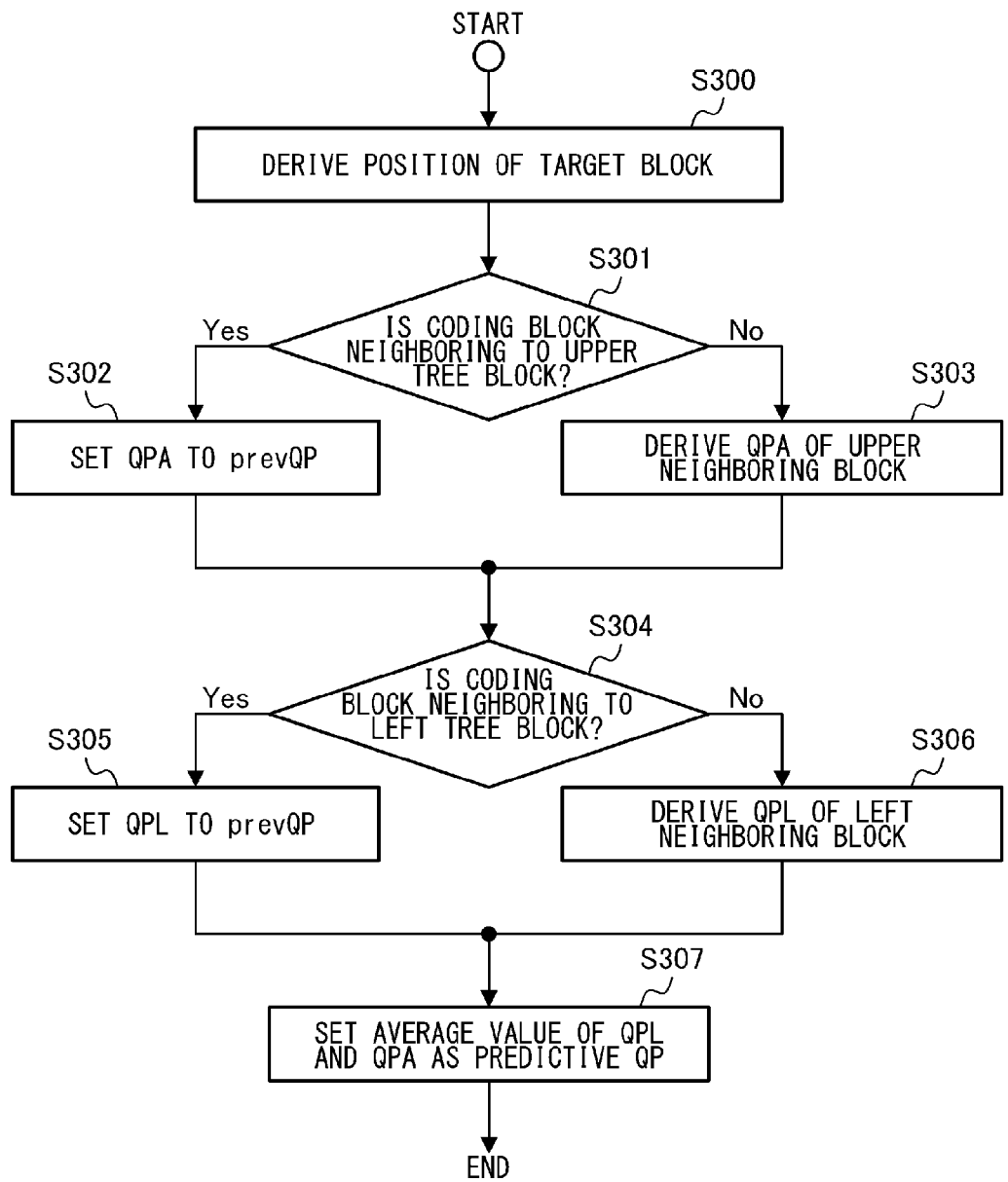
FIG. 20 is a flowchart that illustrates an operation of a first predictive quantization parameter deriving unit of the second example.

FIG. 20 is a flowchart that illustrates the operation of the first predictive quantization parameter deriving unit 303 of the second example.

First, the position information of a coding block that is the coding target is derived (step S300). As the position information of the coding block, with the upper left side of the screen being used as a starting point, the position of the upper left side of a tree block including the coding block is acquired, and the position of the coding block is acquired based on the position of the upper left side of the tree block. Next, it is determined whether or not the coding block is neighboring to an upper tree block (step S301). In a case where the coding block is neighboring to the upper tree block (Yes in step S301), in other words, in a case where the coding block is located at the upper end of the tree block, an upper neighboring block is included in the upper tree block so as to be beyond the boundary of the tree block, and accordingly, the upper neighboring block is not used for a prediction of the quantization parameter but the quantization parameter prevQP of a coding block that is arranged previous to the coding block, which is the coding target, or has been immediately previously coded is set to QPA (step S302).

On the other hand, in a case where the coding block is not neighboring to the upper tree block (No in step S301), in other words, in a case where the upper neighboring block is located within the same tree block of the coding block, the quantization parameter QPA of the coded block neighboring to the upper side of the coding block is derived from the memory 302 (step S303). At this time, based on the reference position information of the upper left side of the coding block, an access to a storage area arranged in the coding information storage memory 113 is made, the quantization parameter of the corresponding neighboring coded block is supplied to the memory 302 disposed inside the predictive quantization parameter deriving unit 114, and the quantization parameter of the upper neighboring block is derived from the memory 302.

Subsequently, it is determined whether or not the coding block is neighboring to the left tree block (step S304). In a case where the coding block is neighboring to the left tree block (Yes in step S304), in other words, in a case where the coding block is located at the left end of the tree block, a block neighboring to the left side is included inside a left tree block so as to be beyond the boundary of the tree block, and accordingly, the left neighboring block is not used for a prediction of the quantization parameter but the quantization parameter prevQP of a coding block that is arranged previous to the coding block, which is the coding target, or has been immediately previously coded is set to QPL (step S306).

On the other hand, in a case where the coding block is not neighboring to the left tree block (No in step S304), in other words, in a case where the left neighboring block is located inside the tree block of the coding block, the quantization parameter QPL of the coded block that is neighboring to the left side of the coding block is derived from the memory 302 (step S306). Finally, an average value of the quantization parameters of the left and the upper neighboring blocks is set as the predictive quantization parameter (step S307). The predictive quantization parameter calculated in this way is supplied to the differential quantization parameter generation unit 111.

In the second example, in a case where the left and upper neighboring blocks are beyond the boundary of the tree block, the quantization parameter of a coding block that is arranged previous to the coding block, which is the coding target, or has been immediately previously coded is substituted for the quantization parameters thereof, and non-zero values are necessarily included. Accordingly, the process of determining the value of the quantization parameter can be relatively reduced, compared to the first example.

Third Example

The operations of the first predictive quantization parameter deriving unit 303 and 205 in the third example will now be described. While the coding process will be described here, in the case of the decoding process, by paraphrasing coding with decoding and replacing the first predictive quantization parameter deriving unit 303 with the predictive quantization parameter deriving unit 205 and replacing the memory 302 with the coding information storage memory 204 and changing the output destination of the predictive quantization parameter from the differential quantization parameter generation unit 111 to the quantization parameter generation unit 203, an equivalent process is realized. A difference from the first example is that, similarly to the case where the coding block that is the coding target or the decoding target is neighboring to the upper tree block, in a case where the coding block is neighboring to the left tree block, the quantization parameter of a coded block disposed inside the left tree block is prohibited from being used for the prediction. In other words, the use of the quantization parameter of a coded block that is beyond the boundary of the tree block for the prediction is limited only to a case where the quantization parameter of a block that is arranged previous to the coding block, which is the coding target, or has been immediately coded is used for the coding block of the initial coding process sequence inside the tree block.

Figure 21:
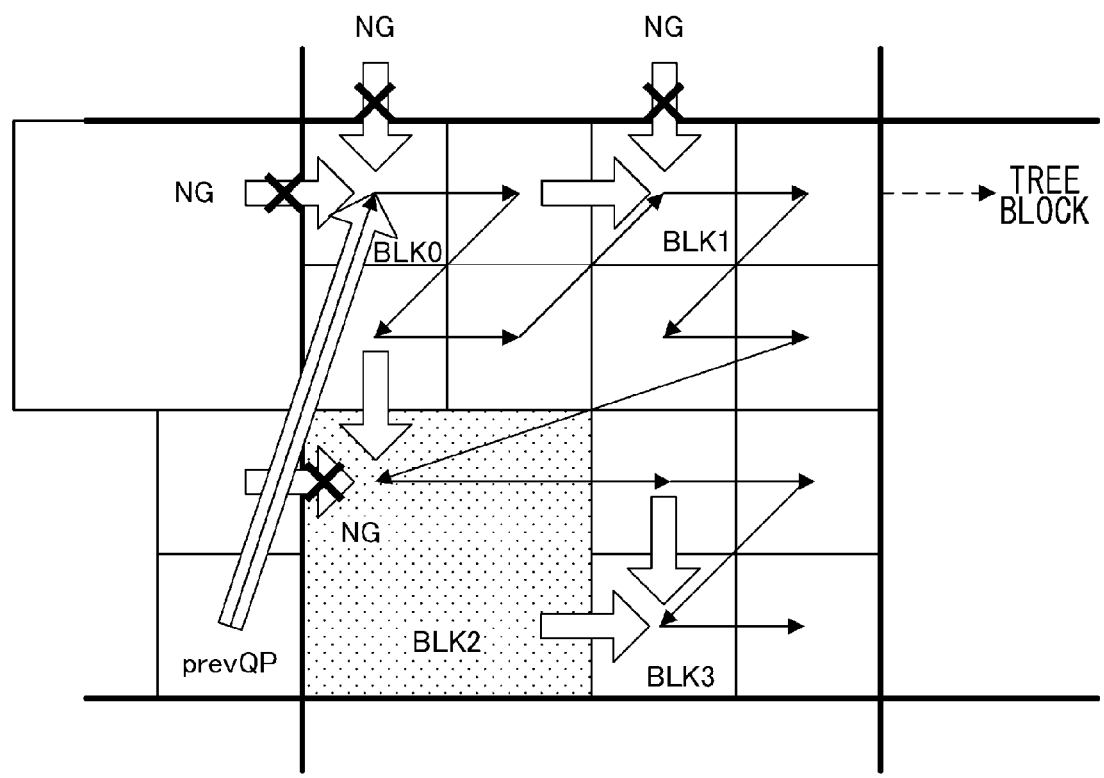
FIG. 21 is a diagram that illustrates a reference destination of a predictive quantization parameter of a coding block of a third example.

In FIG. 21, the direction of a coded block that is referred to by each coding block disposed inside a divided tree block is represented by a thick arrow. The solid fine line illustrated in FIG. 21 represents the coding process sequence, and the quantization parameter of a neighboring coded block disposed inside a tree block including the coding block is used for the coding block.

A block BLK0 located at the upper end of the tree block illustrated in FIG. 21 has the boundary being in contact with left and upper tree blocks, and accordingly, only the quantization parameter of a block that is arranged previous to a coding block, which is the coding target, or has been immediately previously coded is used for the prediction. In addition, since a block BLK1 has the boundary being in contact with the upper tree block, the quantization parameter of a coded block that is neighboring to the upper side is not used for the prediction, but only the quantization parameter of a coded block that is neighboring to the left side is used for the prediction. Since a block BLK2 has the boundary being in contact with the left tree block, the quantization parameter of a coded block that is neighboring to the left side is not used for the prediction, but only the quantization parameter of the coded block that is neighboring to the upper side is used for the prediction. In addition, for a block BLK3, since coded blocks that are neighboring to the left side and the upper side are disposed inside the same tree block, the quantization parameters of the upper coded block and the quantization parameter of the left coded block are used for the prediction.

Figure 22:
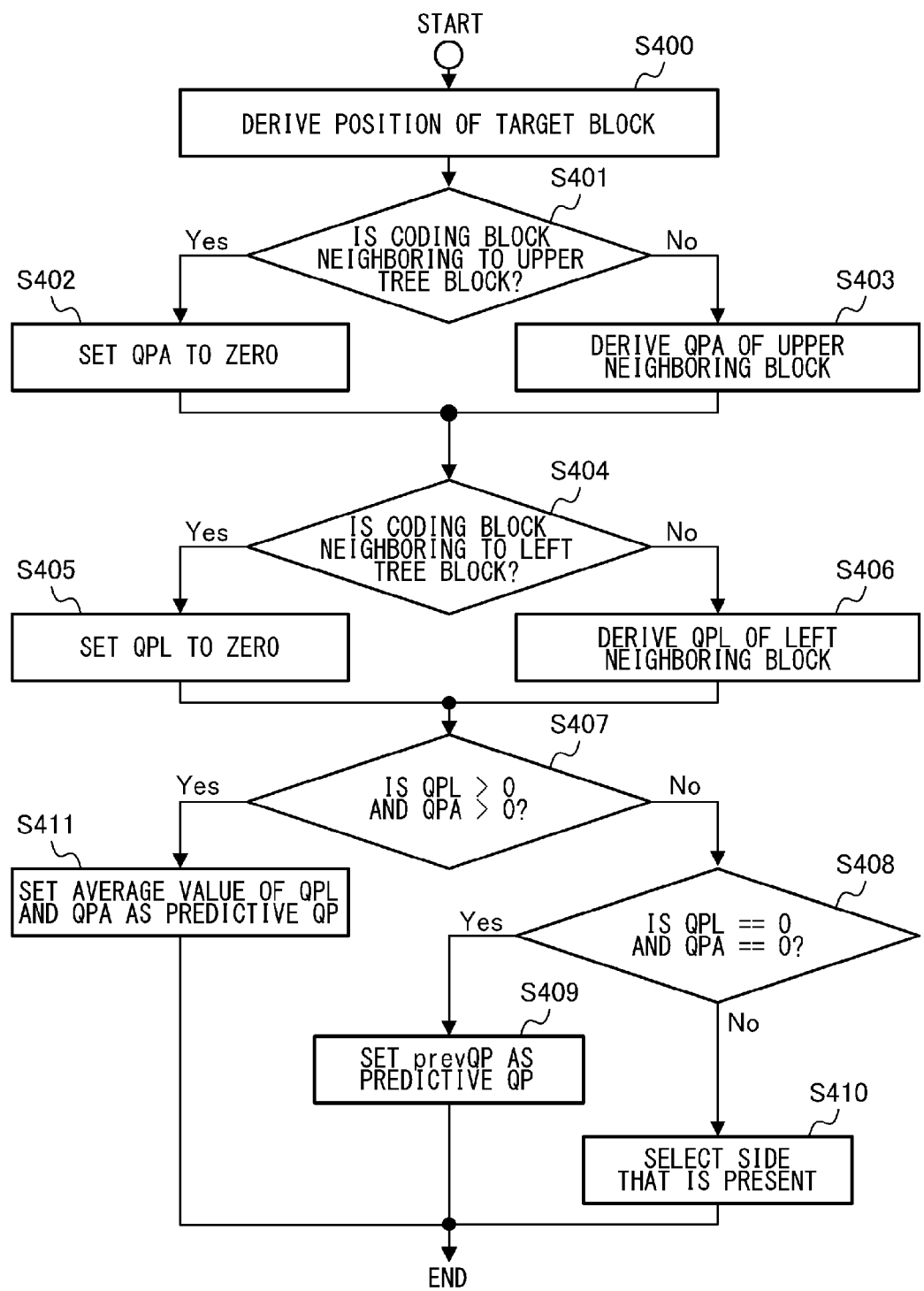
FIG. 22 is a flowchart that illustrates an operation of a first predictive quantization parameter deriving unit of the third example.

FIG. 22 is a flowchart that illustrates the operation of the first predictive quantization parameter deriving unit 303 of the third example. In FIG. 22, steps S400 to S403 and S407 to S411 of the flowchart are the same as steps S100 to S103 and S107 to S111 of the first example illustrated in FIG. 17, thus the description thereof will not be presented here, and only a difference from step S404 after the determination of whether or not the coding block is neighboring to the upper tree block is made will be described.

After it is determined whether or not the coding block and the upper tree block are neighboring to each other, it is determined whether or not the coding block is neighboring to the left tree block (step S404). In a case where the coding block is neighboring to the left tree block (Yes in step S404), in other words, in a case where the coding block is located at the left end of the tree block, a block neighboring to the left side is included inside a left tree block so as to be beyond the boundary of the tree block, and accordingly, the left neighboring block is not used for a prediction of the quantization parameter. Here, considering that the quantization parameter always has a positive value, in a case where the left neighboring block is not used, the quantization parameter QPL of the left neighboring bock is set to zero (step S405). On the other hand, in a case where the coding block is not neighboring to the left tree block (No in step S404), in other words, in a case where the left neighboring block is located within the same tree block of the coding block, the quantization parameter QPL of the coded block neighboring to the left side of the coding block is derived from the memory 302 (step S406). Then, a predictive quantization parameter is derived from the quantization parameters of the left and upper neighboring blocks that are derived in such a way, and the predictive quantization parameter is supplied to the differential quantization parameter generation unit 111.

Fourth Example

The operations of the first predictive quantization parameter deriving unit 303 and 205 in the fourth example will now be described. While the coding process will be described here, in the case of the decoding process, by paraphrasing coding with decoding, replacing the first predictive quantization parameter deriving unit 303 with the predictive quantization parameter deriving unit 205, replacing the memory 302 with the coding information storage memory 204, and changing the output destination of the predictive quantization parameter from the differential quantization parameter generation unit 111 to the quantization parameter generation unit 203, an equivalent process is realized. In the fourth example, in a case where the coding block that is the coding target or the decoding target is neighboring to the left or the upper tree block, the quantization parameter of a coded block disposed inside the left or upper tree block is prohibited from being used for the prediction. In addition, the quantization parameter of a coded block that is neighboring to the left side is used for the prediction as a general rule, and, in a case where the coded block neighboring to the left side is not present or is present at a position beyond the boundary of the tree block, the quantization parameter of a block that is arranged previous to the coding block, which is the coding target, or has been immediately previously coded is used for the prediction.

Figure 23:
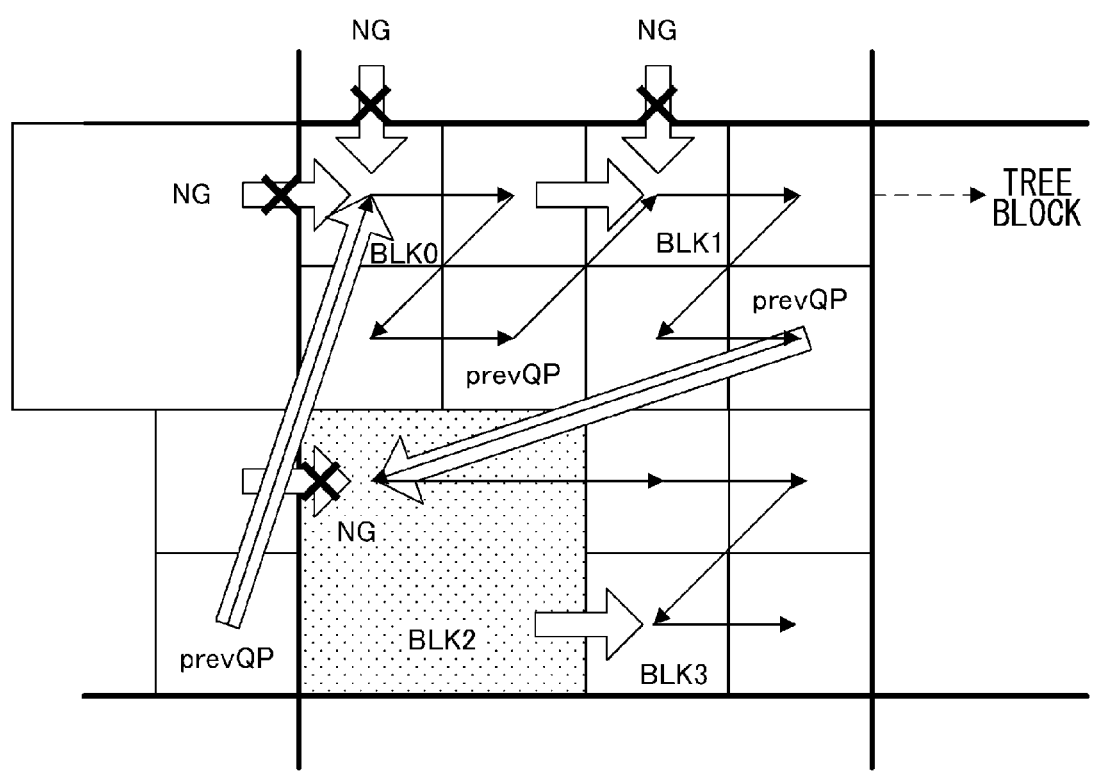
FIG. 23 is a diagram that illustrates a reference destination of a predictive quantization parameter of a coding block of a fourth example.

In FIG. 23, the direction of a coded block that is referred to by each coding block disposed inside a divided tree block is represented by a thick arrow. The solid fine line illustrated in FIG. 23 represents the coding process sequence, and the quantization parameter of a coded block that is neighboring to the left side inside a tree block including a coding block is used for the coding block as a general rule.

A block BLK0 located at the upper end of the tree block illustrated in FIG. 23 has the boundary being in contact with left and upper tree blocks, and accordingly, the quantization parameter of a block that is arranged previous to a coding block, which is the coding target, or has been immediately previously coded is used. In addition, for blocks BLK1 and BLK3, a coded block that is neighboring to the left side is disposed inside the same tree block, the quantization parameter of the left coded block is used for the prediction. Since a block BLK2 has the boundary being in contact with the left tree block, the quantization parameter of a coded block neighboring to the left side is not used for the prediction, and the quantization parameter of a block arranged previous to the coding block, which is the coding target, or has been immediately previously coded is used for the prediction.

Figure 24:
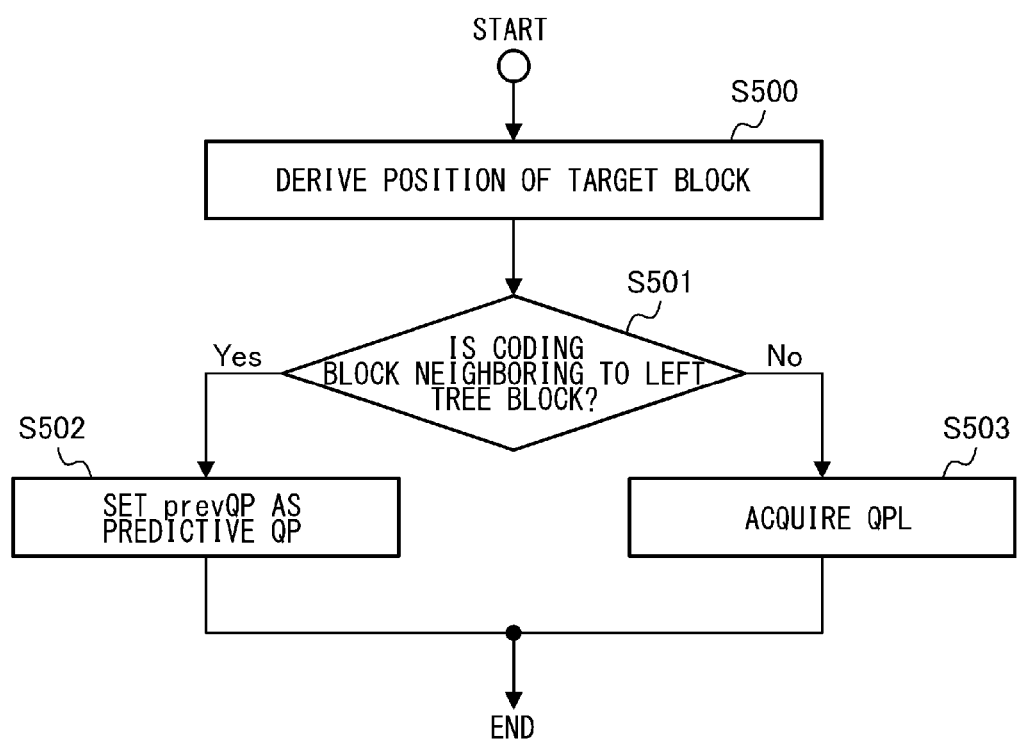
FIG. 24 is a flowchart that illustrates an operation of a first predictive quantization parameter deriving unit of the fourth example.

FIG. 24 is a flowchart that illustrates the operation of the first predictive quantization parameter deriving unit 303 of the fourth example. First, the position information of a coding block that is the coding target is derived (step S500). As the position information of the coding block, with the upper left side of the screen being used as a starting point, the position of the upper left side of a tree block including the coding block is acquired, and the position of the coding block is acquired based on the position of the upper left side of the tree block. Next, it is determined whether or not the coding block is neighboring to a left tree block (step S501). In a case where the coding block is neighboring to the left tree block (Yes in step S304), in other words, in a case where the coding block is located at the left end of the tree block, a left neighboring block is included in the left tree block so as to be beyond the boundary of the tree block, and accordingly, the left neighboring block is not used for the prediction of the quantization parameter but the quantization parameter prevQP of a coding block that is arranged previous to the coding block, which is the coding target, or has been immediately previously coded is set as the predictive quantization parameter (step S502). On the other hand, in a case where the coding block is not neighboring to the left tree block (No in step S501), in other words, in a case where the left neighboring block is located within the same tree block of the coding block, the quantization parameter QPL of the coded block neighboring to the left side of the coding block is derived from the memory 302 (step S503). At this time, based on the reference position information of the upper left side of the coding block, an access to a storage area arranged in the coding information storage memory 113 is made, the quantization parameter of the corresponding neighboring coded block is supplied to the memory 302 disposed inside the predictive quantization parameter deriving unit 114, and the quantization parameter of the left neighboring block is derived from the memory 302 and is set as the predictive quantization parameter. The predictive quantization parameter derived in this way is supplied to the differential quantization parameter generation unit 111.

In the fourth example, since the quantization parameter of the left coded neighboring block of the coding block is used for the prediction as a general rule, the determination process is simplified compared to the examples described until now, whereby the circuit scale can be suppressed.

Fifth Example

The operations of the first predictive quantization parameter deriving units 303 and 205 in the fifth example will now be described. While the coding process will be described here, in the case of the decoding process, by paraphrasing coding with decoding and replacing the first predictive quantization parameter deriving unit 303 with the predictive quantization parameter deriving unit 205, replacing the memory 302 with the coding information storage memory 204, and changing the output destination of the predictive quantization parameter from the differential quantization parameter generation unit 111 to the quantization parameter generation unit 203, an equivalent process is realized. The fifth example is a combination of the first and second examples, and, in a case where a coding block that is the coding target or the decoding target is neighboring to the left tree block, the quantization parameter of a coded block of the tree block that is neighboring to the left side is permitted to be used for the prediction. In a case where the coding block is neighboring to the upper tree block, the quantization parameter of a coded block disposed inside the upper tree block is prohibited from being used for the prediction, and, instead of the quantization parameter of the coded block disposed inside the upper tree block, the quantization parameter of a block that is arranged previous to the coding block, which is the coding target, or has been immediately previously coded is used for the prediction.

Figure 25:
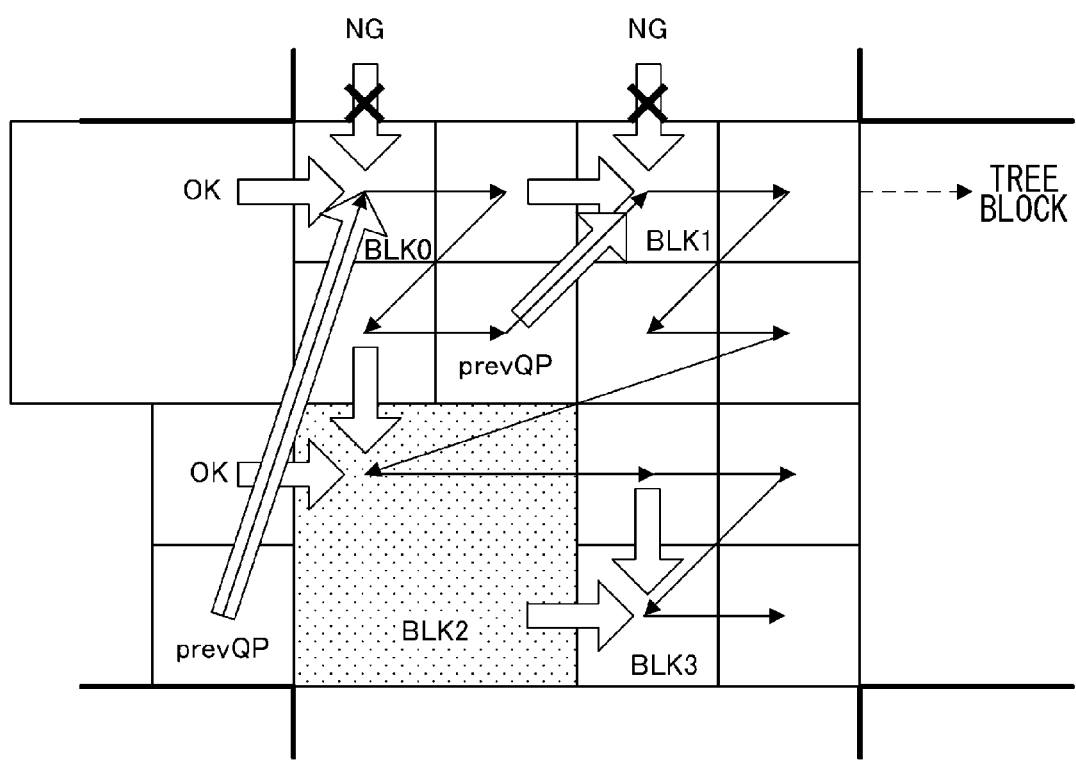
FIG. 25 is a diagram that illustrates a reference destination of a predictive quantization parameter of a coding block of a fifth example.

In FIG. 25, the direction of a coded block that is referred to by each coding block disposed inside a divided tree block is represented by a thick arrow. The solid fine line illustrated in FIG. 25 represents the coding process sequence, and a neighboring coded block is used with high priority beyond the coded block that is located close in the coding process sequence for the coding block that is the coding target.

The blocks BLK0 and BLK1 located at the upper end of a tree block in FIG. 25 are in contact with the boundary of an upper tree block, and accordingly, the quantization parameter of the coded block that is neighboring to the upper side is not used for the prediction, and, instead thereof, the quantization parameter of a block that is arranged previous to the coding block, which is the coding target, or has been immediately previously coded and the quantization parameter of a coded block neighboring to the left side are used for the prediction. Since blocks BLK2 and BLK3 have coded blocks neighboring to the upper side thereof being disposed inside the same tree block, the quantization parameter of an upper coded block and the quantization parameter of a left coded block are used for the prediction.

Figure 26:
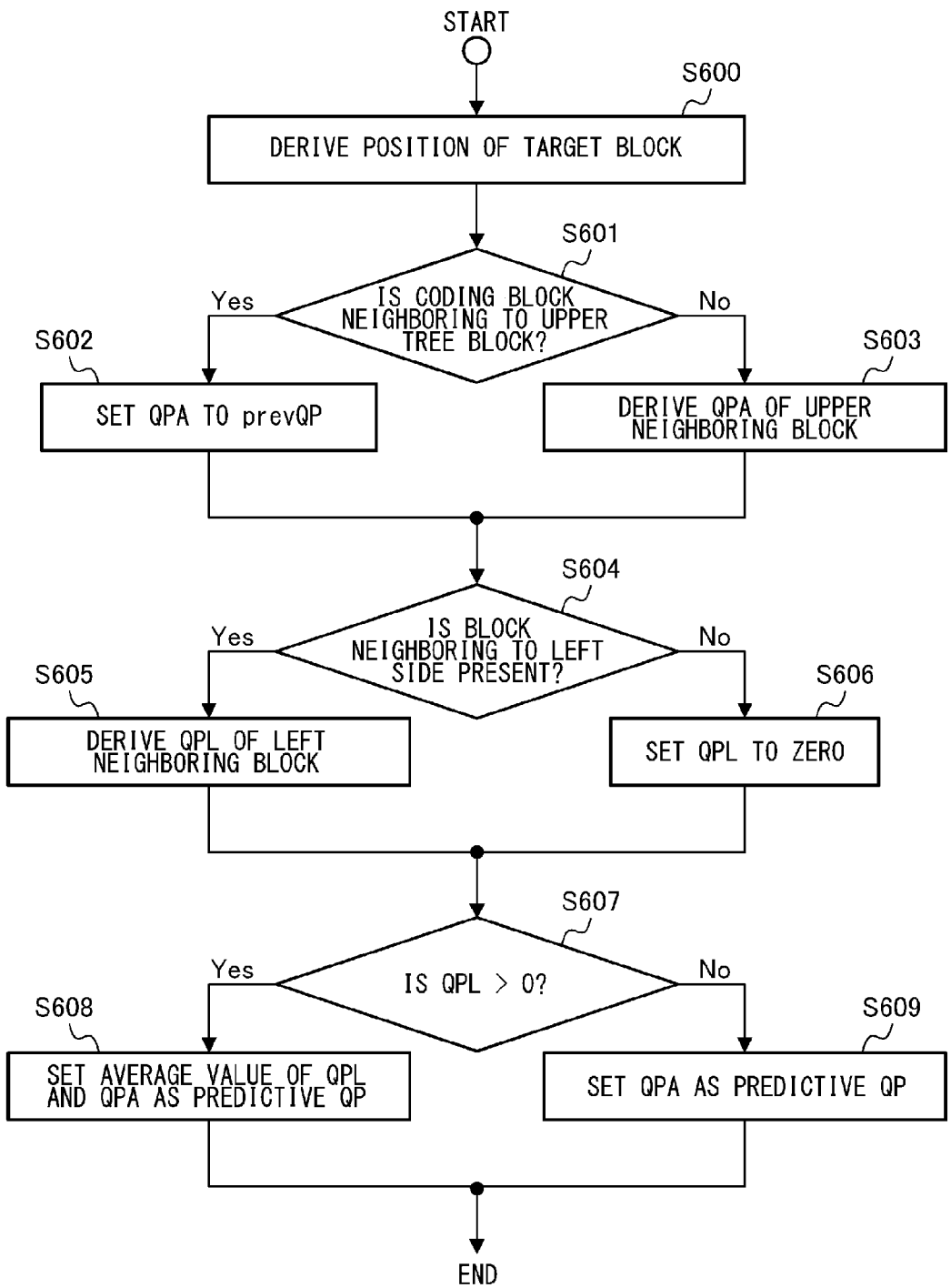
FIG. 26 is a flowchart that illustrates an operation of a predictive quantization parameter deriving unit of the fifth example.

A detailed operation of the first predictive quantization parameter deriving unit 303 of the fifth example will now be described. FIG. 26 is a flowchart that illustrates the operation of the first predictive quantization parameter deriving unit 303 of the fifth example.

First, the position information of a coding block that is the coding target is derived (step S600). As the position information of the coding block, with the upper left side of the screen being used as a starting point, the position of the upper left side of a tree block including the coding block is acquired, and the position of the coding block is acquired based on the position of the upper left side of the tree block. Next, it is determined whether or not the coding block is neighboring to an upper tree block (step S601). In a case where the coding block is neighboring to the upper tree block (Yes in step S601), in other words, in a case where the coding block is located at the upper end of the tree block, an upper neighboring block is included in the upper tree block so as to be beyond the boundary of the tree block, and accordingly, the upper neighboring block is not used for the prediction of the quantization parameter, but the quantization parameter PrevQP of a coding block that is arranged previous to the coding block, which is the coding target, or has been immediately previously coded is set to QPA (step S602).

On the other hand, in a case where the coding block is not neighboring to the upper tree block (No in step S601), in other words, in a case where the upper neighboring block is located within the same tree block of the coding block, the quantization parameter QPA of the coded block neighboring to the upper side of the coding block is derived from the memory 302 (step S603). At this time, based on the reference position information of the upper left side of the coding block, an access to a storage area arranged in the coding information storage memory 113 is made, the quantization parameter of the corresponding neighboring coded block is supplied to the memory 302 disposed inside the predictive quantization parameter deriving unit 114, and the quantization parameter of the upper neighboring block is derived from the memory 302.

Subsequently, it is determined whether or not a coded block neighboring to the left side of the coding block is present (step S604). In a case where the block neighboring to the left side is present (Yes in step S604), based on the reference position information of the upper left side of the coding block, an access to a storage area arranged in the coding information storage memory 113 is made, and the quantization parameter QPL of the corresponding left neighboring block is supplied to the predictive quantization parameter deriving unit 114 (step S605). On the other hand, in a case where the left neighboring block is not present (No in step S604), the quantization parameter QPL of the left neighboring block is set to zero (step S606).

Next, it is determined whether or not the quantization parameter of the left neighboring block has a positive value (step S607). In a case where the quantization parameter of the left neighboring block has a positive value (Yes in step S607), the left neighboring block is present, and accordingly, an average value of the quantization parameters of the left and upper neighboring blocks are set as the predictive quantization parameter (step S608). On the other hand, in a case where the quantization parameter of the left neighboring block is not positive (No in step S607), in other words, the quantization parameter of the left neighboring block is zero, and the left neighboring block is not present. In such a case, the parameter QPA is set as the predictive quantization parameter (step S609). The predictive quantization parameter calculated in such a way is supplied to the differential quantization parameter generation unit 111.

Sixth Example

The operations of the second predictive quantization parameter deriving units 304 and 205 in the sixth example will now be described. While the coding process will be described here, in the case of the decoding process, by paraphrasing coding with decoding and replacing the second predictive quantization parameter deriving unit 304 with the predictive quantization parameter deriving unit 205, replacing the memory 302 with the coding information storage memory 204, and changing the output destination of the predictive quantization parameter from the differential quantization parameter generation unit 111 to the quantization parameter generation unit 203, an equivalent process is realized. In a case where the intra prediction is selected as the prediction mode of the coding block by the predicted picture generation unit 108, the second predictive quantization parameter deriving unit 304 selects or derives a predictive quantization parameter based on the intra prediction mode representing the direction of pixels of a neighboring block that is referred to in the intra prediction.

Figure 27:
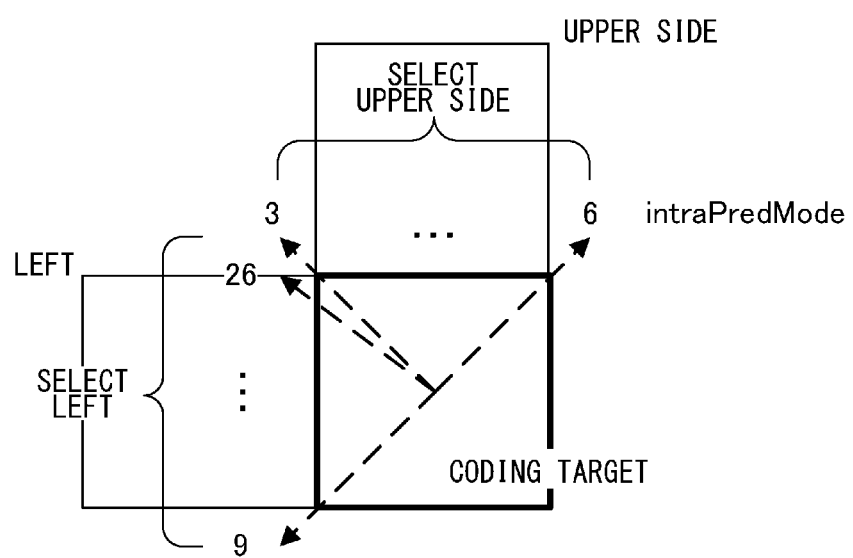
FIG. 27 is a diagram that illustrates values of intra prediction modes defined in this embodiment and prediction directions.

FIG. 27 is a diagram that illustrates relation between the prediction direction of then intra prediction mode and the left and upper neighboring blocks selected as the predictive quantization parameters in a case where the prediction mode of the coding block is the intra prediction. In the intra prediction, a prediction signal is generated from a pixel of a neighboring block of a prediction direction represented by the intra prediction mode, and an intra prediction mode having high coding efficiency and a small strain amount is selected. Accordingly, it is determined that the correlation with the upper neighboring block is high in a case where the upper side is selected in accordance with the intra prediction mode, and the correlation with the left neighboring block is high in a case where the left side is selected in accordance with the intra prediction mode. In a case where the correlation between blocks is high, the patterns and the complexity levels (activity levels) of the inside of the blocks are similar to each other, and the quantization parameters calculated based on the activities have values close to each other. Thus, in this the sixth example, in order to code and transmit the quantization parameter of the coding block with high efficiency, a neighboring block having high correlation with the coding block is predicted and determined based on the intra prediction mode, and the quantization parameter of the determined neighboring block is selected as a predictive quantization parameter.

Figure 28:
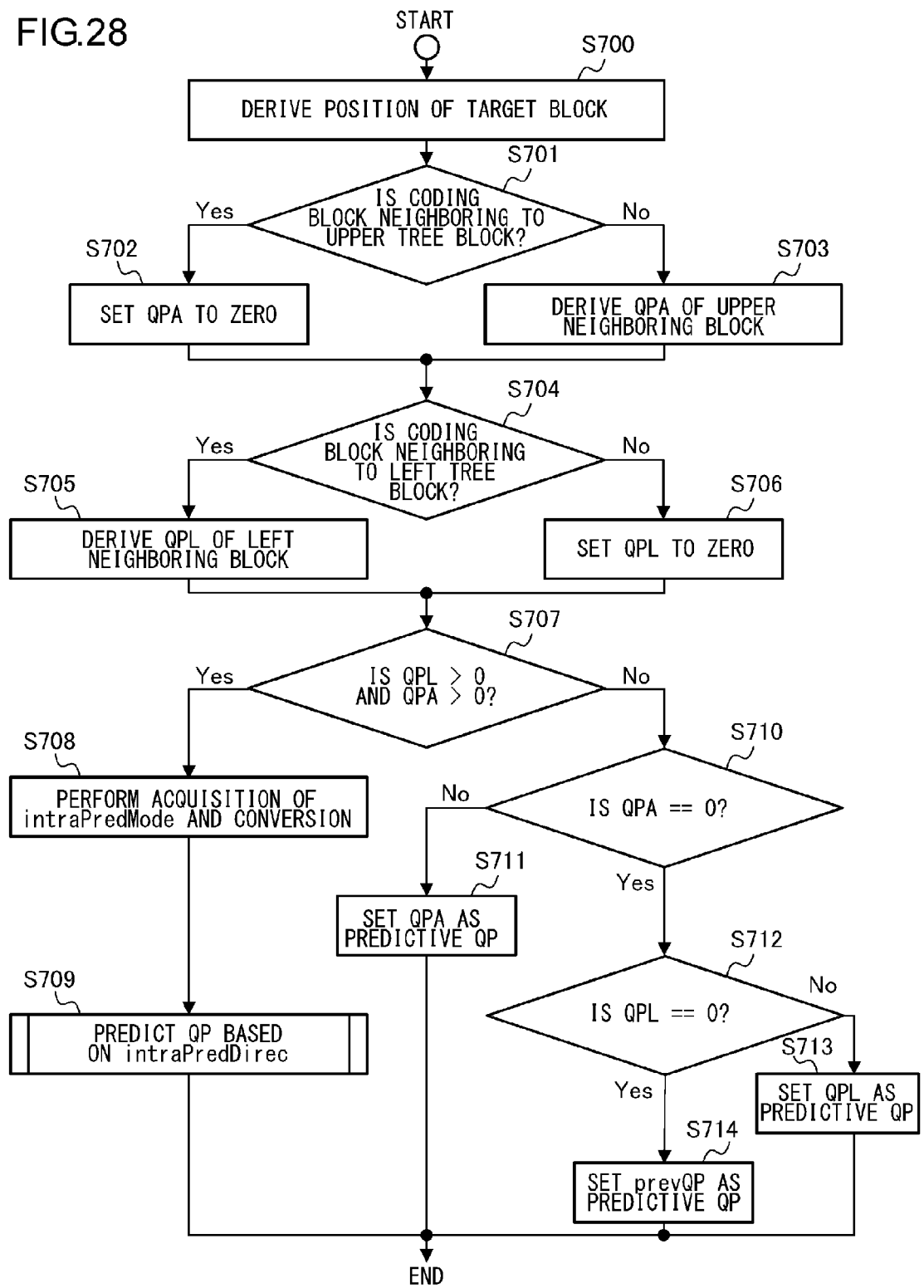
FIG. 28 is a flowchart that illustrates an operation of a second predictive quantization parameter deriving unit 304 of a sixth example.

FIG. 28 is a flowchart that illustrates the operation of the second predictive quantization parameter deriving unit 304 of the sixth example. In the sixth example, in a case where the coding block is neighboring to the upper tree block, while the quantization parameter of a coded block disposed inside the upper tree block is prohibited from being used for the prediction, the quantization parameter of a coded block of a tree block neighboring to the left side is used for the prediction.

First, the position information of a coding block that is the coding target is derived (step S700). As the position information of the coding block, with the upper left side of the screen being used as a starting point, the position of the upper left side of a tree block including the coding block is acquired, and the position of the coding block is acquired based on the position of the upper left side of the tree block. Next, it is determined whether or not the coding block is neighboring to an upper tree block (step S701).

In a case where the coding block is neighboring to the upper tree block (Yes in step S701), in other words, in a case where the coding block is located at the upper end of the tree block, an upper neighboring block is included in the upper tree block so as to be beyond the boundary of the tree block, and accordingly, the upper neighboring block is not used for the prediction of the quantization parameter. Here, considering that the quantization parameter always has a positive value, in a case where the upper neighboring block is not used, the quantization parameter QPA of the upper neighboring bock is set to zero (step S702).

On the other hand, in a case where the coding block is not neighboring to the upper tree block (No in step S701), in other words, in a case where the upper neighboring block is located within the same tree block of the coding block, the quantization parameter QPA of the coded block neighboring to the upper side of the coding block is derived from the memory 302 (step S703). At this time, based on the reference position information of the upper left side of the coding block, an access to a storage area arranged in the coding information storage memory 113 is made, the quantization parameter of the corresponding neighboring coded block is supplied to the memory 302 disposed inside the predictive quantization parameter deriving unit 114, and the quantization parameter of the upper neighboring block is derived from the memory 302.

Subsequently, it is determined whether or not a coded block neighboring to the left side of the coding block is present (step S704). In a case where the block neighboring to the left side is present (Yes in step S704), the quantization parameter QPL of the coded block that is neighboring to the left side of the coding block is derived from the memory 302 (step S705). On the other hand, in a case where the left neighboring block is not present (No in step S704), the quantization parameter QPL of the left neighboring block is set to zero (step S706).

Next, it is determined whether or not both the quantization parameters of left and upper neighboring blocks are positive (step S707). In a case where both the quantization parameters of the left and upper neighboring blocks are positive (Yes in step S707), the neighboring blocks disposed on both the left side and the upper side are present. Accordingly, by referring to a neighboring block designated by the prediction direction represented in the intra prediction mode, the quantization parameter can be derived, and, in such a case, a prediction determination is made based on the prediction direction represented by the intra prediction mode.

On the other hand, in a case where both the quantization parameters of the left and upper neighboring blocks are not positive (No in step S707), in other words, in a case where the quantization parameter of at least one of the left and upper neighboring blocks is zero, at least one of the left and upper neighboring blocks is not present. Accordingly, the neighboring block designated by the prediction direction represented by the intra prediction mode may not be present, and thus, in such a case, the prediction determination that is based on the prediction direction represented by the intra prediction mode is not made, but it is determined whether or not the left or upper neighboring block is present, in other words, whether or not the quantization parameter the left or upper neighboring block is zero. First, it is determined whether or not the quantization parameter of the upper neighboring block is zero (step S710). In a case where the quantization parameter of the upper neighboring block is not zero (No in step S710), the quantization parameter of the upper neighboring block is set as a predictive quantization parameter (step S711). On the other hand, in a case where the quantization parameter of the upper neighboring block is zero (Yes in step S710), the quantization parameter of the upper neighboring block cannot be referred to as a predictive quantization parameter, and the process proceeds to the determination process of step S712. Next, it is determined whether or not the quantization parameter of the left neighboring block is zero (step S712). In a case where the quantization parameter of the left neighboring block is not zero (No in step S712), the quantization parameter of the left neighboring block is set as a predictive quantization parameter (step S713). On the other hand, in a case where the quantization parameter of the left neighboring block is zero (Yes in step S712), in other words, in a case where the quantization parameters of the left and upper neighboring blocks are zero, the quantization parameters of both the blocks are not present, and accordingly, the quantization parameters of the left and upper neighboring blocks cannot be referred to as the predictive quantization parameter. Thus, the quantization parameter prevQP of a block that is arranged previous to the coding block, which is the coding target, or has been immediately previously coded is set as a predictive quantization parameter. In addition, in a case where a block disposed at the upper left end of the picture is the coding block, the left and upper neighboring blocks and furthermore a block arranged previous to the coding block, which is the coding target, or has been immediately previously coded are not present, and accordingly, the quantization parameter of the picture or the slice is set as the predictive quantization parameter (step S714).

Returning to the determination process of step S707, in a case where both the quantization parameters of the left and upper neighboring blocks are positive (Yes in step S707), an intra prediction mode intraPredMode of the coding block is derived from the memory 302. Similarly to the derivation of the quantization parameter of the neighboring coded block, an access to a storage area arranged in the coding information storage memory 113 is made based on the reference position information of the upper left side of the coding block, and the intra prediction mode is supplied to the memory 302 and is derived from the memory 302.

The intra prediction mode is a number that is assigned to a prediction direction illustrated in FIG. 27. In order to allow the following determination process to be easily performed, the intra prediction mode is converted into an intra prediction direction (hereinafter, referred to as intraPredDirec) using the conversion table illustrated in FIG. 29. The intra prediction direction may be assigned such that intraPredDirec=0 is assigned to an average value prediction intraPredMode=2 that is predicted by calculating an average value from neighboring decoded blocks in the intra prediction, and the other intraPredDirec 1 to 33 are assigned to the upper right side intraPredMode=6 of the prediction direction of the intra prediction mode illustrated in FIG. 30 toward the lower left side intraPredMode=9. The derived intra prediction mode is converted into the intra prediction direction using this conversion table (step S708). The quantization parameter is predicted based on the converted intra prediction direction (step S709). As a threshold of the prediction direction of the intra prediction mode illustrated in FIG. 30, TH is set, here, the threshold TH is set to 18 as the value of the intra prediction direction. The quantization parameter of the upper neighboring block is derived as the predictive quantization parameter in a case where the intra prediction direction is smaller than 18, and the quantization parameter of the left neighboring block is derived as the predictive quantization parameter in a case where the intra prediction direction is larger than or equal to 18.

Figure 31:
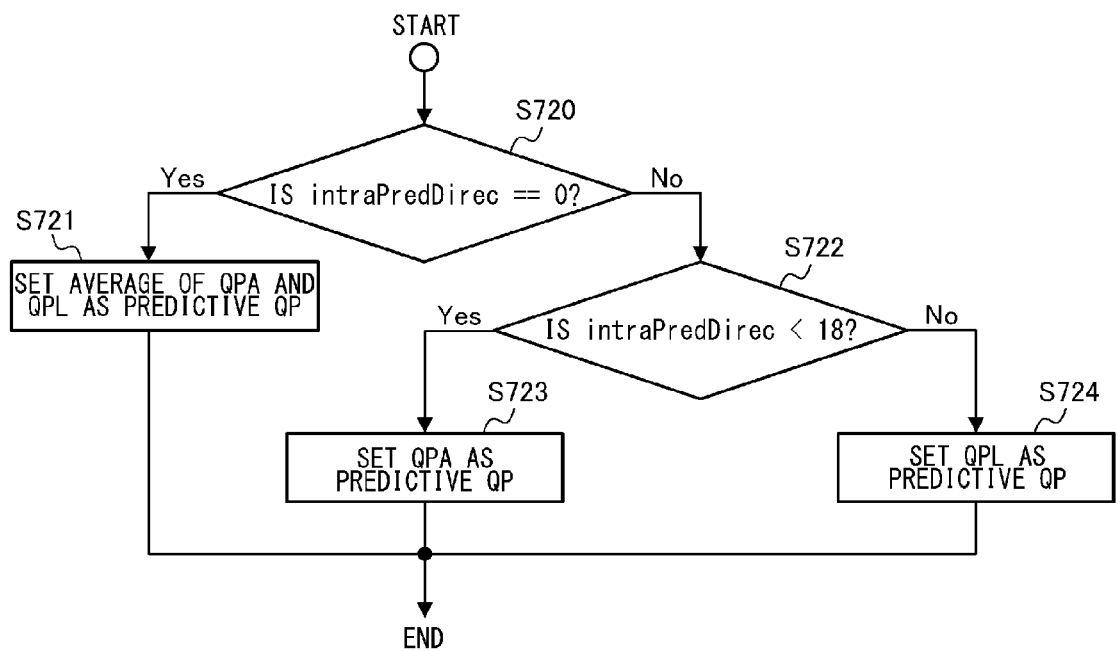
FIG. 31 is a flowchart that illustrates a detailed operation of a determination process according to an intra prediction direction in a second predictive quantization parameter deriving unit of the sixth example.

A detailed operation of the prediction of the quantization parameter according to the intra prediction direction will be described with reference to FIG. 31. First, it is determined whether or not the converted intra prediction direction is zero (step S720). The intra prediction direction is zero in a case where an intra prediction according to an average value prediction is made (Yes in step S720). In such a case, any one of the left neighboring block and the upper neighboring block is not selected with higher priority, but an average value of the quantization parameters QPL and QPA of the left and upper neighboring blocks is set as the predictive quantization parameter (step S721). On the other hand, in a case where the intra prediction direction is not zero (No in step S720), it is determined whether or not the intra prediction direction is smaller than 18 (step S722). In a case where the intra prediction direction is smaller than 18 (Yes in step S722), as illustrated in FIG. 27, the upper neighboring block is referred to, and the quantization parameter QPA of the upper neighboring block is set as the predictive quantization parameter (step S723). On the other hand, in a case where the intra prediction direction is larger than or equal to 18 (No in step S722), the left neighboring block is referred to, and the quantization parameter QPL of the left neighboring block is set as the predictive quantization parameter (step S724). The predictive quantization parameter derived in this way is supplied to the differential quantization parameter generation unit 111.

Figure 30:
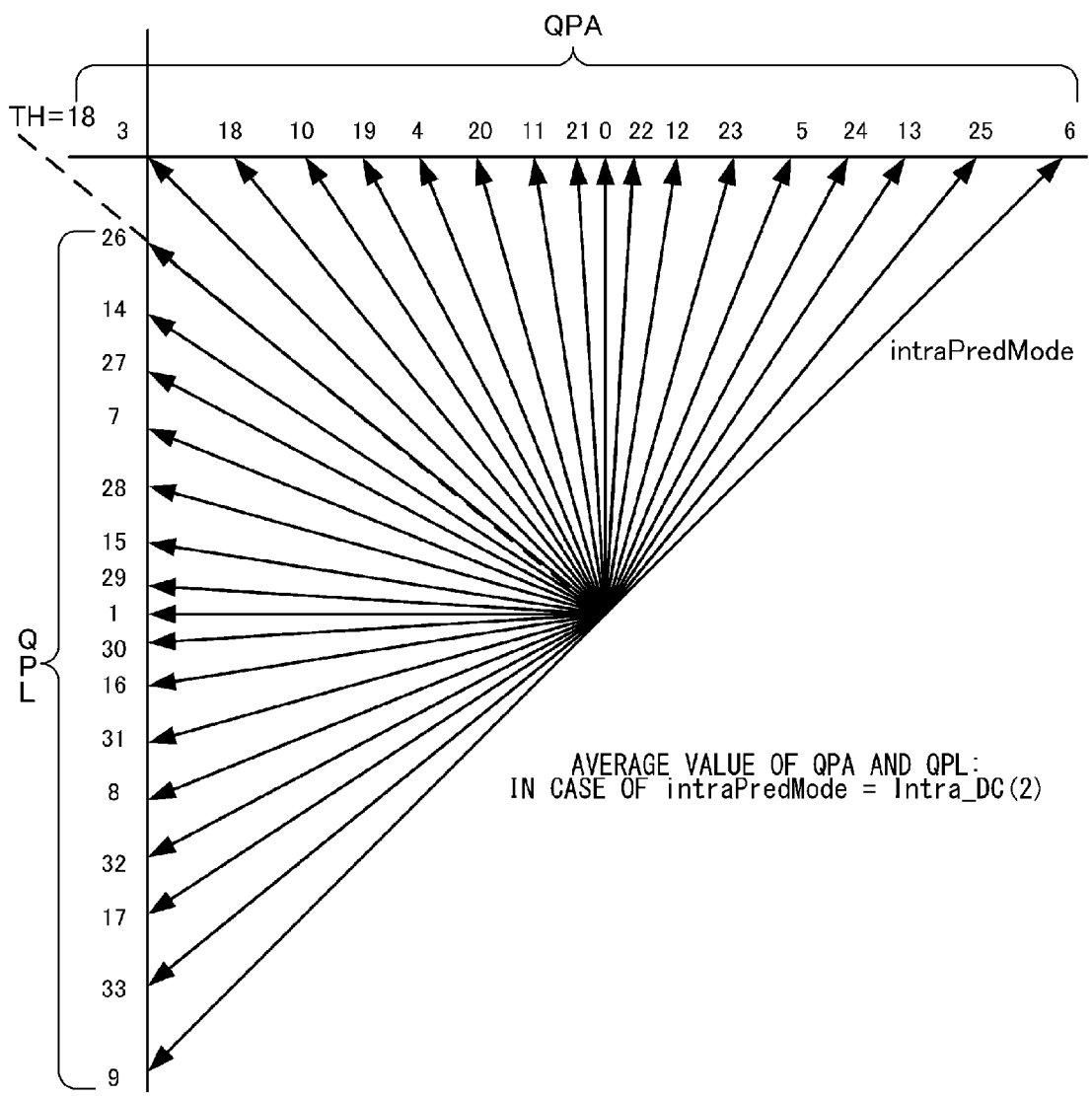
FIG. 30 is a diagram that illustrates setting of quantization parameters of neighboring blocks that are referred to in a prediction direction of an intra prediction mode of the sixth example.

As above, in the second predictive quantization parameter deriving unit 304 of the sixth example, while the quantization parameter of the left or upper neighboring block is derived as the predictive quantization parameter based on the determination of the prediction direction of the intra prediction mode illustrated in FIG. 30, a weighted average value derived by weighting the quantization parameters of the left and upper neighboring blocks may be set as the predictive quantization parameter.

Figure 32:
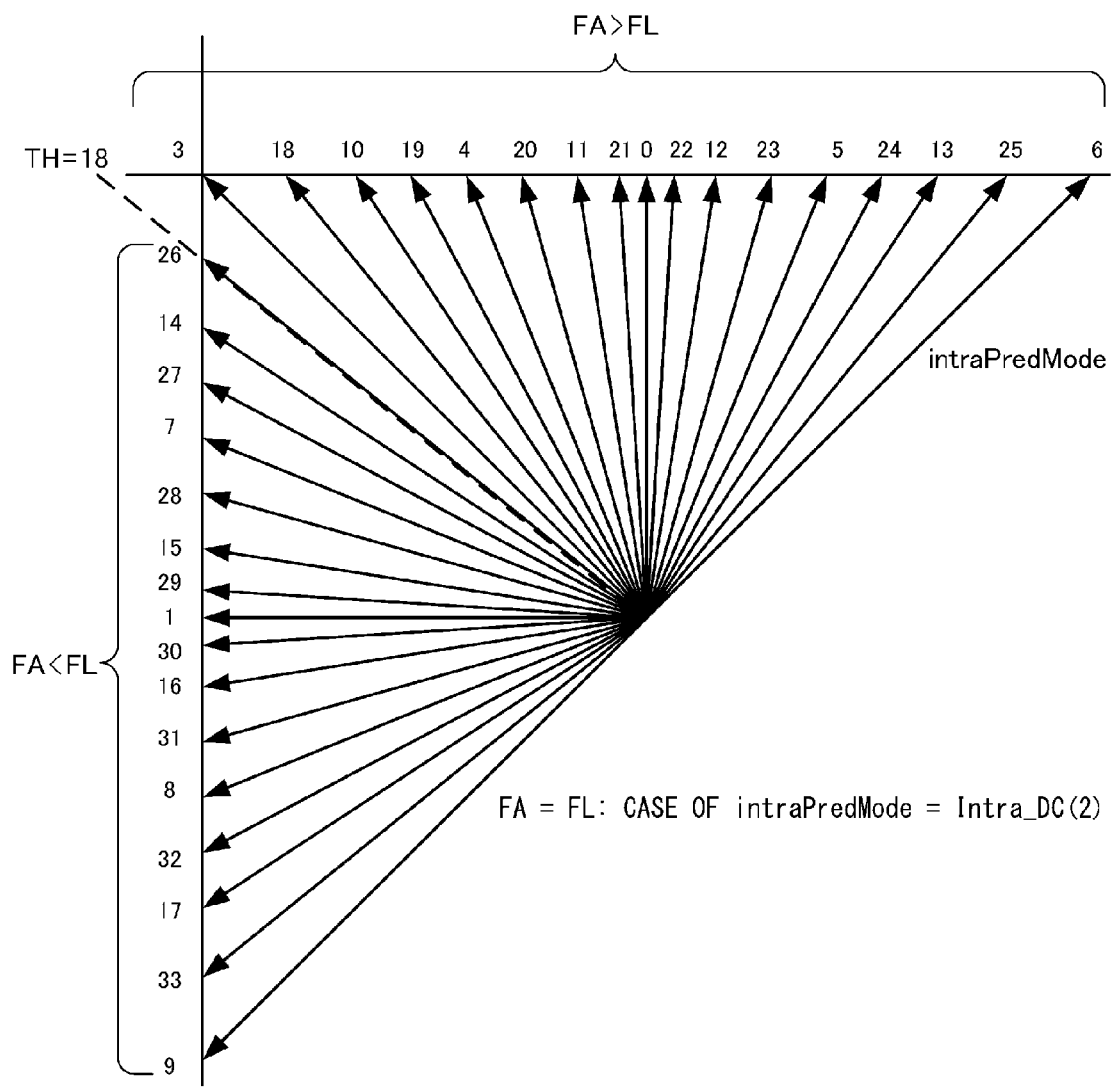
FIG. 32 is a diagram that illustrates setting of a weighting coefficient in a prediction direction of an intra prediction mode of the sixth example.

When the weighting coefficient of the quantization parameter of the upper neighboring block is represented by FA, and the weighting coefficient of the quantization parameter of the left neighboring block is represented by FL, TH (=18) is set as the threshold for the prediction direction of the intra prediction mode illustrated in FIG. 32, the weighting coefficient is set to be large for the quantization parameter of the upper neighboring block such that FA>FL in a case where the intra prediction direction is smaller than 18, and the weighting coefficient is set to be large for the quantization parameter of the left neighboring block such that FA<FL in a case where the intra prediction direction is larger than or equal to 18.

Figure 33:
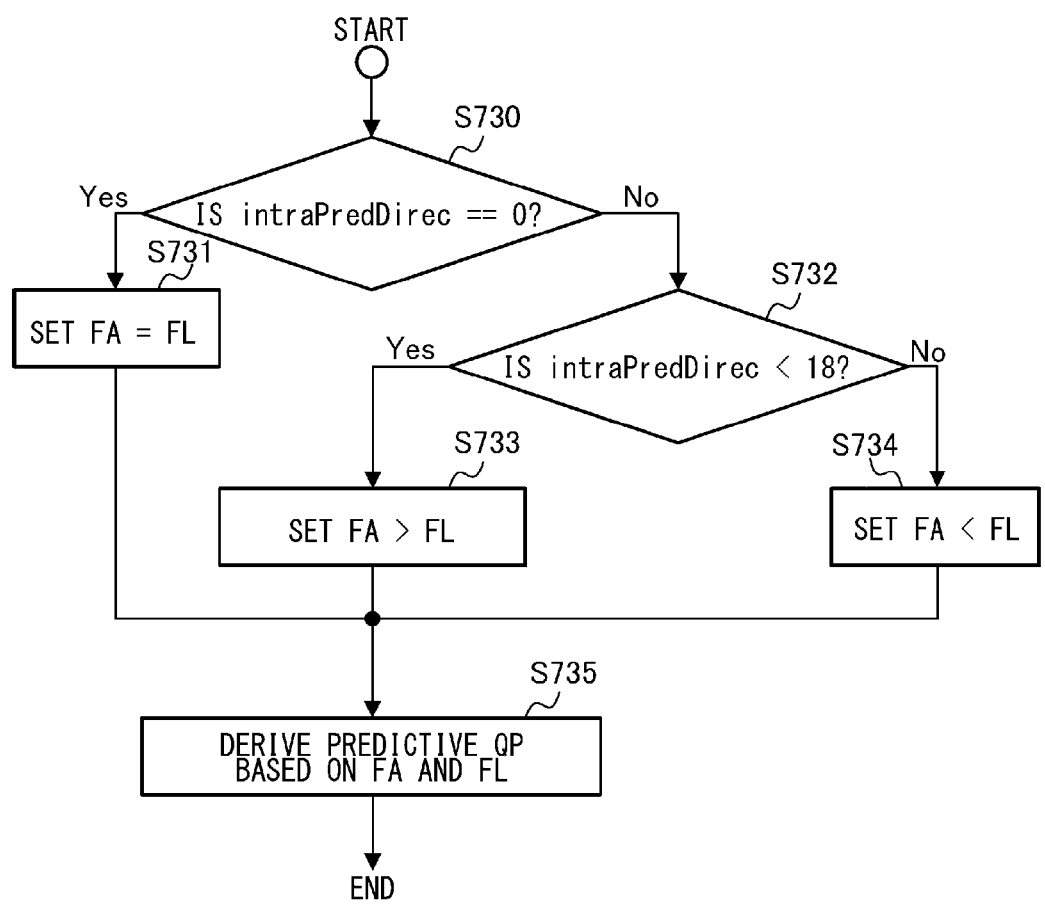
FIG. 33 is a flowchart that illustrates a detailed operation of a determination process according to an intra prediction direction in a second predictive quantization parameter deriving unit of the sixth example.

FIG. 33 is a diagram that illustrates a detailed operation of the prediction of the quantization parameter (step S709) according to the intra prediction direction illustrated in FIG. 28 that is a flowchart illustrating the operation of the second predictive quantization parameter deriving unit 304.

First, it is determined whether or not the converted intra prediction direction is zero (step S730). The intra prediction direction is zero in a case where an intra prediction according to the average value prediction is made (Yes in step S730). In such a case, one of the left and upper neighboring blocks is not selected with higher priority, but the weighting coefficients FL and FA of the quantization parameters of the left and upper neighboring blocks are set to a same value (step S731). For example, it is set such that FA=FL=2. On the other hand, in a case where the intra prediction direction is not zero (No in step S730), it is determined whether or not the intra prediction direction is smaller than 18 (step S732). In a case where the intra prediction direction is smaller than 18 (Yes in step S732), the weighting coefficient of the quantization parameter of the upper neighboring block is set to be large such that FA>FL (step S733). For example, FA is set to 3, and FL is set to 1. On the other hand, in a case where the intra prediction direction is larger than or equal to 18 (No in step S732), the weighting coefficient of the quantization parameter of the left neighboring block is set to be large such that FA<FL (step S734). For example, FA is set to 1, and FL is set to 3.

A predictive quantization parameter predQP is derived using the following equation based on the weighting coefficients and the quantization parameters determined as above (step S735).

$$predQP = \frac{FA \times QPA + FL \times QPL + 2}{4} \quad \text{[Expression 10]}$$

Here, the denominator of the equation represented above is "FA+FL", and "2" included in the numerator is the value of (FA+FL)/2 that is added for rounding off. The predictive quantization parameter derived in this way is supplied to the differential quantization parameter generation unit 111.

Here, as combinations of the weighting coefficients FA and FL, while it is set such that (FA, FL)=(3, 1), (2, 2), and (1, 3), other coefficients may be set. However, in a case where the calculation speed is of significance, variables may be selected such that FA+FL is represented as the power of 2. By performing bit shifting of the deriving equation for the above-described predictive quantization parameter, the following equation is acquired.

$$predQP=(FA \times QPA+FL \times QPL+2)>>2 \quad \text{[Expression 11]}$$

In addition, as a combination of the weighting coefficients FA and FL, in a case where (FA, FL)=(3, 1) is changed to (FA, FL)=(4, 0) and a case where (FA, FL)=(1, 3) is changed to (FA, FL)=(0, 4), the former case represents the upper neighboring block, and the latter case represents the left neighboring block, which is the same result as the sixth example. However, in the sixth example, a calculation process is performed only in a case where an average value of QPA and QPL is calculated, and, in a case where an average value is not set as the predictive quantization parameter, the quantization parameter of the left or upper neighboring block may be selected, whereby the process can be simplified and can be performed at high speed.

In addition, in the sixth example, for the reference determination of the quantization parameter of the left or upper neighboring block, while the threshold TH of the intra prediction direction is set to 18, a value other than this value may be used, and the threshold may be implicitly set as long as there is no contradiction between the moving picture coding device 100 and the moving picture decoding device 200. In addition, the threshold of the intra prediction direction may be set in header information and be changed in units of sequences, pictures, slices, or the like.

Furthermore, the number of thresholds of the prediction direction of the intra prediction mode may be increased, and the weighting coefficients of the quantization parameters of the left and upper neighboring blocks may be changed and set for each of ranges of the area of the prediction direction of the intra prediction mode that are delimited by thresholds.

Figure 34:
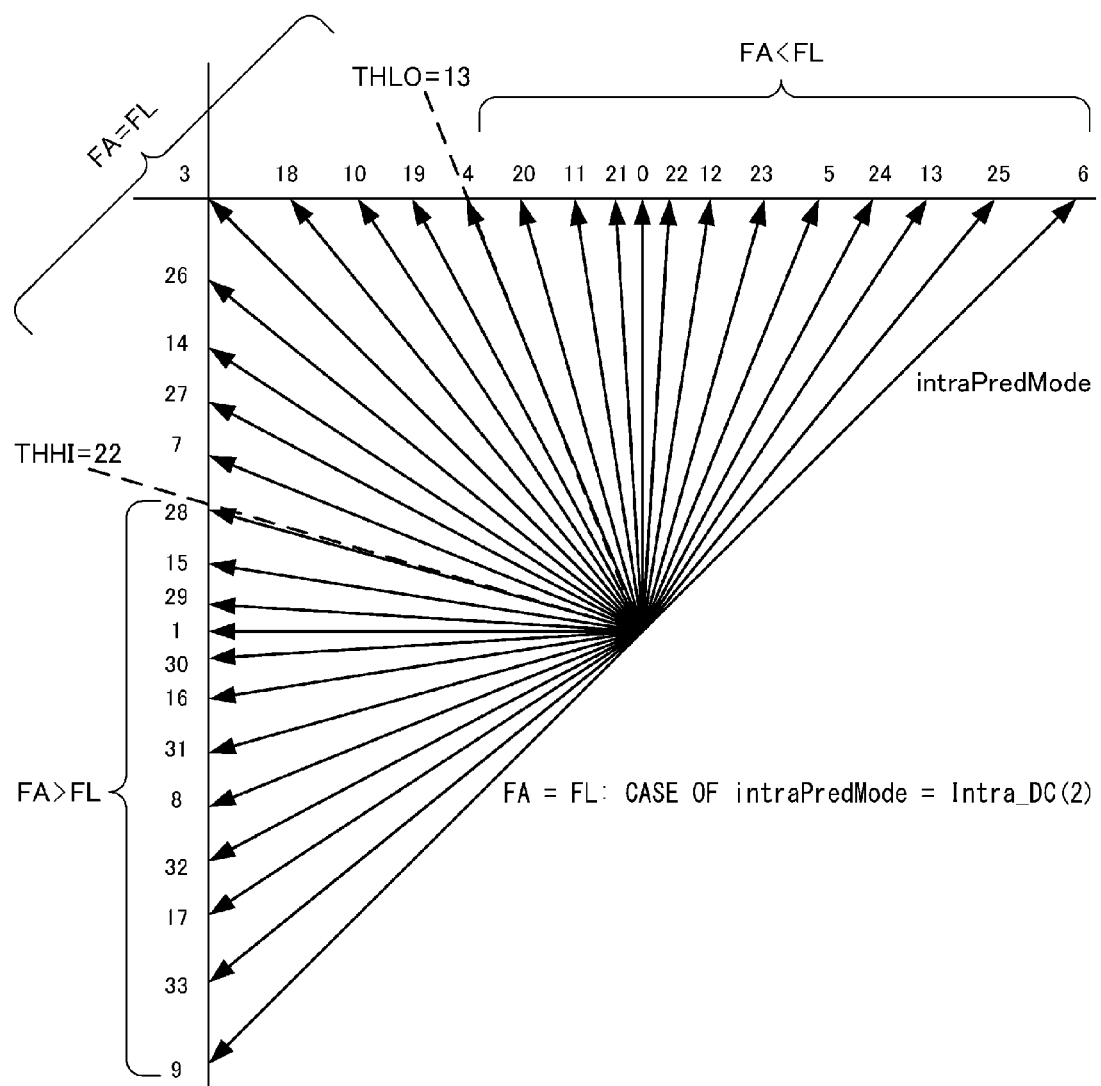
FIG. 34 is a diagram that illustrates setting of other weighting coefficients in prediction directions of intra prediction modes of the sixth example.

FIG. 34 is a diagram that illustrates an example in which the prediction directions of the intra prediction modes are divided into three areas using thresholds THLO and THHI. The thresholds THLO and THHI are illustrated by thick dotted lines in FIG. 34 and are set to have the same weighting coefficient in ranges delimited by the thresholds. In an intra prediction mode positioned to the right side of the threshold THLO, an intra prediction is made by using pixel signals of coded blocks that are mainly neighboring to the upper side of the coding block, and accordingly, the correlation with the upper neighboring block is high. On the other hand, in an intra prediction mode positioned on the lower side of the threshold THHI, an intra prediction is made by using pixel signals of coded blocks that are mainly neighboring to the left side of the coding block, and accordingly, the correlation with the left neighboring block is high. Accordingly, the weighting coefficient of the quantization parameter of the upper neighboring block is set to be large (FA>FL) in a case where the intra prediction mode is positioned on the right side of the threshold THLO, and the weighting coefficient of the quantization parameter of the left neighboring block is set to be large (FA<FL) in a case where the intra prediction mode is positioned on the lower side of the threshold THHI. In addition, in an intra prediction mode positioned between the thresholds THLO and THHI, in order not to be biased to one of the coded blocks neighboring to the left and the upper of the coding block, the weighting coefficients of the quantization parameters of the left and upper neighboring blocks are set to be equal (FA=FL). Here, the thresholds THLO and THHI are values of the intra prediction directions, and, in the sixth example, the threshold THLO is set to 13, and the threshold THHI is set to 22.

Figure 35:
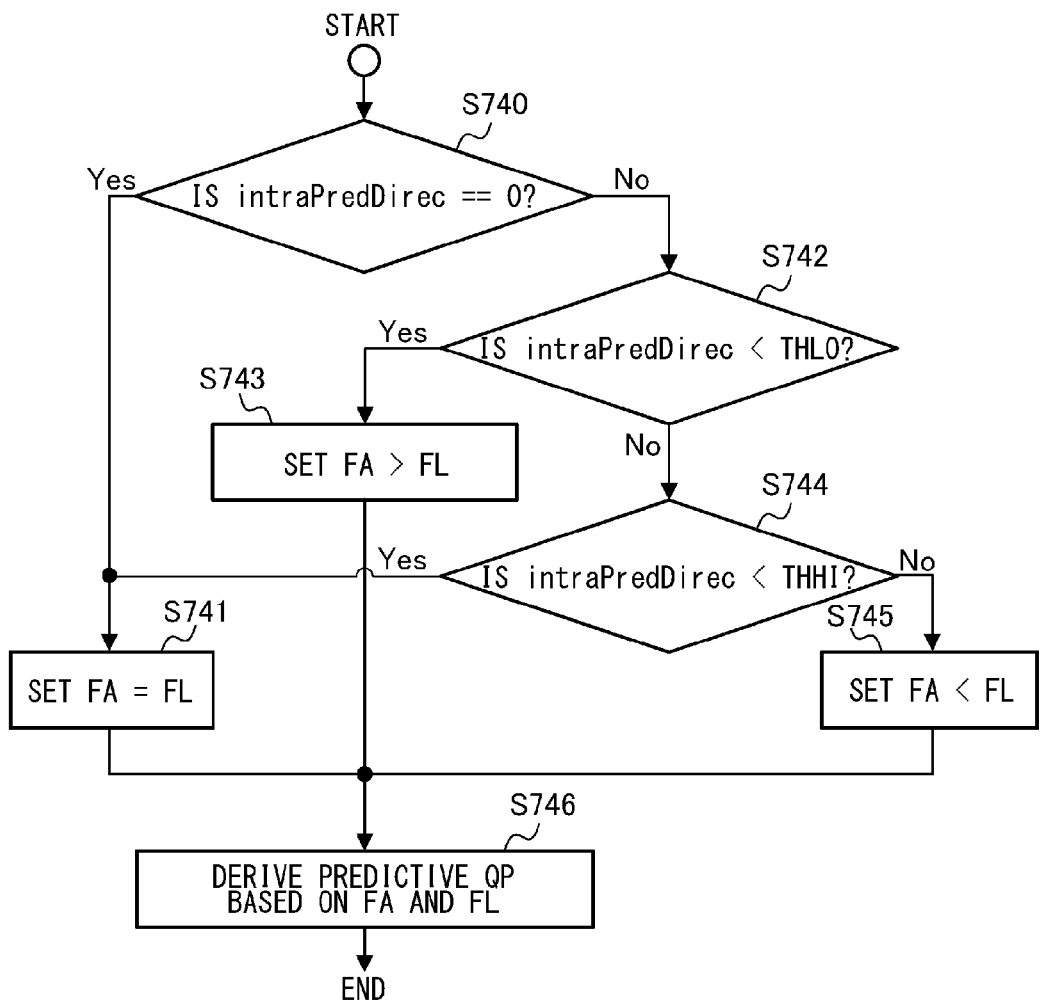
FIG. 35 is a flowchart that illustrates a detailed operation in a case where an intra prediction direction is within a predetermined range illustrated in FIG. 34 in the second predictive quantization parameter deriving unit of the sixth example.

FIG. 35 is a diagram that illustrates a detailed operation of the prediction (step S709) of the quantization parameter according to the intra prediction direction illustrated in FIG. 28 that is the flowchart illustrating the operation of the second predictive quantization parameter deriving unit 304.

First, it is determined whether or not the converted intra prediction direction is zero (step S740). The intra prediction direction is zero in a case where an intra prediction according to the average value prediction is made (Yes in step S740). In such a case, one of the left and upper neighboring blocks is not selected with higher priority, but the weighting coefficients FL and FA of the quantization parameters of the left and upper neighboring blocks are set to a same value (step S741). For example, it is set such that FA=FL=2. On the other hand, in a case where the intra prediction direction is not zero (No in step S740), first, it is determined whether or not the intra prediction direction is smaller than the threshold THLO (step S742). In a case where the intra prediction direction is smaller than the threshold THLO (Yes in step S742), the weighting coefficient of the quantization parameter of the upper neighboring block is set to be large such that FA>FL (step S743). For example, FA is set to 3, and FL is set to 1. On the other hand, in a case where the intra prediction direction is larger than or equal to the threshold THLO (No in step S742), it is determined whether or not the intra prediction direction is smaller than the threshold THHI (step S744). In a case where the intra prediction direction is not smaller than the threshold THHI, in other words, in a case where the intra prediction direction is larger than or equal to the threshold THHI (No in step S744), the weighing coefficient of the quantization parameter of the left neighboring block is set to be large such that FA<FL (step S745). For example, FA is set to 1, and FL is set to 3. In a case where the intra prediction direction is smaller than the threshold THHI (Yes in step S744), the weighting coefficients of the quantization parameters of the left and upper neighboring blocks are set to be equal, and the process proceeds to step S741.

A predictive quantization parameter predQP is derived using the following equation based on the weighting coefficients and the quantization parameters determined as above (step S746).

$$predQP = \frac{FA \times QPA + FL \times QPL + 2}{4} \quad \text{[Expression 12]}$$

Here, the denominator of the equation represented above is "FA+FL", and "2" included in the numerator is the value of (FA+FL)/2 that is added for rounding off. The predictive quantization parameter derived in this way is supplied to the differential quantization parameter generation unit 111.

Here, as combinations of the weighting coefficients FA and FL, while it is set such that (FA, FL)=(3, 1), (2, 2), and (1, 3), other coefficients may be set. However, in a case where the calculation speed is of significance, variables may be selected such that FA+FL is represented as the power of 2. By performing bit shifting of the deriving equation for the above-described predictive quantization parameter, the following equation is acquired.

$$predQP = (FA \times QPA + FL \times QPL + 2) >> 2 \quad \text{[Expression 13]}$$

As a combination of the weighting coefficients FA and FL described above, in a case where (FA, FL)=(3, 1) is changed to (FA, FL)=(4, 0) and a case where (FA, FL)=(1, 3) is changed to (FA, FL)=(0, 4), the former case represents the upper neighboring block, and the latter case represents the left neighboring block. In such a case, a calculation process for calculating an average value of QPA and QPL is performed in a prediction direction of an intra prediction mode positioned between the thresholds THLO and THHI, and in the other cases where the average value is not set as the predictive quantization parameter, the quantization parameter of the left or upper neighboring block may be selected. Accordingly, the process can be simplified and can be performed at high speed.

In addition, in the sixth example, while the thresholds THLO and THHI are respectively set to 13 and 22 as values of intra prediction directions, any other values may be used, and the thresholds may be implicitly set as long as there is no contradiction between the moving picture coding device 100 and the moving picture decoding device 200.

Furthermore, in the sixth example, while the prediction directions of the intra prediction modes are divided into three areas at the thresholds THLO and THHI, the number of the thresholds may be increased so as to increase the number of divisions. However, in a case where the calculation speed is of significance, it is preferable to select variables as the weighting coefficients FA and FL such that FA+FL is represented as the power of 2.

In addition, in the sixth example, in a case where the coding block is neighboring to the upper tree block, it has been described that the quantization parameter of a coded block disposed inside the upper tree block is prohibited from being used for the prediction, and the quantization parameter of a coded block of the tree block neighboring to the left side is used for the prediction. However, the present invention may be applied also to a case where the quantization parameter of a coded block disposed inside the left tree block in addition to that of the upper tree block is prohibited from being used for the prediction. In such a case, it can be realized by only replacing "upper side" with "left side" in the determination of being neighboring of the upper tree block of steps S701 to S703 and changing QPA to QPL in the determination branching of steps S704 to S706.

Seventh Example

The operations of the second predictive quantization parameter deriving units 304 and 205 in the seventh example will now be described. While the coding process will be described here, in the case of the decoding process, by paraphrasing coding with decoding, replacing the second predictive quantization parameter deriving unit 304 with the predictive quantization parameter deriving unit 205, replacing the memory 302 with the coding information storage memory 204, and changing the output destination of the predictive quantization parameter from the differential quantization parameter generation unit 111 to the quantization parameter generation unit 203, an equivalent process is realized. Similarly to the sixth example, in the seventh example, the quantization parameters of the left and upper coded blocks neighboring to the coding block are used for the prediction. A difference from the sixth example is that, similarly to the case where the coding block is neighboring to the upper tree block, in a case where the coding block is neighboring to the left tree block, the quantization parameter of a coded block disposed inside the left tree block is prohibited from being used for the prediction. The reason for this is that the calculation of the quantization parameter of the coding block is performed based on the coding process sequence of the coding control, and accordingly, the coding process sequences are separated between the coding blocks of tree blocks than between the coding blocks disposed inside a tree block, and, even in a case where the coding blocks are neighboring to each other between the tree blocks, the quantization parameters of the coding blocks calculated in the coding amount control may not necessarily have values close to each other and may not be appropriate as the predictive quantization parameters. Thus, in the seventh example, similarly to the second example, in a case where the coding block that is the coding target or the decoding target is neighboring to the left or upper tree block, the quantization parameter of a coded block disposed inside the left or upper tree block is not used for the prediction and is replaced with the quantization parameter of a block that is arranged previous to the coding block, which is the coding target, in the coding process sequence or has been immediately previously coded so as to be used.

Figure 36:
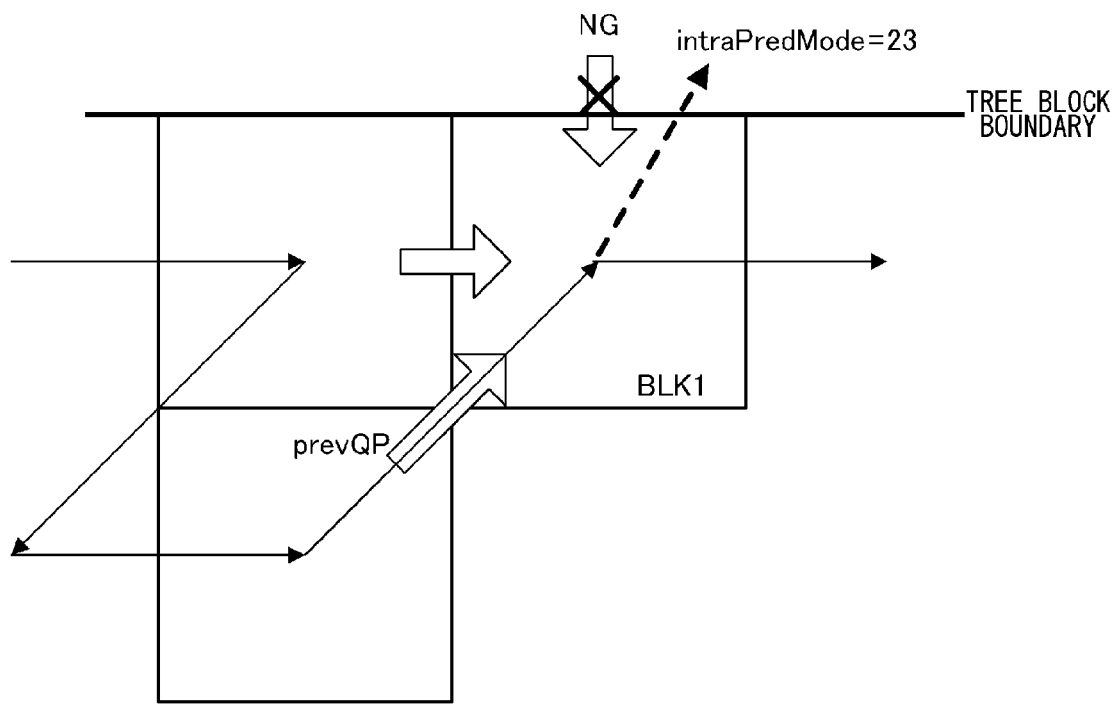
FIG. 36 is a diagram that illustrates a reference destination of a predictive quantization parameter of a coding block of a seventh example.

FIG. 36 is an enlarged diagram of the periphery of the coding block BLK1 of the inside of the divided tree block illustrated in FIG. 19. The direction of a coded block that is referred to by the coding block BLK1 illustrated in FIG. 36 is represented by a thick arrow. The solid fine line illustrated in FIG. 36 represents the coding process sequence, and the quantization parameter of a neighboring coded block disposed inside a tree block including a coding block is used for the coding block as a general rule. In addition, since a block BLK1 has the boundary being in contact with the upper tree block, the quantization parameter of a coded block that is neighboring to the upper side is not used for the prediction but is replaced with a quantization parameter prevQP of a block that is arranged previous to the coding block, which is the coding target, or has been immediately previously coded, and the quantization parameter is used for the prediction together with the quantization parameter of a coded block neighboring to the left side. Here, for the block BLK1, an intra prediction is determined as the prediction mode, and, when the intra prediction mode is assumed to be 23, the prediction direction of the intra prediction mode is represented by a thick dotted line illustrated in FIG. 36. In a case where the intra prediction mode is 23, the prediction direction is the upward direction, and accordingly, the upper neighboring block is determined to be referred to. However, since the block BLK1 has the boundary being in contract with the upper tree block, the quantization parameter of the upper neighboring block cannot be referred to, and the replacing quantization parameter of a block that is arranged previous to the coding block, which is the coding target, or has been immediately previously coded is referred to. The quantization parameter of the block that is arranged previous to the coding block, which is the coding target, or has been immediately previously coded is different from the quantization parameter of the upper neighboring block that is actually determined in the prediction direction of the intra prediction mode but is a quantization parameter that is the closest in the coding process sequence, and accordingly, deterioration of the accuracy of the predictive quantization parameter can be suppressed as much as possible. In addition, by replacing the quantization parameters of the left and upper neighboring block that is neighboring to the coding block with the quantization parameter of the block that is arranged previous to the coding block, which is the coding target, or has been immediately previously coded, non-zero quantization parameters are always present in the left and upper neighboring blocks, and accordingly, unlike the sixth example, switching between the prediction of the quantization parameter based on the intra prediction mode and another process based on whether or not both the quantization parameters of the left and upper neighboring blocks are present does not need to be performed, and the determination branching is not necessary. Accordingly, the determination process of the prediction of the quantization parameter can be configured to be simpler than that of the sixth example.

Figure 37:
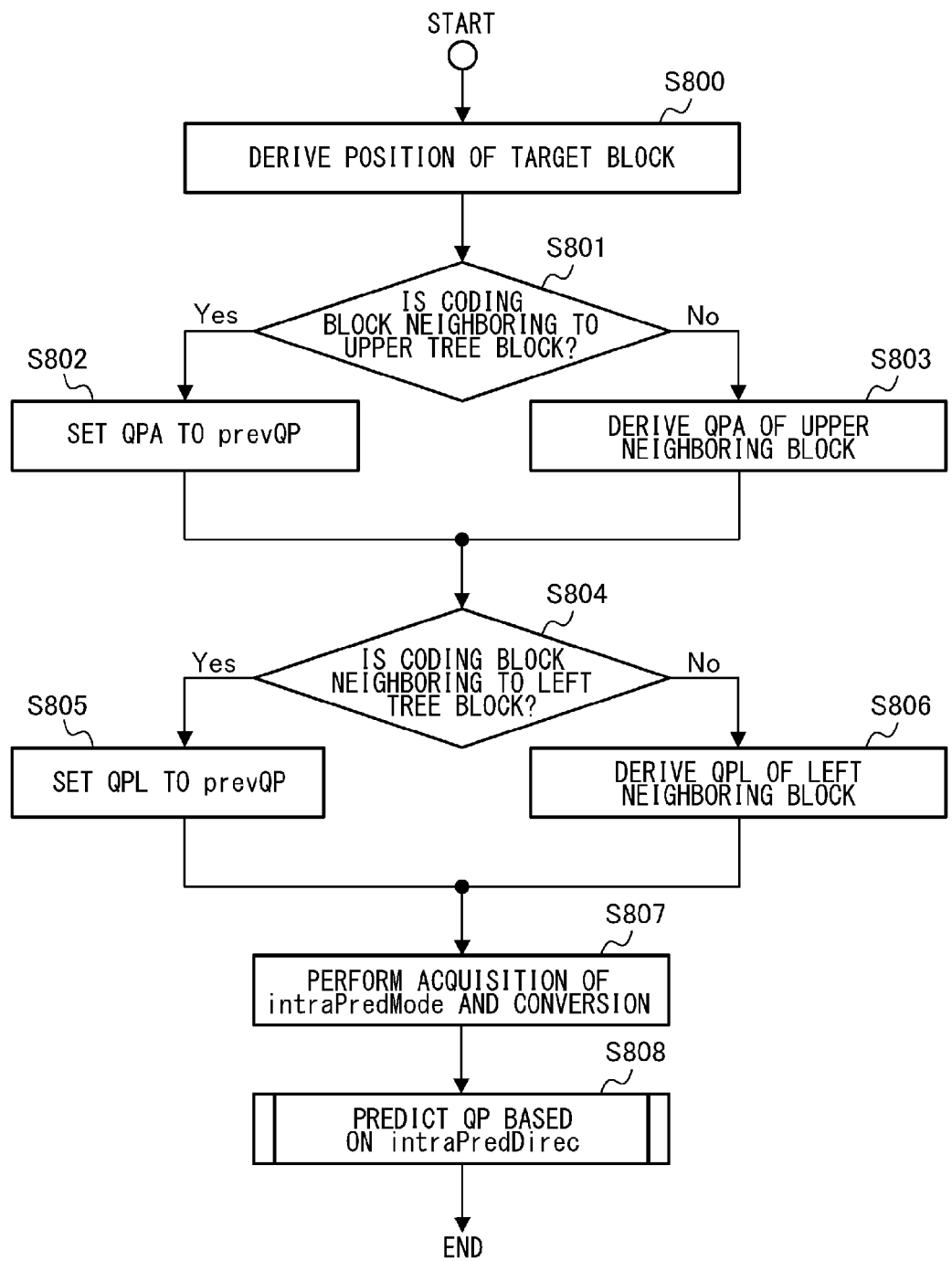
FIG. 37 is a flowchart that illustrates an operation of a second predictive quantization parameter deriving unit of the seventh example.

FIG. 37 is a flowchart that illustrates the operation of the second predictive quantization parameter deriving unit 304 of the seventh example.

First, the position information of a coding block that is the coding target is derived (step S800). As the position information of the coding block, with the upper left side of the screen being used as a starting point, the position of the upper left side of a tree block including the coding block is acquired, and the position of the coding block is acquired based on the position of the upper left side of the tree block. Next, it is determined whether or not the coding block is neighboring to an upper tree block (step S801). In a case where the coding block is neighboring to the upper tree block (Yes in step S801), in other words, in a case where the coding block is located at the upper end of the tree block, an upper neighboring block is included in the upper tree block so as to be beyond the boundary of the tree block, and accordingly, the upper neighboring block is not used for a prediction of the quantization parameter but the quantization parameter prevQP of a coding block that is arranged previous to the coding block, which is the coding target, or has been immediately previously coded is set to QPA (step S802). On the other hand, in a case where the coding block is not neighboring to the upper tree block (No in step S801), in other words, in a case where the upper neighboring block is located within the same tree block of the coding block, the quantization parameter QPA of the coded block neighboring to the upper side of the coding block is derived from the memory 302 (step S803). At this time, based on the reference position information of the upper left side of the coding block, an access to a storage area arranged in the coding information storage memory 113 is made, the quantization parameter of the corresponding neighboring coded block is supplied to the memory 302 disposed inside the predictive quantization parameter deriving unit 114, and the quantization parameter of the upper neighboring block is derived from the memory 302.

Subsequently, it is determined whether or not the coding block is neighboring to the left tree block (step S804). In a case where the coding block is neighboring to the left tree block (Yes in step S804), in other words, in a case where the coding block is located at the left end of the tree block, a block neighboring to the left side is included inside a left tree block so as to be beyond the boundary of the tree block, and accordingly, the left neighboring block is not used for a prediction of the quantization parameter, but the quantization parameter prevQP of a coding block that is arranged previous to the coding block, which is the coding target, or has been immediately previously coded is set to QPL (step S805). On the other hand, in a case where the coding block is not neighboring to the left tree block (No in step S804), in other words, in a case where the left neighboring block is located inside the same tree block of the coding block, the quantization parameter QPL of the coded block that is neighboring to the left side of the coding block is derived from the memory 302 (step S806).

Next, the intra prediction mode intraPredMode of the coding block is derived from the memory 302, and the intra prediction mode is converted into an intra prediction direction intraPredDirec (step S807). The conversion into the intra prediction direction is the same as that of the sixth example, and the description thereof will not be presented here. The quantization parameter is predicted based on the converted intra prediction direction (step S808). Here, similarly to the sixth example, the threshold TH of the prediction direction of the intra prediction mode illustrated in FIG. 30 is set to a value of the intra prediction mode of 18, and the quantization parameter of the upper neighboring block is derived as the predictive quantization parameter in a case where the intra prediction direction is smaller than 18, and the quantization parameter of the left neighboring block is derived as the predictive quantization parameter in a case where the intra prediction direction is larger than or equal to 18.

A detailed operation of the prediction of the quantization parameter according to the intra prediction direction will be described with reference to FIG. 38. First, it is determined whether or not the converted intra prediction direction is zero (step S810). The intra prediction direction is zero in a case where an intra prediction according to an average value prediction is made (Yes in step S810). In such a case, any one of the left neighboring block and the upper neighboring block is not selected with higher priority, but an average value of the quantization parameters QPL and QPA of the left and upper neighboring blocks is set as the predictive quantization parameter (step S811). On the other hand, in a case where the intra prediction direction is not zero (No in step S810), it is determined whether or not the intra prediction direction is smaller than 18 (step S812). In a case where the intra prediction direction is smaller than 18 (Yes in step S812), the upper neighboring block is referred to, and the quantization parameter QPA of the upper neighboring block is set as the predictive quantization parameter (step S813). On the other hand, in a case where the intra prediction direction is larger than or equal to 18 (No in step S812), the left neighboring block is referred to, and the quantization parameter QPL of the left neighboring block is set as the predictive quantization parameter (step S814). The predictive quantization parameter derived in this way is supplied to the differential quantization parameter generation unit 111.

Figure 38:
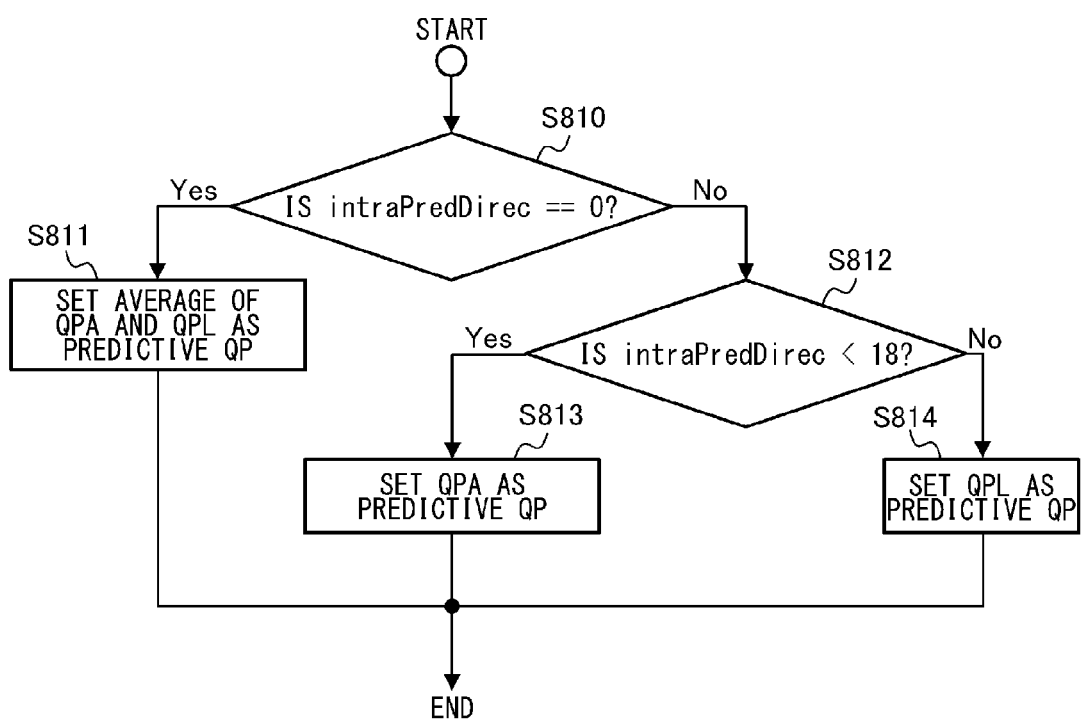
FIG. 38 is a flowchart that illustrates a detailed operation of a determination process according to an intra prediction direction in the second predictive quantization parameter deriving unit of the seventh example.

As illustrated in FIG. 38, the prediction (step S808) of the quantization parameter that is based on the intra prediction direction of the seventh example is the same as the prediction (step S709) of the quantization parameter that is based on the intra prediction direction of the sixth example.

Accordingly, in the sixth example, in a case where the weighting coefficients of the quantization parameters of the left and upper neighboring blocks are set in accordance with the prediction direction of the intra prediction mode, as illustrated in FIG. 34, even in a case where the number of thresholds of the prediction direction of the intra prediction mode is increased, and the weighting coefficients of the quantization parameters of the left and upper neighboring blocks are set for each range of the area of the prediction direction of the intra prediction mode that is delimited by thresholds, the process of the seventh example can be similarly performed, and the description thereof will not be presented here.

Eighth Example

The operations of the second predictive quantization parameter deriving units 304 and 205 in the eighth example will now be described. While the coding process will be described here, in the case of the decoding process, by paraphrasing coding with decoding, replacing the second predictive quantization parameter deriving unit 304 with the predictive quantization parameter deriving unit 205, replacing the memory 302 with the coding information storage memory 204, and changing the output destination of the predictive quantization parameter from the differential quantization parameter generation unit 111 to the quantization parameter generation unit 203, an equivalent process is realized. A difference from the first example is that, similarly to the case where the coding block that is the coding target or the decoding target is neighboring to the upper tree block, in a case where the coding block is neighboring to the left tree block, the quantization parameter of a coded block disposed inside the left tree block is prohibited from being used for the prediction. In other words, the use of the quantization parameter of a coded block that is beyond the boundary of the tree block for the prediction is limited only to a case where the quantization parameter of a block that is arranged previous to the coding block, which is the coding target, or has been immediately coded is used for the coding block of the initial coding process sequence inside the tree block. In addition, before the prediction of the quantization parameter according to the intra prediction direction is made, in a case where both the left and upper coded neighboring blocks are not present at locations beyond the boundary of the tree block, in other words, the determination of whether or not the quantization parameters of the left and upper neighboring blocks are non-zero is omitted, and, by directly predicting the quantization parameter according to the intra prediction mode, the determination process (steps S710 to S714) of a case where the prediction of the quantization parameter according to the intra prediction mode is not performed in the sixth example is eliminated.

In the eighth example, in a case where a neighboring block determined in the prediction direction of the intra prediction mode is not present at a position beyond the boundary of the tree block, a predictive quantization parameter is derived from the quantization parameter of the determined neighboring block. On the other hand, in a case where the neighboring block determined in the prediction direction of the intra prediction mode is present at a position beyond the boundary of the tree block, the quantization parameter of the determined neighboring block cannot be used. Accordingly, it is determined whether the quantization parameter of the other neighboring block or the quantization parameter of a block that is arranged previous to the coding block, which is the coding target, or has been immediately previously coded is valid, and the quantization parameter determined to be valid is derived as a predictive quantization parameter.

Figure 39:
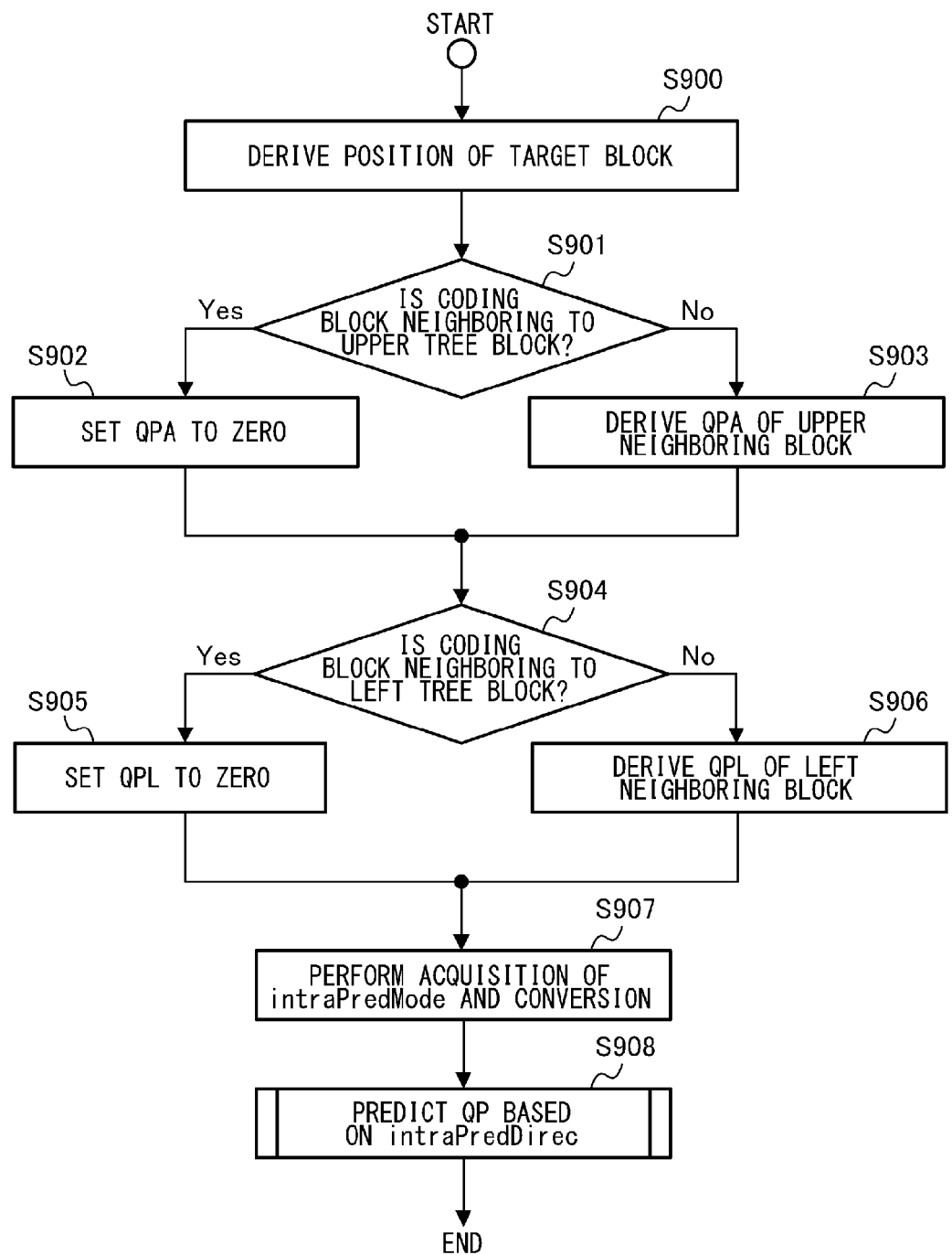
FIG. 39 is a flowchart that illustrates an operation of a first predictive quantization parameter deriving unit of an eighth example.

FIG. 39 is a flowchart that illustrates the operation of the first predictive quantization parameter deriving unit 303 of the eighth example. Steps S900 to S903 and S907 of the flowchart illustrated in FIG. 39 are the same as steps S700 to S703 and S708 of the sixth example illustrated in FIG. 28, and steps S904 to S906 are the same as steps S804 to S806 of the seventh example illustrated in FIG. 37, and thus the description thereof will not be presented here, and only the detailed operation of the prediction of the quantization parameter according to the intra prediction direction that is made in step S908 will be described.

Figure 40:
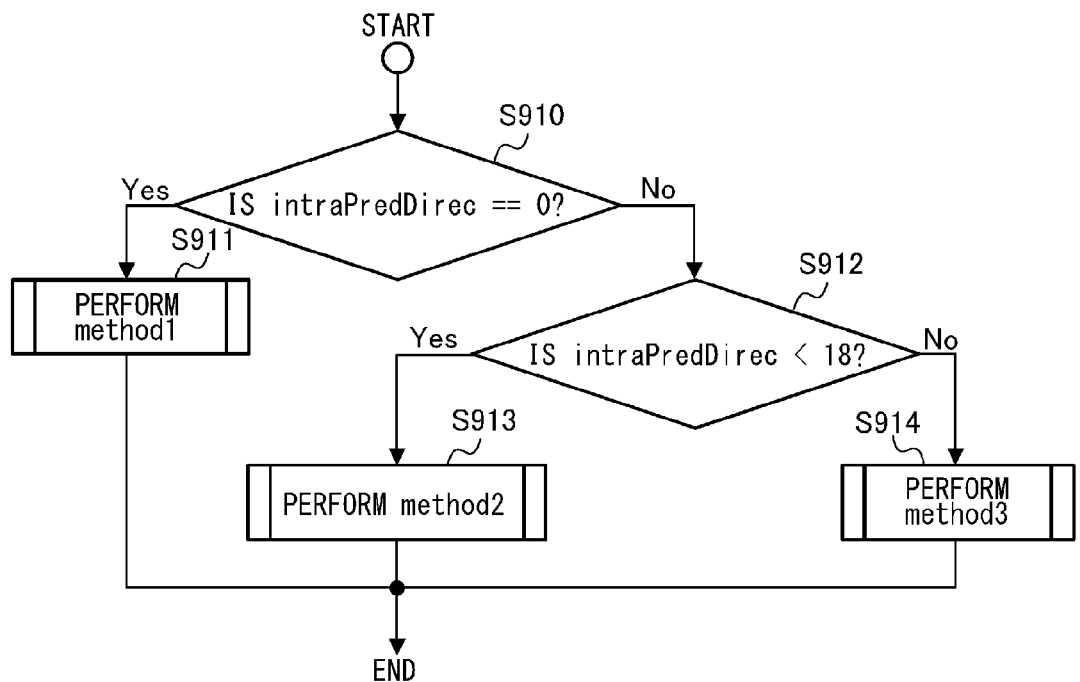
FIG. 40 is a flowchart that illustrates a detailed operation of a determination process according to an intra prediction direction in the second predictive quantization parameter deriving unit of the eighth example.

A detailed operation of the prediction of the quantization parameter according to the intra prediction direction, which is performed (step S908), will be described with reference to FIG. 40. Here, similarly to the sixth example, the threshold TH of the prediction direction of the intra prediction mode illustrated in FIG. 30 is set to a value of the intra prediction mode of 18, and the predictive quantization parameter is derived by switching between predictions of the quantization parameter in accordance with the intra prediction direction using the threshold TH.

First, it is determined whether or not the converted intra prediction direction is zero (step S910). The intra prediction direction is zero in a case where an intra prediction according to the average value prediction is made (Yes in step S910). In such a case, the process proceeds to method1 (step S911). On the other hand, in a case where the intra prediction direction is not zero (No in step S910), it is determined whether or not the intra prediction direction is smaller than 18 (step S912). In a case where the intra prediction direction is smaller than 18 (Yes in step S912), the process proceeds to method2 (step S913). On the other hand, in a case where the intra prediction direction is larger than or equal to 18 (No in step S912), the process proceeds to method3 (step S914).

Figure 41:
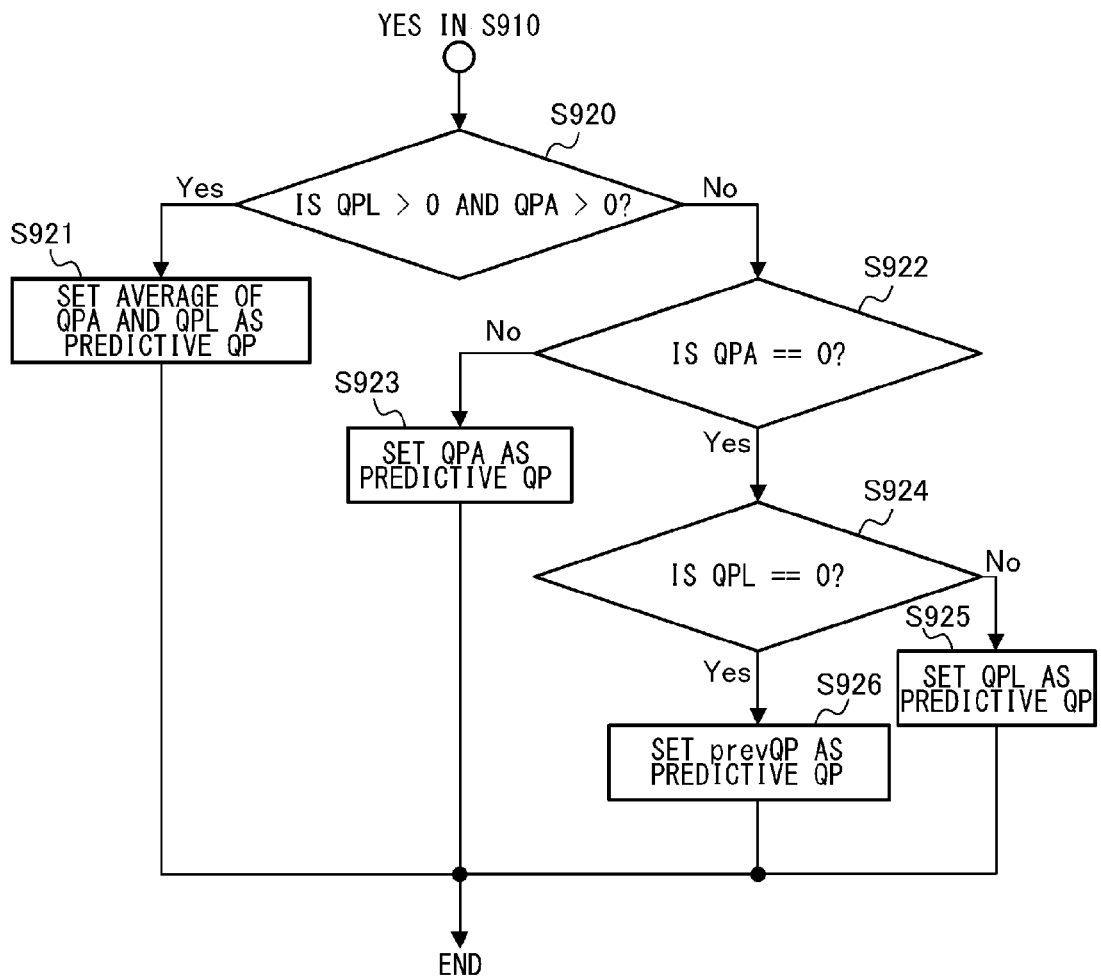
FIG. 41 is a flowchart that illustrates a detailed operation of a case where the intra prediction direction is zero in the second predictive quantization parameter deriving unit of the eighth example.

First, the process of method1 will be described with reference to FIG. 41. The intra prediction direction is determined to be zero (Yes in step S910) in step S910 in a case where an intra prediction according to the average value prediction is made. In such a case, any one of the left neighboring block and the upper neighboring block is not selected with higher priority, but an average value of the quantization parameters QPL and QPA of the left and upper neighboring blocks is set as the predictive quantization parameter, and accordingly, first, it is determined whether or not both the quantization parameters of the left and upper neighboring blocks are positive (step S920). In a case where both the quantization parameters of the left and upper neighboring blocks are positive (Yes in step S920), the neighboring blocks disposed on both the left side and the upper side are present. Accordingly, by referring to a neighboring block designated by the direction represented in the intra prediction mode, the quantization parameter can be derived, and, an average value of the quantization parameters QPL and QPA of the left and upper neighboring blocks is set as a predictive quantization parameter (step S921).

On the other hand, in a case where both the quantization parameters of the left and upper neighboring blocks are not positive (No in step S920), in other words, in a case where the quantization parameter of at least one of the left neighboring block and the upper neighboring block is zero, at least one of the left neighboring block and the upper neighboring block is not present. Thus, an average value of the quantization parameters QPL and QPA of the left and upper neighboring blocks cannot be set as the predictive quantization parameter. Accordingly, based on the presence/ no-presence of the left or upper neighboring blocks, in other words, based on whether or not the quantization parameter of the left or upper neighboring block is zero, the quantization parameter that can be taken is set as the predictive quantization parameter.

First, it is determined whether or not the quantization parameter of the upper neighboring block is zero (step S922). In a case where the quantization parameter of the upper neighboring block is not zero (No in step S922), the quantization parameter of the upper neighboring block is set as a predictive quantization parameter (step S923). On the other hand, in a case where the quantization parameter of the upper neighboring block is zero (Yes in step S922), the quantization parameter of the upper neighboring block cannot be referred to as the predictive quantization parameter, and the process proceeds to the determination process of step S924. Next, it is determined whether or not the quantization parameter of the left neighboring block is zero (step S924). In a case where the quantization parameter of the left neighboring block is not zero (No in step S924), the quantization parameter of the left neighboring block is set as a predictive quantization parameter (step S925). On the other hand, in a case where the quantization parameter of the left neighboring block is zero (Yes in step S924), in other words, in a case where both the quantization parameters of the left and upper neighboring blocks are zero, the quantization parameters of both the blocks are not present, and accordingly, the quantization parameters of the left and upper neighboring blocks cannot be referred to as the predictive quantization parameter. Thus, the quantization parameter prevQP of a block that is arranged previous to the coding block, which is the coding target, or has been immediately previously coded is set as the predictive quantization parameter (step S926). In addition, in a case where a block disposed at the upper left end of the picture is the coding block, the left and upper neighboring blocks and furthermore a block that is arranged previous to the coding block that is the coding target or has been immediately previously coded are not present, and accordingly, the quantization parameter of the picture or the slice is set as the predictive quantization parameter.

Figure 42:
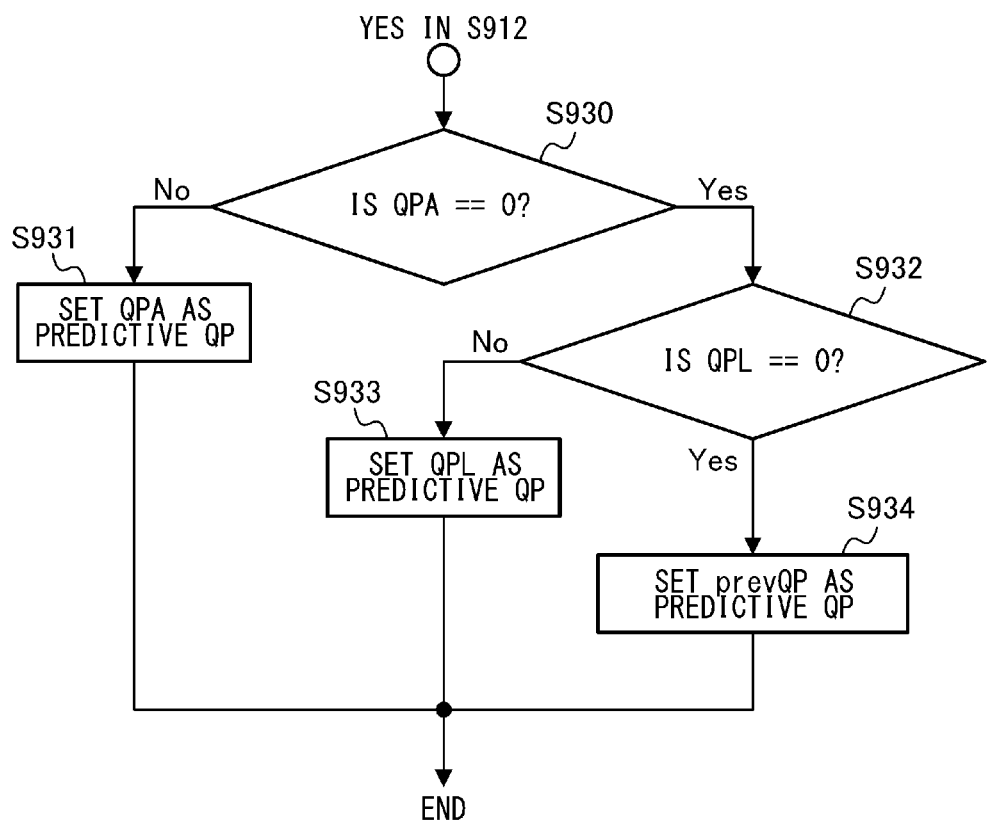
FIG. 42 is a flowchart that illustrates a detailed operation of a case where the intra prediction direction is smaller than 18 in the second predictive quantization parameter deriving unit of the eighth example.

Next, the process of method2 will be described with reference to FIG. 42. In step S912, since it has been determined that the intra prediction direction is smaller than 18 (Yes in step S912), in order to select the quantization parameter of the upper coded neighboring block as the predictive quantization parameter, first, it is determined whether or not the quantization parameter of the upper neighboring block is zero (step S930). In a case where the quantization parameter of the upper neighboring block is not zero (No in step S930), the quantization parameter of the upper neighboring block is set as a predictive quantization parameter (step S931). On the other hand, in a case where the quantization parameter of the upper neighboring block is zero (Yes in step S930), the quantization parameter of the upper neighboring block cannot be referred to as the predictive quantization parameter, and the process proceeds to the determination process of step S932. Next, it is determined whether or not the quantization parameter of the left neighboring block is zero (step S932). In a case where the quantization parameter of the left neighboring block is not zero (No in step S932), the quantization parameter of the left neighboring block is set as a predictive quantization parameter (step S933). On the other hand, in a case where the quantization parameter of the left neighboring block is zero (Yes in step S932), in other words, in a case where both the quantization parameters of the left and upper neighboring blocks are zero, the quantization parameters of both the blocks are not present, and accordingly, the quantization parameters of the left and upper neighboring blocks cannot be referred to as the predictive quantization parameter. Thus, the quantization parameter prevQP of a block that is arranged previous to the coding block, which is the coding target, or has been immediately previously coded is set as the predictive quantization parameter (step S934). In addition, in a case where a block disposed at the upper left end of the picture is the coding block, the left and upper neighboring blocks and furthermore a block that is arranged previous to the coding block, which is the coding target or has been immediately previously coded are not present, and accordingly, the quantization parameter of the picture or the slice is set as the predictive quantization parameter.

Figure 43:
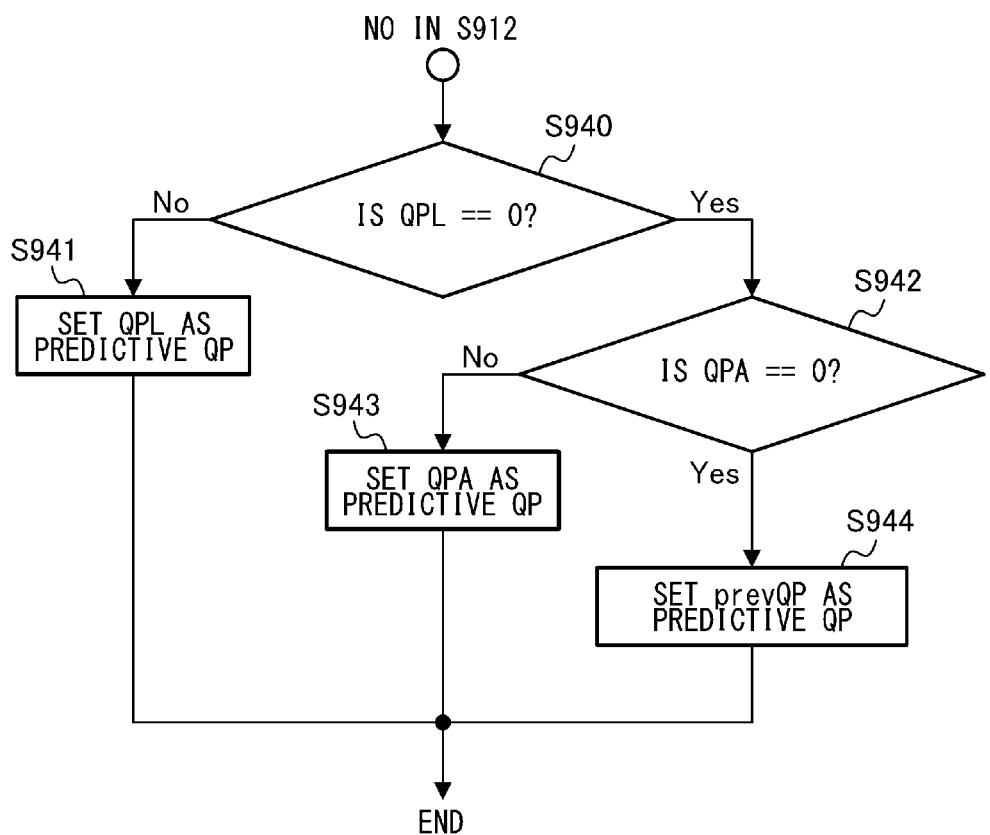
FIG. 43 is a flowchart that illustrates a detailed operation of a case where the intra prediction direction is larger than or equal to 18 in the second predictive quantization parameter deriving unit of the eighth example.

Subsequently, the process of method3 will be described with reference to FIG. 43. In step S912, since it has been determined that the intra prediction direction is larger than or equal to 18 (No in step S912), in order to select the quantization parameter of the left coded neighboring block as the predictive quantization parameter, first, it is determined whether or not the quantization parameter of the left neighboring block is zero (step S940). In a case where the quantization parameter of the left neighboring block is not zero (No in step S940), the quantization parameter of the left neighboring block is set as a predictive quantization parameter (step S941). On the other hand, in a case where the quantization parameter of the left neighboring block is zero (Yes in step S940), the quantization parameter of the left neighboring block cannot be referred to as the predictive quantization parameter, and the process proceeds to the determination process of step S942. Next, it is determined whether or not the quantization parameter of the upper neighboring block is zero (step S942). In a case where the quantization parameter of the upper neighboring block is not zero (No in step S942), the quantization parameter of the upper neighboring block is set as a predictive quantization parameter (step S943). On the other hand, in a case where the quantization parameter of the upper neighboring block is zero (Yes in step S942), in other words, in a case where both the quantization parameters of the left and upper neighboring blocks are zero, the quantization parameters of both the blocks are not present, and accordingly, the quantization parameters of the left and upper neighboring blocks cannot be referred to as the predictive quantization parameter. Thus, the quantization parameter prevQP of a block that is arranged previous to the coding block, which is the coding target, or has been immediately previously coded is set as the predictive quantization parameter (step S944). In addition, in a case where a block disposed at the upper left end of the picture is the coding block, the left and upper neighboring blocks and furthermore a block that is arranged previous to the coding block, which is the coding target, or has been immediately previously coded are not present, and accordingly, the quantization parameter of the picture or the slice is set as the predictive quantization parameter.

In each method branched in the intra prediction direction as above, in a case where the quantization parameter of the neighboring block determined in the intra prediction direction is zero, the quantization parameter prevQP of a block that is arranged previous to the coding block, which is the coding target, or has been immediately previously coded may be set as the predictive quantization parameter without making a subsequent determination so as to simplify the determination process. In method1, it is determined whether or not both the quantization parameters of the left and upper neighboring blocks are positive (step S920), and, in a case where both the quantization parameters of the left and upper neighboring blocks are not positive (No in step S920), the quantization parameter prevQP of a block that is arranged previous to the coding block, which is the coding target, or has been immediately previously coded is set as the predictive quantization parameter (step S926) without performing a determination process of step S922 and subsequent steps. In method2, it is determined whether or not the quantization parameter of the upper neighboring block is zero (step S930), and, in a case where the quantization parameter is zero (Yes in step S930), the quantization parameter prevQP of a block that is arranged previous to the coding block, which is the coding target, or has been immediately previously coded is set as the predictive quantization parameter (step S934) without performing the determination process of step S932 and subsequent steps. In method3, it is determined whether or not the quantization parameter of the left neighboring block is zero (step S940), and, in a case where the quantization parameter is zero (Yes in step S940), the quantization parameter prevQP of a block that is arranged previous to the coding block, which is the coding target, or has been immediately previously coded is set as the predictive quantization parameter (step S944) without performing the determination process of step S942 and subsequent steps.

The predictive quantization parameter derived in this way is supplied to the differential quantization parameter generation unit 111.

The prediction (step S908) of the quantization parameter that is based on the intra prediction direction of the eighth example, similarly to the prediction (step S709) of the quantization parameter that is based on the intra prediction direction of the sixth example, can be similarly performed in a case where the weighting coefficients of the quantization parameters of the left and upper neighboring blocks are set in accordance with the prediction direction of the intra prediction mode, as illustrated in FIG. 34, even in a case where the number of thresholds of the prediction direction of the intra prediction mode is increased, and the weighting coefficients of the quantization parameters of the left and upper neighboring blocks are set for each range of the area of the prediction direction of the intra prediction mode that is delimited by thresholds. Here, as illustrated in FIG. 34, as an example of a case where the number of thresholds of the prediction direction of the intra prediction mode is increased, and the weighting coefficients of the quantization parameters of the left and upper neighboring blocks are set for each range of the area of the prediction direction of the intra prediction mode delimited by thresholds, a case applied to the prediction (step S908) of the quantization parameter that is based on the intra prediction direction will be described. The other examples described in the sixth example can be also applied similarly to a case to be described below in which the eighth example is applied, and the description thereof will not be presented here.

Figure 44:
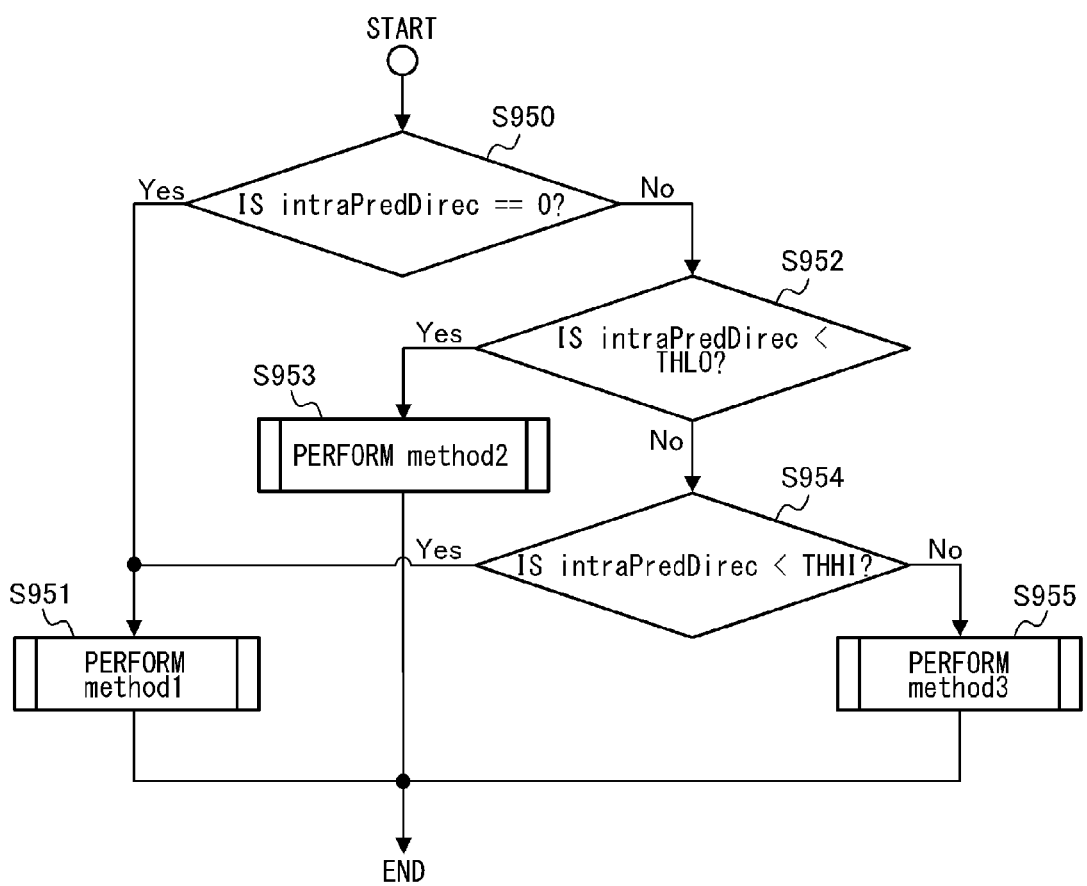
FIG. 44 is a flowchart that illustrates a detailed operation of switching between weighting coefficients in a determination process of a case where the intra prediction direction is zero in the second predictive quantization parameter deriving unit of the eighth example.

FIG. 44 is a flowchart that illustrates a detailed operation of the prediction (step S908) of the quantization parameter that is based on the intra prediction direction in a case where, as illustrated in FIG. 34, the number of thresholds of the prediction direction of the intra prediction mode is increased, and the weighting coefficients of the quantization parameters of the left and upper neighboring blocks are set for each range of the area of the prediction direction of the intra prediction mode that is delimited by thresholds. Similarly to the sixth example, the prediction direction of the intra prediction mode illustrated in FIG. 34 is divided into three areas using thresholds THLO and THHI, the thresholds THLO and THHI are respectively set to 13 and 22, and the predictive quantization parameter is derived by switching between predictions of the quantization parameters determined for each area in which the intra prediction direction is delimited by the thresholds.

First, it is determined whether or not the converted intra prediction direction is zero (step S950). The intra prediction direction is zero in a case where an intra prediction according to the average value prediction is made (Yes in step S950). In such a case the process proceeds to method1 (step S951). On the other hand, in a case where the intra prediction direction is not zero (No in step S950), it is determined whether or not the intra prediction direction is smaller than the threshold THLO (step S952). In a case where the intra prediction direction is smaller than the threshold THLO (Yes in step S952), the process proceeds to method2 (step S953). On the other hand, in a case where the intra prediction direction is larger than or equal to the threshold THLO (No in step S952), it is determined whether or not the intra prediction direction is smaller than the threshold THHI (step S954). In a case where the intra prediction direction is not smaller than the threshold THHI, in other words, in a case where the intra prediction direction is larger than or equal to the threshold THHI (No in step S954), the process proceeds to method3 (step S955). On the other hand, in a case where the intra prediction direction is smaller than the threshold THHI (Yes in step S954), in order to equalize the weighing coefficients of the quantization parameters of the left and upper neighboring blocks, the process proceeds to step S951.

Figure 45:
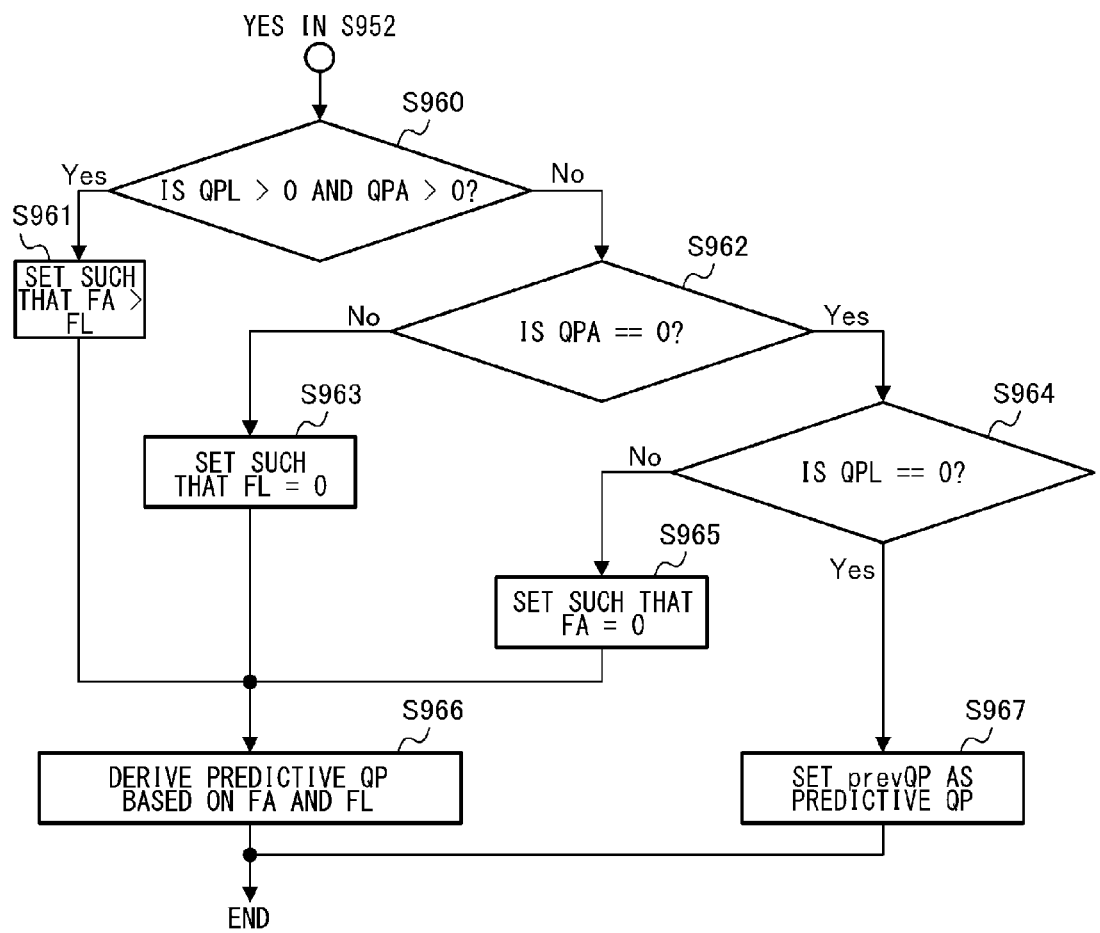
FIG. 45 is a flowchart that illustrates a detailed operation of switching among weighting coefficients in the determination process according to the intra prediction direction illustrated in FIG. 34 in a second predictive quantization parameter deriving unit of the eighth example.

Next, a detailed operation of method2 (step S953) will be described. FIG. 45 is a flowchart that illustrates the detailed operation of method2 (step S953). In a case where a weighted average is acquired, both the left and upper neighboring blocks need to be present. Accordingly, it is determined whether or not both the quantization parameters of the left and upper neighboring blocks are positive (step S960). In a case where both the quantization parameters of the left and upper neighboring blocks are positive (Yes in step S960), the neighboring blocks of both the left and the upper side are present, and accordingly, the weighting coefficient of the quantization parameter of the upper neighboring block is set to be large such that FA>FL>0 (step S961). For example, FA is set to 3, and FL is set to 1. On the other hand, in a case where both the quantization parameters of the left and upper neighboring blocks are not positive (No in step S960), in other words, in a case where the quantization parameter of at least one of the left and upper neighboring blocks is zero, at least one of the left and upper neighboring blocks is not present. Accordingly, the weighted average cannot be acquired based on the quantization parameters of the left and upper neighboring blocks, and thus, an acquired quantization parameter based on the presence/no-presence of the left or upper neighboring block, in other words, based on whether or not the quantization parameter of the left or upper neighboring block is zero is set as the predictive quantization parameter. First, it is determined whether or not the quantization parameter of the upper neighboring block is zero (step S962).

In a case where the quantization parameter of the upper neighboring block is not zero (No in step S962), in order to set the quantization parameter of the upper neighboring block as a predictive quantization parameter, the weighting coefficient FL of the quantization parameter of the left neighboring block is set to zero (step S963). For example, FA is set to 4, and FL is set to 0. On the other hand, in a case where the quantization parameter of the left neighboring block is zero (Yes in step S962), the quantization parameter of the upper neighboring block cannot be referred to as the predictive quantization parameter, and accordingly, the process proceeds to a determination process of step S964. Next, it is determined whether or not the quantization parameter of the left neighboring block is zero (step S964). In a case where the quantization parameter of the left neighboring block is not zero (No in step S964), in order to set the quantization parameter of the left neighboring block as a predictive quantization parameter, the weighting coefficient FA of the quantization parameter of the upper neighboring block is set to zero (step S965). For example, FA is set to 4, and FL is set to 0. On the other hand, in a case where the quantization parameter of the left neighboring block is zero (Yes in step S964), in other words, both the quantization parameters of the left and upper neighboring blocks are zero, and both neighboring blocks are not present, and accordingly, the quantization parameter of the left and right-side neighboring blocks cannot be referred to as the predictive quantization parameter. Thus, the quantization parameter prevQP of a block that is arranged previous to the coding block, which is the coding target, or has been immediately previously coded is set as the predictive quantization parameter (step S967). In a case where the weighting coefficients of the quantization parameters of the left and upper neighboring blocks are set, the predictive quantization parameter predQP is derived using the following equation based on the determined weighting coefficients and each quantization parameter (step S966).

$$predQP = \frac{FA \times QPA + FL \times QPL + 2}{4} \quad \text{[Expression 14]}$$

Here, the denominator of the equation represented above is "FA+FL", and "2" included in the numerator is the value of (FA+FL)/2 that is added for rounding off. The predictive quantization parameter derived in this way is supplied to the differential quantization parameter generation unit 111.

In addition, method1 (step S951) and method3 (step S955) are realized by the same determination process as that of method2. However, it is necessary to set the weighting coefficients of the quantization parameters of the left and upper neighboring blocks in step S961 such that "FA=FL≠0" in method1, and "0<FA<FL" in method3.

Here, coefficients other than the combination of the weighting coefficients FA and FL may be set. However, in a case where the calculation speed is of significance, variables may be selected such that FA+FL is represented as the power of 2. By performing bit shifting of the deriving equation for the above-described predictive quantization parameter, the following equation is acquired.

predQP=(FA×QPA+FL×QPL+2)>>2    [Expression 15]

As a combination of the weighting coefficients FA and FL described above, in a case where (FA, FL)=(3, 1) is changed to (FA, FL)=(4, 0) and a case where (FA, FL)=(1, 3) is changed to (FA, FL)=(0, 4), the former case represents the upper neighboring block, and the latter case represents the left neighboring block. In such a case, in a case where a calculation process calculating an average value of the quantization parameters QPA and QPL in the prediction direction of the intra prediction mode positioned between the thresholds THLO and THHI is performed, and the other average value is not set as the predictive quantization parameter, the process can be realized by only selecting the quantization parameter of the left or upper neighboring block. Therefore, the process can be simplified and can be performed at high speed.

In addition, in the eighth example, while the thresholds THLO and THHI are respectively set to 13 and 22 as values of intra prediction directions, any other values may be used, and the thresholds may be implicitly set as long as there is no contradiction between the moving picture coding device 100 and the moving picture decoding device 200.

Furthermore, in the eighth example, while the prediction directions of the intra prediction modes are divided into three areas at the thresholds THLO and THHI, the number of the thresholds may be increased so as to increase the number of divisions. However, in a case where the calculation speed is of significance, it is preferable to select variables as the weighting coefficients FA and FL such that FA+FL is represented as the power of 2.

Ninth Example

In the sixth and eight examples, there are cases where a neighboring block determined based on the prediction direction of the intra prediction mode of a coding block that is the coding target is located at a position beyond the boundary of the tree block. In the sixth example, in order to enable the prediction of the quantization parameter according to the intra prediction mode, it is determined in advance whether or not both the left and upper neighboring blocks are located at positions beyond the boundary of the tree block, and a prediction of the quantization parameter according to the intra prediction mode is made only in a case where both the left and upper neighboring blocks are not located at positions beyond the boundary of the tree block, but a prediction of the quantization parameter according to the intra prediction mode is not made otherwise (in a case where at least one neighboring block is located at a position beyond the boundary of the tree block). In the eighth example, in a case where a neighboring block determined in the prediction direction of the intra prediction mode is located at a position beyond the boundary of the tree block, the quantization parameter of the determined neighboring block cannot be used, and accordingly, it is determined whether the quantization parameter of another neighboring block or the quantization parameter of a block that is arranged previous to the coding block, which is the coding target, or has been immediately previously coded is valid, and the quantization parameter is derived as the predictive quantization parameter. As above, in a case where the neighboring block determined in the prediction direction of the intra prediction mode of the coding block that is the coding target is located at a position beyond the boundary of the tree block, the prediction direction of the intra prediction mode and the position of the neighboring block that is the reference destination do not coincide with each other, and accordingly, there is concern that the accuracy of the determination according to the intra prediction mode may be degraded. In addition, even in a case where the prediction mode of the original coding block is the intra prediction, there are cases where coded neighboring blocks are located on the periphery at positions beyond the boundary of the tree block, and a determination according to the intra prediction mode cannot be made. Thus, in the ninth example, in a case where the determination according to the intra prediction mode in the second predictive quantization parameter deriving unit and the position of the neighboring block, which is referred to, do not coincide with each other, the determination result according to the intra prediction mode is not employed, but a re-determination is made by the first predictive quantization parameter deriving unit, whereby the accuracy of the prediction of the quantization parameter is improved. While the coding process will be described here, in the case of the decoding process, by paraphrasing coding with decoding, replacing the predictive quantization parameter deriving unit 114 with the predictive quantization parameter deriving unit 205, replacing the coding information storage memory 113 with the coding information storage memory 204, and changing the output destination of the predictive quantization parameter from the differential quantization parameter generation unit 111 to the quantization parameter generation unit 203, an equivalent process is realized.

Figure 46:
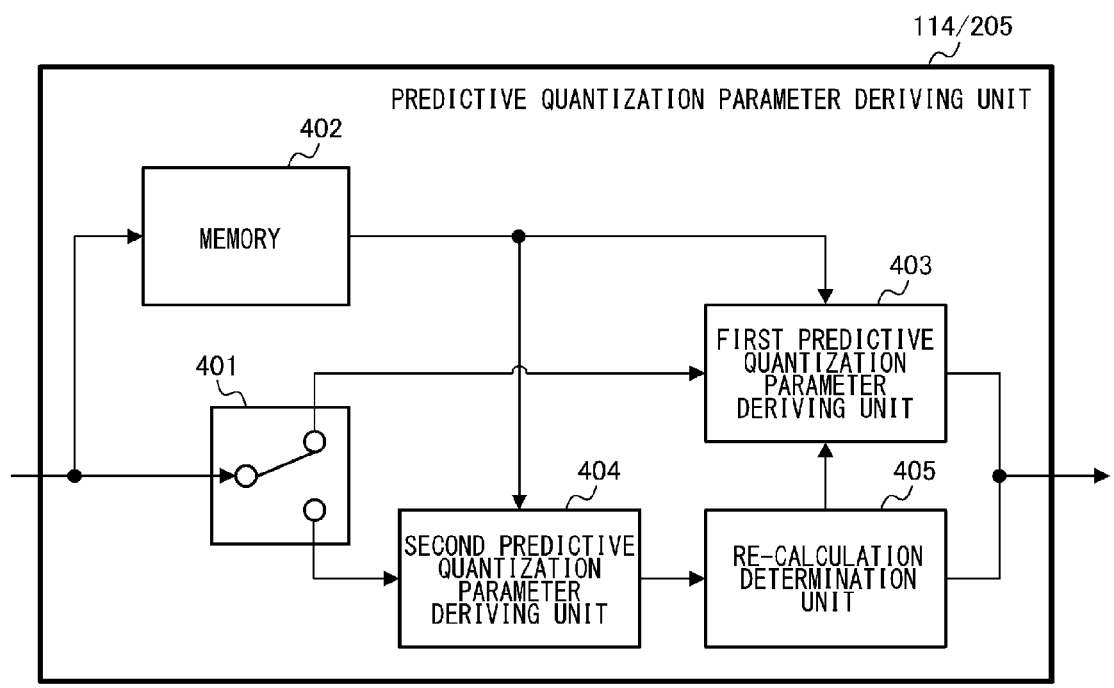
FIG. 46 is a block diagram that illustrates another detailed configuration of a predictive quantization parameter deriving unit.

A detailed configuration of the predictive quantization parameter deriving units 114 and 205 to which the determination process of the ninth example is applied is illustrated in FIG. 46. Each of the predictive quantization parameter deriving units 114 and 205 is configured by: a switch 401; a memory 402; a first predictive quantization parameter deriving unit 403; a second predictive quantization parameter deriving unit 404; and a re-calculation determination unit 405. Units of the switch 401 to the first predictive quantization parameter deriving unit 403 illustrated in FIG. 46 have the same functions as those of the units of the switch 301 to the first predictive quantization parameter deriving unit 303 illustrated in FIG. 10, and thus the description thereof will not be presented here. The second predictive quantization parameter deriving unit 404 illustrated in FIG. 46 is changed from the above-described second predictive quantization parameter deriving unit 304 illustrated in FIG. 10 to have a different function, and thus, a difference therebetween will be described.

Figure 47:
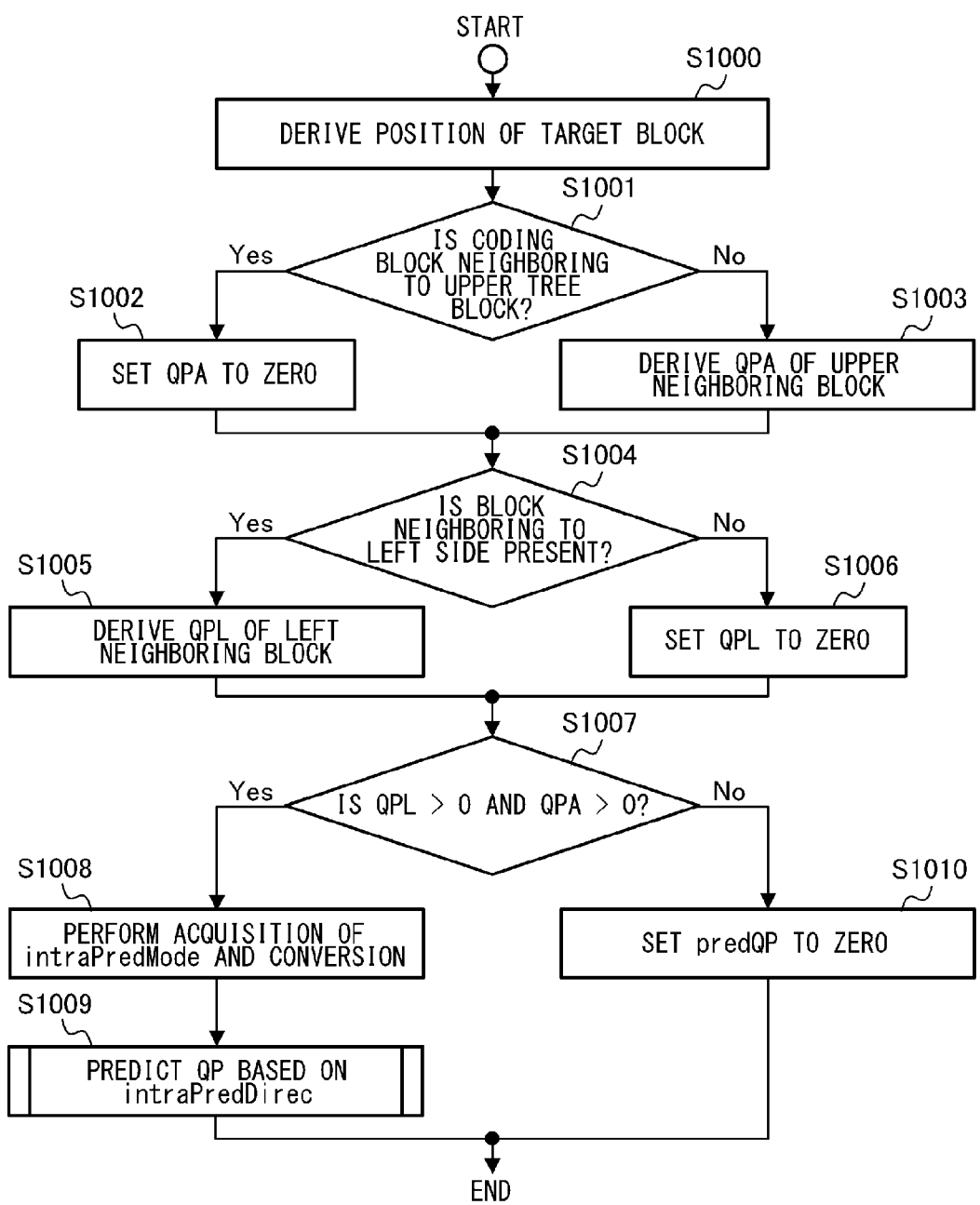
FIG. 47 is a flowchart that illustrates an operation of a second predictive quantization parameter deriving unit of a ninth example.

FIG. 47 is a flowchart that illustrates the operation of the second predictive quantization parameter deriving unit 404 to which the function of the ninth example is applied with respect to the second predictive quantization parameter deriving unit 304 described in the sixth example. The process of steps S1000 to S1009 is the same as that of the second predictive quantization parameter deriving unit 304 described above, and the description thereof will not be presented here. A difference from the second predictive quantization parameter deriving unit 304 described above is that it is determined whether or not both the quantization parameters of the left and upper neighboring blocks are positive (step S1007), and, in a case where at least one of the quantization parameters of the left and upper neighboring blocks is not positive (No in step S1007), a prediction of the quantization parameter according to the intra prediction mode is not made, and the predictive quantization parameter predQP is set to zero (step S1010). In the second predictive quantization parameter deriving unit 304, even when the prediction mode of the coding block is the intra prediction, in a case where coded neighboring blocks are located on the periphery at positions beyond the boundary of the tree block, the quantization parameters of the neighboring blocks are set to zero, and a prediction of the quantization parameter according to the intra prediction mode cannot be made, the determination is made based on the presence/no-presence of neighboring blocks regardless of the intra prediction mode. The second predictive quantization parameter deriving unit 404 makes only a prediction of the quantization parameter according to the intra prediction mode and, in a case where a determination cannot be made in accordance with the prediction of the quantization parameter according to the intra prediction mode, sets the predictive quantization parameter to zero so as to allow the re-calculation determination unit 405 to be described later to make a determination for the first predictive quantization parameter deriving unit 403 to make a re-determination. The derived predictive quantization parameter is supplied to the re-calculation determination unit 405.

Figure 48:
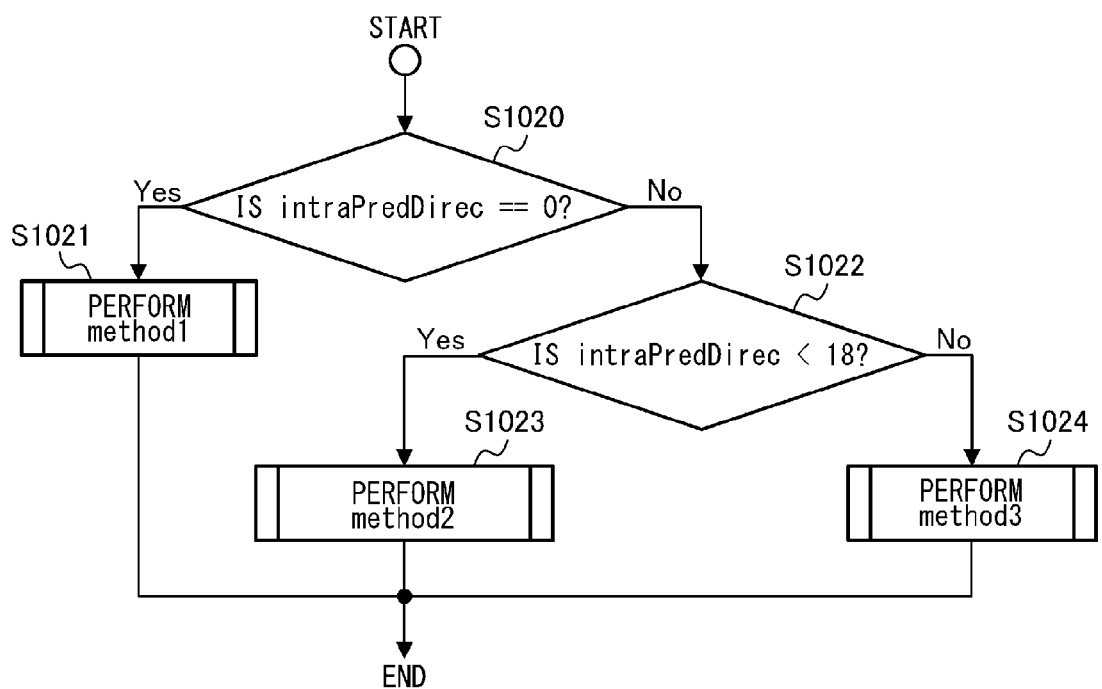
FIG. 48 is a flowchart that illustrates a detailed operation of a determination process according to an intra prediction direction in the second predictive quantization parameter deriving unit of the ninth example.

FIG. 48 is a flowchart that illustrates the operation of the second predictive quantization parameter deriving unit 404, to which the function of the ninth example is applied, for predicting the quantization parameter according to the intra prediction direction with respect to the prediction (step S908) of the quantization parameter according to the intra prediction direction that is made by the second predictive quantization parameter deriving unit 304 described in the eighth example. Similarly to the eighth example, the threshold TH of the prediction direction of the intra prediction mode illustrated in FIG. 30 is set to a value of the intra prediction mode of 18, and the predictive quantization parameter is derived by switching between predictions of the quantization parameter in accordance with the intra prediction direction based on the threshold TH. First, it is determined whether or not the converted intra prediction direction is zero (step S1020). The intra prediction direction is zero in a case where an intra prediction according to the average value prediction is made (Yes in step S1020). In such a case, the process proceeds to method1 (step S1021). On the other hand, in a case where the intra prediction direction is not zero (No in step S1020), it is determined whether or not the intra prediction direction is smaller than 18 (step S1022). In a case where the intra prediction direction is smaller than 18 (Yes in step S1022), the process proceeds to method2 (step S1023). On the other hand, in a case where the intra prediction direction is larger than or equal to 18 (No in step S1022), the process proceeds to method3 (step S1024).

Figure 49:
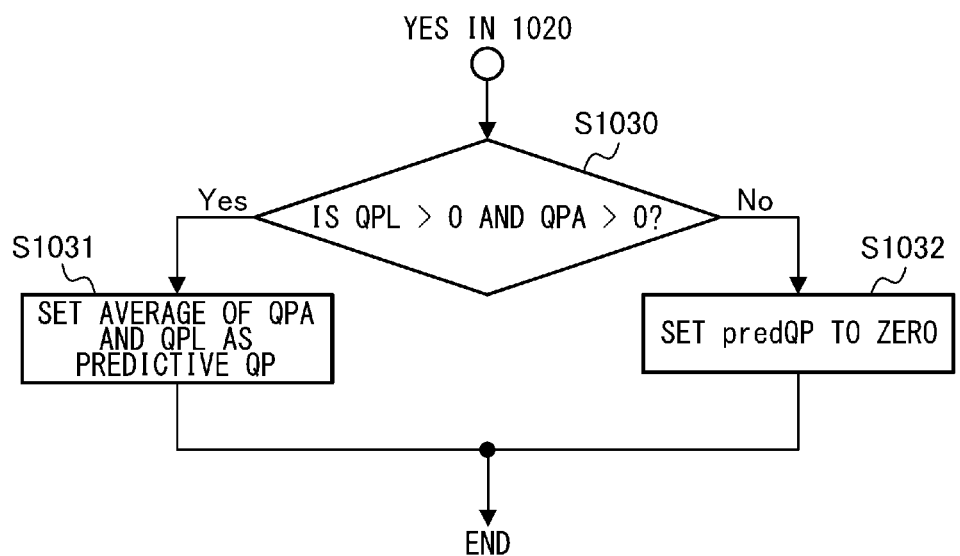
FIG. 49 is a flowchart that illustrates a detailed operation of a case where the intra prediction direction is zero in the second predictive quantization parameter deriving unit of the ninth example.

First, the process of method1 will be described with reference to FIG. 49. The intra prediction direction is determined to be zero (Yes in step S1020) in step S1020 in a case where an intra prediction according to the average value prediction is made. In such a case, anyone of the left neighboring block and the upper neighboring block is not selected with higher priority, but an average value of the quantization parameters QPL and QPA of the left and upper neighboring blocks is set as the predictive quantization parameter, and accordingly, first, it is determined whether or not both the quantization parameters of the left and upper neighboring blocks are positive (step S1030). In a case where both the quantization parameters of the left and upper neighboring blocks are positive (Yes in step S1030), the neighboring blocks disposed on both the left side and the upper side are present. Accordingly, by referring to a neighboring block designated by the direction represented in the intra prediction mode, the quantization parameter can be derived, and, an average value of the quantization parameters QPL and QPA of the left and upper neighboring blocks is set as a predictive quantization parameter (step S1031). On the other hand, in a case where both the quantization parameters of the left and upper neighboring blocks are not positive (No in step S1030), in other words, in a case where the quantization parameter of at least one of the left neighboring block and the upper neighboring block is zero, at least one of the left neighboring block and the upper neighboring block is not present. Thus, an average value of the quantization parameters QPL and QPA of the left and upper neighboring blocks cannot be set as the predictive quantization parameter, and thus the predictive quantization parameter is set to zero (step S1032).

Figure 50:
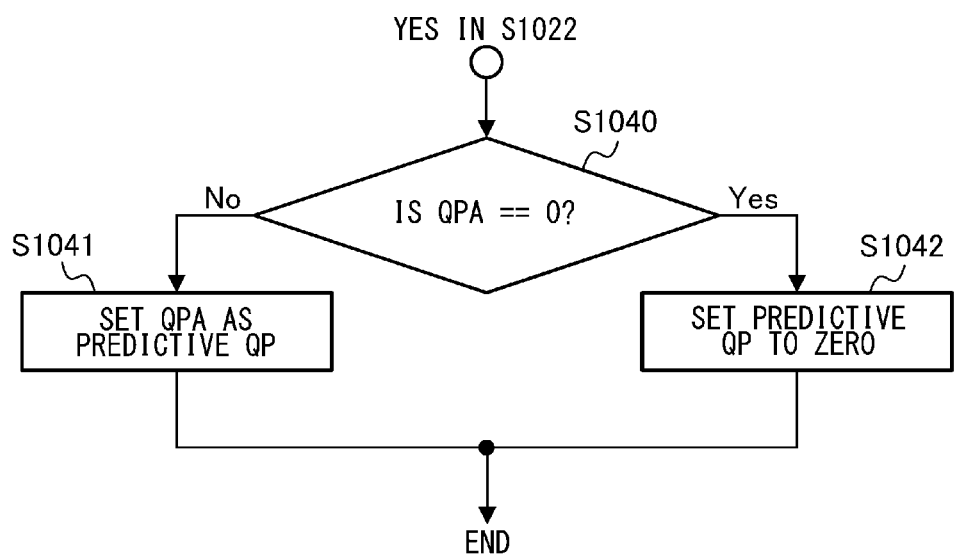
FIG. 50 is a flowchart that illustrates a detailed operation of a case where the intra prediction direction is smaller than 18 in the second predictive quantization parameter deriving unit of the ninth example.

Next, the process of method2 will be described with reference to FIG. 50. In step S1022, since it has been determined that the intra prediction direction is smaller than 18 (Yes in step S1022), in order to select the quantization parameter of the upper coded neighboring block as the predictive quantization parameter, first, it is determined whether or not the quantization parameter of the upper neighboring block is zero (step S1040). In a case where the quantization parameter of the upper neighboring block is not zero (No in step S1040), the quantization parameter of the upper neighboring block is set as a predictive quantization parameter (step S1041). On the other hand, in a case where the quantization parameter of the upper neighboring block is zero (Yes in step S1040), the quantization parameter of the upper neighboring block cannot be referred to as the predictive quantization parameter, and the predictive quantization parameter is set to zero (step S1042).

Figure 51:
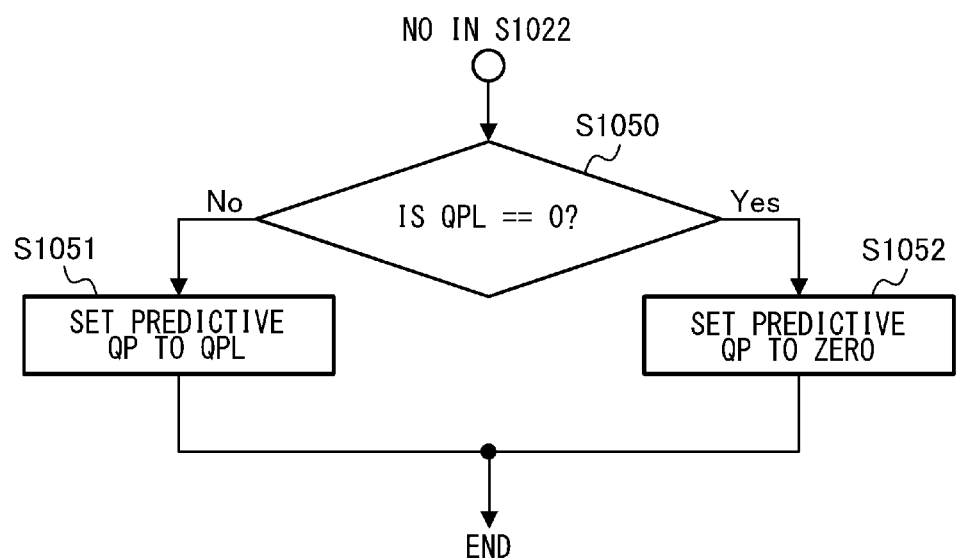
FIG. 51 is a flowchart that illustrates a detailed operation of a case where the intra prediction direction is larger than or equal to 18 in the second predictive quantization parameter deriving unit of the ninth example.

Subsequently, the process of method3 will be described with reference to FIG. 51. In step S1022, since it has been determined that the intra prediction direction is larger than or equal to 18 (No in step S1022), in order to select the quantization parameter of the left coded neighboring block as the predictive quantization parameter, first, it is determined whether or not the quantization parameter of the left neighboring block is zero (step S1050). In a case where the quantization parameter of the left neighboring block is not zero (No in step S1050), the quantization parameter of the left neighboring block is set as a predictive quantization parameter (step S1051). On the other hand, in a case where the quantization parameter of the left neighboring block is zero (Yes in step S1050), the quantization parameter of the left neighboring block cannot be referred to as the predictive quantization parameter, and thus, the predictive quantization parameter is set to zero (step S1052).

As above, in each method branched in the intra prediction direction, in a case where the neighboring block is located at a position beyond the boundary of the tree block or outside the screen, the quantization parameter of the neighboring block determined in the intra prediction direction is zero, and the predictive quantization parameter cannot be derived based on the quantization parameter of the neighboring block determined in the intra prediction direction. Thus, in order to represent that a determination cannot be made in the prediction of the quantization parameter according to the intra prediction mode, the predictive quantization parameter is set to zero. The derived predictive quantization parameter is supplied to the re-calculation determination unit 405.

In this way, the predictive quantization parameter predQP derived by the second predictive quantization parameter deriving unit 404 is supplied to the re-calculation determination unit 405.

Figure 52:
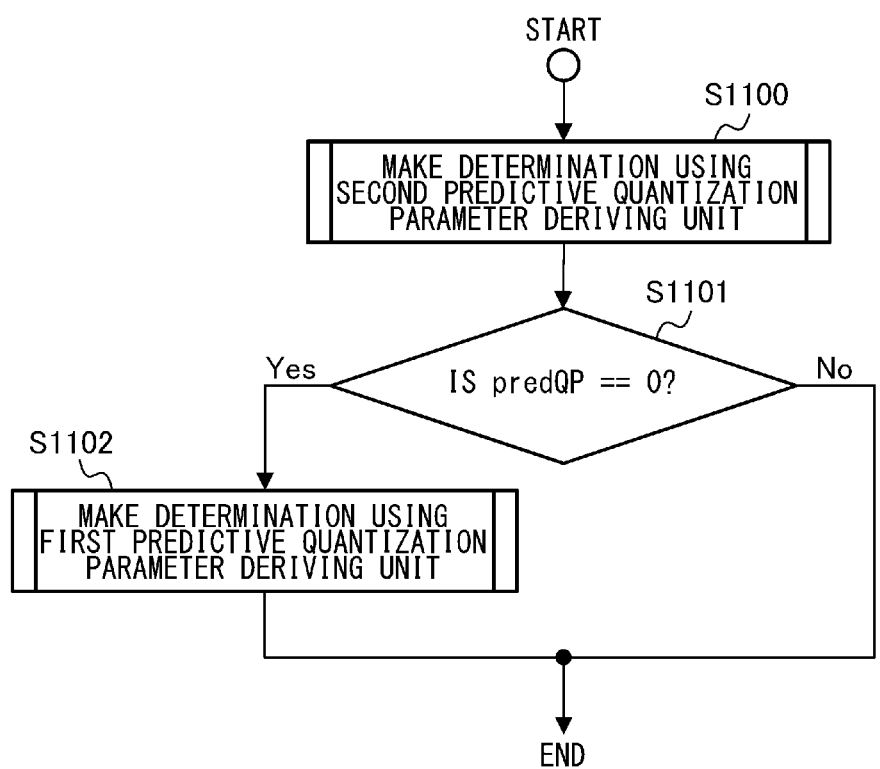
FIG. 52 is a flowchart that illustrates a detailed operation of a recalculation determination unit.

A detailed operation of the re-calculation determination unit 405 will be described with reference to FIG. 52. The predictive quantization parameter is supplied to the re-calculation determination unit 405 from the second predictive quantization parameter deriving unit 404 (step S1100). The re-calculation determination unit 405 determines whether or not the supplied predictive quantization parameter is zero (step S1101). In a case where the predictive quantization parameter is zero, it is regarded that an appropriate determination result cannot be acquired by the second predictive quantization parameter deriving unit 404, and the first predictive quantization parameter deriving unit 403 is urged to derive the predictive quantization parameter again (step S1102). On the other hand, in a case where the predictive quantization parameter is not zero, the predictive quantization parameter derived by the second predictive quantization parameter deriving unit 404 is supplied to the differential quantization parameter generation unit 111.

As above, in a case where the determination according to the intra prediction mode in the second predictive quantization parameter deriving unit and the position of the neighboring block, which is referred to, do not coincide with each other, the determination result according to the intra prediction mode is not employed, but a re-determination can be made by the first predictive quantization parameter deriving unit.

In the ninth example, except that the determination result according to the intra prediction mode is not employed, but the predictive quantization parameter is output as zero in a case where the determination according to the intra prediction mode in the second predictive quantization parameter deriving unit 404 and the position of the neighboring block, which is referred to, do not coincide with each other, there is no change from the prediction determination of the quantization parameter according to the intra prediction mode of the second predictive quantization parameter deriving unit 304 of the sixth and eighth example. Accordingly, in the sixth example, in a case where the weighting coefficients of the quantization parameters of the left and upper neighboring blocks are set in accordance with the prediction direction of the intra prediction mode, as illustrated in FIG. 34, even in a case where the number of thresholds of the prediction direction of the intra prediction mode is increased, and the weighting coefficients of the quantization parameters of the left and upper neighboring blocks are set for each range of the area of the prediction direction of the intra prediction mode delimited by thresholds, the process of the ninth example can be similarly performed, and the description thereof will not be presented here.

According to the moving picture coding device of the embodiment, the quantization parameter coded for each block of the coding target is predicted using the quantization parameters of coded blocks disposed on the periphery, an optimal predictive quantization parameter is derived, and a difference between the quantization parameter and the predictive quantization parameter is taken and is coded. Accordingly, the coding amount of the quantization parameters is reduced without changing the picture quality, whereby the coding efficiency can be improved.

In addition, the quantization parameter prediction function can be built on the coding side and the decoding side as a common function, whereby the circuit scale can be reduced. This is achieved by realizing the determination of the prediction of quantization parameters so as not to generate a contradiction between the coding side and the decoding side such that a coded neighboring block is formed as a block that is locally decoded for the prediction of the next coding block on the coding side and is the same as the decoded block.

In the description presented above, while the quantization parameter is predicted in units of coding blocks, when the number of divisions inside the tree block is increased, and many coding blocks having a small block size are generated, the coding amount per coding block in the coding amount control is too small, and there are cases where the quantization parameter is not appropriately calculated. In addition, the stored amounts in the coding information storage memories 113 and 204 of the moving picture coding device 100 and the moving picture decoding device 200 storing coding information of quantization parameters at the time of coding and decoding are increased. Thus, by newly setting a block called a quantization group as a unit for coding and transmitting the quantization parameter, the quantization parameter may be predicted in units of these blocks.

The quantization group is a group that is determined in accordance with the size of the tree block, and the size is represented by a value acquired by multiplying the length of the side of the block of the tree block by $½^n$ (here, n is an integer that is larger than or equal to zero). In other words, a value acquired by shifting the length of the side of the block of the tree block to the right side by n bits is the length of the side of the quantization group. This value, similarly to the tree block structure, determines the block size and accordingly has high affinity to the tree block. In addition, since the inside of the tree block is divided into parts having the equal size, the quantization parameter stored in the coding information storage memory 113 and 204 can be managed and read in a simple manner.

Figure 53:
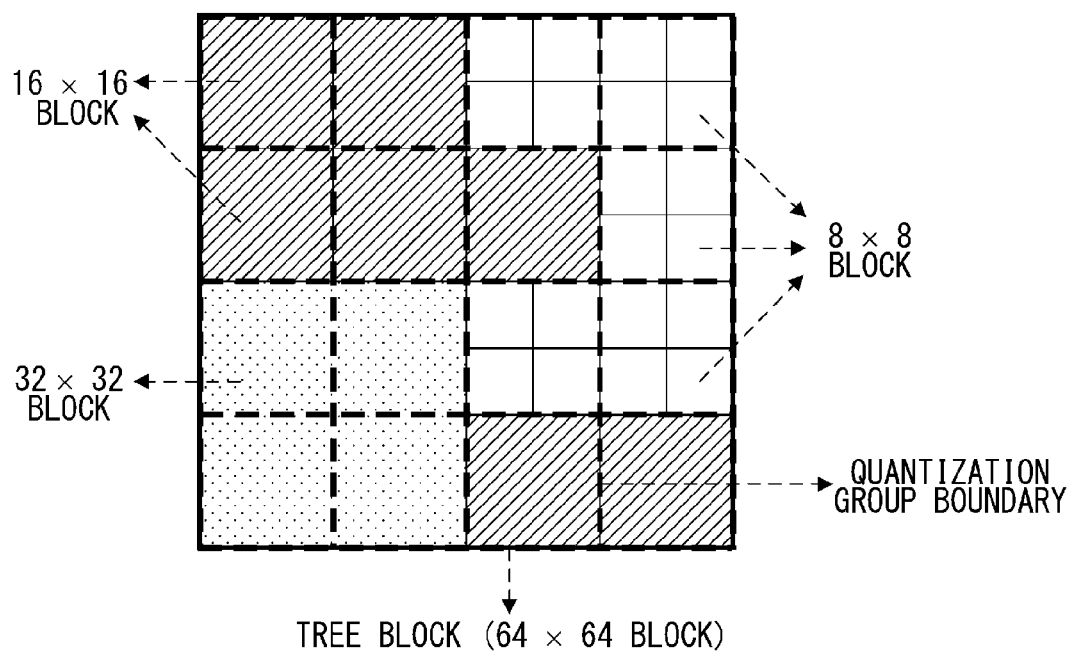
FIG. 53 is a diagram that illustrates an example of a quantization group.

FIG. 53 is a diagram that illustrates an example in which the inside of the tree block is divided into a tree block structure. The block size of the tree block is 64×64, and the inside of the tree block of hierarchically divided four times. In accordance with the first division, the tree block is divided into 32×32 blocks (dotted-line rectangles illustrated in FIG. 53). In addition, in accordance with the second division, the tree block is divided into 16×16 blocks (hatched rectangles illustrated in FIG. 53). Furthermore, in accordance with the third division, the tree block is divided into 8×8 blocks (white rectangles illustrated in FIG. 53) of coding blocks. Here, when the quantization group is set as a 16×16 rectangle block, the quantization group is represented by a thick dotted line illustrated in FIG. 53, and the quantization parameter is predicted in units of quantization groups.

In a case where the coding block that is the coding target is larger than the block size of the quantization group (32×32 block), for example, the inside of the coding block represented by a stipple rectangle illustrated in FIG. 53 is divided into four quantization groups. While the coding block is divided into four quantization groups, there is one quantization parameter of this coding block. Accordingly, in a case where the size of the coding block is larger than the quantization group, a differential quantization parameter after the prediction of the quantization parameter of the coding block is coded and transmitted, and the same quantization parameter is stored in memory areas of the coding information storage memories 113 and 204 that respectively correspond to the divided four quantization groups. While the quantization parameters are redundant inside the memory, it is easy to access the quantization parameter of a neighboring coded block disposed on the periphery in the prediction of the quantization parameter.

On the other hand, in a case where the coding block that is the coding target has the same size as the block size of the quantization group (16×16 block), the process is the same as that in the case of the prediction of the quantization parameter in units of coding blocks described above.

In a case where the coding block that is the coding target is smaller than the block size of the quantization group (8×8 block), for example, in the case of a coding block represented by a white rectangle illustrated in FIG. 53, four coding blocks are housed in the quantization group. Accordingly, each coding block included in the quantization group does not include a quantization parameter, but one quantization parameter is included inside the quantization group, and each coding block is coded using the quantization parameter. In addition, there is a method in which one representative value is selected from among quantization parameters of four coding blocks disposed inside the quantization group as the quantization parameter of the quantization group, a method in which an average value of the quantization parameters is calculated, and the like. However, the present invention is not limited thereto.

Figure 54:
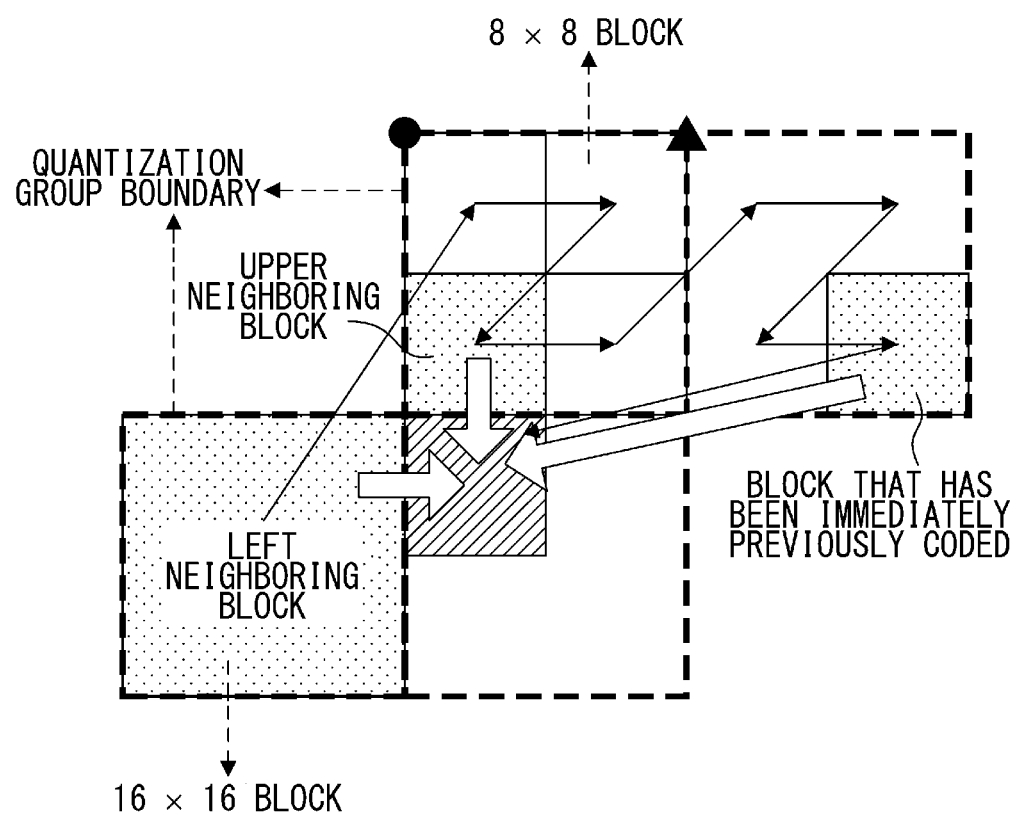
FIG. 54 is a diagram that illustrates an example of a prediction of a quantization parameter in units of quantization groups.

FIG. 54 illustrates an example of a prediction of a quantization parameter in a case where the coding block has a size smaller than the block size of the quantization group. In FIG. 54, a hatched rectangle represents a coding block that is the coding target, a gray rectangle represents a coded block used for the prediction of the quantization parameter by the quantization group including the coding block, and a thin solid-line represents the coding process sequence. The prediction of the quantization parameter is performed with the position of the pixel of the upper left corner of the quantization group that is the processing target used as the reference. In a case where the quantization parameter of a coded block neighboring to the upper side is used for the prediction, for the hatched rectangle illustrated in FIG. 54, the position of the coded block including a pixel neighboring to one pixel that is the pixel of the upper left corner of the quantization group including the coding block that is the coding target is calculated, and a quantization parameter stored at an address that corresponds to the position is read from the coding information storage memories 113 and 204. Similarly, in a case where the quantization parameter of a coded block neighboring to the left side is used, the position of the coded block including a pixel neighboring to the pixel disposed on the upper left corner of the quantization group including the coding block, which is the coding target, on the left side with one pixel being separate therefrom is calculated, and a quantization parameter recorded at an address that corresponds to the position is read from the coding information storage memories 113 and 204. In a case where the coded block including pixels neighboring to the left side and the upper side of the pixel disposed on the upper left corner of the quantization group including the coding block that is the coding target is beyond the boundary of the tree block, the quantization parameter of a coded block that is arranged previous to the coding block, which is the coding target, or has been immediately previously coded is used. Accordingly, an address of the memory at the time of storing the quantization parameter in the coding information storage memories 113 and 204 in the coding process is temporarily stored, and the quantization parameter stored at an address corresponding to the position that is arranged previous to the coding block, which is the coding target, or is an immediately previous position is read from the coding information storage memories 113 and 204. In this way, the quantization parameter of the coding block that is the coding target can be predicted.

As above, the prediction of the quantization parameter in units of quantization groups can be performed similarly to the above-described prediction of the quantization parameter in units of coding blocks.

In addition, the block size of the quantization group may be directly described in the header information of a bitstream, or a bit shift amount that represents $½^n$ times (here, n is an integer that is larger than or equal to zero) of the tree block size may be described. For example, a prediction of the quantization parameter in units of pictures is made, and inside the header information of a picture, a flag cu_qp_delta_enable_flag used for designating whether or not a differential quantization parameter is transmitted with being described in the bitstream is defined and, only in a case where the flag cu_qp_delta_enable_flag is set to be valid (set to "1"), a parameter diff_cu_qp_delta_depth used for determining the size of the quantization group is described in the bitstream. In a case where the size of the tree block is represented by $2^n$, the size of the quantization group is represented as the power of 2 having a value acquired by subtracting the parameter diff_cu_qp_delta_depth from the exponent n as the exponent. In addition, particularly, the block size may not be described in the bitstream, but the size of the quantization group may be explicitly determined in the coding process and the decoding process.

The bitstream of a moving picture output by the moving picture coding device according to the embodiment described above has a specific data format so as to be decoded in accordance with the coding method used in the embodiment, and accordingly, the moving picture decoding device corresponding to the moving picture coding device can decode the bitstream of the specific data format.

In a case where a wired or wireless network is used for exchanging a bitstream between the moving picture coding device and the moving picture decoding device, the bitstream may be converted into a data format that is appropriate for the transmission form in a communication path and be transmitted. In such a case, a moving picture reception device is disposed, which converts a bitstream output by the moving picture coding device into coding data of a data format that is appropriate to the transmission form in the communication path, receives the coding data from a moving picture transmission device that transmits the coding data to the network and the network, restores the bitstream from the coding data, and supplies the restored bitstream to the moving picture decoding device.

The moving picture transmission device includes: a memory that buffers a bitstream output by the moving picture coding device; a packet processing unit that packetizes the bitstream; and a transmission unit that transmits packetized coding data through a network. The moving picture reception device includes: a reception unit that receives packetized coding data through a network; a memory that buffers the received coding data; and a packet processing unit that generates a bitstream by performing a packet process of coding data and supplies the generated bitstream to the moving picture decoding device.

The processes relating to the coding and decoding described above may be realized not only as a transmission/storage/reception device using hardware but also by firmware stored in a read only memory (ROM), a flash memory, or the like or software of a computer or the like. The firmware or the software program may be provided with being recorded in a recording medium that can be read by a computer or the like, may be provided from a server through a wired or wireless network, or may be provided as data broadcasting of satellite digital broadcasting.

As above, the present invention has been described based on the embodiments. However, such embodiments are merely examples, and it is understood to a person skilled in the art that various modifications may be made in each constituent element thereof or a combination of each process sequence, and such modified examples also belong to the scope of the present invention.

[Item 1] There is provided a moving picture coding device that further divides a first block acquired by dividing each picture of a moving picture into a predetermined size into one or a plurality of second blocks and codes the moving picture in units of blocks. The moving picture coding device includes:

a quantization parameter calculation unit configured to calculate a quantization parameter of the second block;

a predictive quantization parameter deriving unit configured to derive a predictive quantization parameter of the second block by using the quantization parameter of one or a plurality of third blocks that are neighboring to the second block;

a differential quantization parameter generation unit configured to generate a differential quantization parameter of the second block based on a difference between the quantization parameter and the predictive quantization parameter of the second block; and a coding unit configured to code the differential quantization parameter of the second block, wherein the predictive quantization parameter deriving unit derives the predictive quantization parameter of the second block by using a quantization parameter of a fourth block coded before the second block in a case where the third block neighboring to the second block is located at a position beyond a boundary of the first block.

[Item 2] The moving picture coding device described in Item 1, wherein the predictive quantization parameter deriving unit derives the quantization parameter of a fifth block neighboring to the left side of the second block out of the third blocks as the predictive quantization parameter in a case where a sixth block neighboring to the upper side of the second block out of the third blocks is located at a position beyond the boundary of the first block and derives the predictive quantization parameter based on the quantization parameters of the fifth block and the sixth block in a case where the sixth block is located at a position not beyond the boundary of the first block.

[Item 3] The moving picture coding device described in Item 1, wherein the predictive quantization parameter deriving unit derives the predictive quantization parameter based on quantization parameters of a fifth block and a sixth block in a case where both the fifth block neighboring to the left side of the second block and the sixth block neighboring to the upper side of the second block out of the third blocks are located at positions not beyond the boundary of the first block, derives the predictive quantization parameter by using the quantization parameter of the fourth block coded before the second block instead of the quantization parameter of a neighboring block located at a position beyond the boundary and the quantization parameter of a neighboring block located at a position not beyond the boundary in a case where the one neighboring block out of the fifth block and the sixth block is located at the position beyond the boundary of the first block, and derives the quantization parameter of the fourth block coded before the second block as the predictive quantization parameter in a case where both the fifth block and the sixth block are located at positions beyond the boundary of the first block.

[Item 4] The moving picture coding device described in Item 1, wherein the predictive quantization parameter deriving unit derives the quantization parameter of the fourth block coded before the second block out of the third blocks as the predictive quantization parameter in a case where the fifth block neighboring to the left side of the second block out of the third blocks is located at a position beyond the boundary of the first block and derives the quantization parameter of the fifth block as the predictive quantization parameter in a case where the fifth block is located at a position not beyond the boundary of the first block.

[Item 5] The moving picture coding device described in any one of Items 1 to 4, wherein size information of the second block is described within a bitstream.

[Item 6] There is provided a moving picture coding device that codes a moving picture by using a motion-compensated prediction in units of coding blocks that are acquired by further dividing a block acquired by dividing each picture of the moving picture into a predetermined size into one or a plurality of coding blocks. The moving picture coding device includes:

a quantization parameter calculation unit configured to calculate a quantization parameter of the coding block;

a predictive quantization parameter deriving unit configured to derive a predictive quantization parameter of the coding block by using the quantization parameter of a coded neighboring block neighboring to the coding block in accordance with a prediction mode of the motion-compensated prediction of the coding block;

a differential quantization parameter generation unit configured to generate a differential quantization parameter of the coding block based on a difference between the quantization parameter and the predictive quantization parameter of the coding block; and a coding unit configured to code the differential quantization parameter of the coding block, wherein predictive quantization parameter deriving unit, in a case where a neighboring block neighboring to the coding block in a predetermined direction is located at a position beyond a boundary of the block of the predetermined size, derives the predictive quantization parameter of the coding block by using the quantization parameter of another coded block other than the neighboring block neighboring in the predetermined direction.

[Item 7] There is provided a moving picture coding method for further dividing a first block acquired by dividing each picture of a moving picture into a predetermined size into one or a plurality of second blocks and coding the moving picture in units of blocks, the moving picture coding method includes:

calculating a quantization parameter of the second block;

deriving a predictive quantization parameter of the second block by using the quantization parameter of one or a plurality of third blocks that are neighboring to the second block;

generating a differential quantization parameter of the second block based on a difference between the quantization parameter and the predictive quantization parameter of the second block; and coding the differential quantization parameter of the second block, wherein, in the deriving of a predictive quantization parameter, the predictive quantization parameter of the second block is derived by using a quantization parameter of a fourth block coded before the second block in a case where the third block neighboring to the second block is located at a position beyond a boundary of the first block.

[Item 8] There is provided a moving picture coding program for further dividing a first block acquired by dividing each picture of a moving picture into a predetermined size into one or a plurality of second blocks and coding the moving picture in units of blocks, the moving picture coding program causes a computer to perform:

calculating a quantization parameter of the second block;

deriving a predictive quantization parameter of the second block by using the quantization parameter of one or a plurality of third blocks that are neighboring to the second block;

generating a differential quantization parameter of the second block based on a difference between the quantization parameter and the predictive quantization parameter of the second block; and coding the differential quantization parameter of the second block, wherein, in the deriving of a predictive quantization parameter, the predictive quantization parameter of the second block is derived by using a quantization parameter of a fourth block coded before the second block in a case where the third block neighboring to the second block is located at a position beyond a boundary of the first block.

[Item 9] There is provided a moving picture decoding device that further divides a first block acquired by dividing each picture of a moving picture into a predetermined size into one or a plurality of second blocks and decodes a bitstream in which the moving picture is coded, the moving picture decoding device including:

a decoding unit configured to extract a differential quantization parameter of the second block by decoding the bitstream;

a predictive quantization parameter deriving unit configured to derive a predictive quantization parameter of the second block by using the quantization parameter of one or a plurality of third blocks neighboring to the second block; and a quantization parameter generation unit configured to generate a quantization parameter of the second block by adding the differential quantization parameter and the predictive quantization parameter of the second block, wherein the predictive quantization parameter deriving unit derives the predictive quantization parameter of the second block by using a quantization parameter of a fourth block decoded before the second block in a case where the third block neighboring to the second block is located at a position beyond a boundary of the first block.

[Item 10] The moving picture decoding device described in Item 9, wherein the predictive quantization parameter deriving unit derives the quantization parameter of a fifth block neighboring to the left side of the second block out of the third blocks as the predictive quantization parameter in a case where a sixth block neighboring to the upper side of the second block out of the third blocks is located at a position beyond the boundary of the first block and derives the predictive quantization parameter based on the quantization parameters of the fifth block and the sixth block in a case where the sixth block is located at a position not beyond the boundary of the first block.

[Item 11] The moving picture decoding device described in Item 9, wherein the predictive quantization parameter deriving unit derives the predictive quantization parameter based on quantization parameters of a fifth block and a sixth block in a case where both the fifth block neighboring to the left side of the second block and the sixth block neighboring to the upper side of the second block out of the third blocks are located at positions not beyond the boundary of the first block, derives the predictive quantization parameter by using the quantization parameter of the fourth block decoded before the second block instead of the quantization parameter of a neighboring block located at a position beyond the boundary and the quantization parameter of a neighboring block located at a position not beyond the boundary in a case where the one neighboring block out of the fifth block and the sixth block is located at the position beyond the boundary of the first block, and derives the quantization parameter of the fourth block decoded before the second block as the predictive quantization parameter in a case where both the fifth block and the sixth block are located at positions beyond the boundary of the first block.

[Item 12] The moving picture decoding device described in Item 9, wherein the predictive quantization parameter deriving unit derives the quantization parameter of the fourth block decoded before the second block out of the third blocks as the predictive quantization parameter in a case where the fifth block neighboring to the left side of the second block out of the third blocks is located at a position beyond the boundary of the first block and derives the quantization parameter of the fifth block as the predictive quantization parameter in a case where the fifth block is located at a position not beyond the boundary of the first block.

[Item 13] The moving picture decoding device described in any one of Items 9 to 12, wherein size information of the second block is extracted from the bitstream and is set as the size of the second block.

[Item 14] A moving picture decoding device that further divides a block acquired by dividing each picture of a moving picture into a predetermined size into one or a plurality of coding blocks and decodes a bitstream in which the moving picture is coded in units of coding blocks, the moving picture decoding device including:

a decoding unit configured to extract a differential quantization parameter of the decoding block by decoding the bitstream in units of decoding blocks;

a predictive quantization parameter deriving unit configured to derive a predictive quantization parameter of the decoding block by using the quantization parameter of a decoded neighboring block neighboring to the decoding block in accordance with a prediction mode of the motion-compensated prediction of the decoding block; and a quantization parameter generation unit configured to generate a quantization parameter of the decoding block by adding the differential quantization parameter and the predictive quantization parameter of the decoding block, wherein the predictive quantization parameter deriving unit derives the predictive quantization parameter of the decoding block by using a quantization parameter of another decoded block other than the neighboring block neighboring in the predetermined direction in a case where the neighboring block neighboring in the predetermined direction of the decoding block is located at a position beyond the boundary of the block of the predetermined size.

[Item 15] A moving picture decoding method for further dividing a first block acquired by dividing each picture of a moving picture into a predetermined size into one or a plurality of second blocks and decoding a bitstream in which the moving picture is coded, the moving picture decoding method including:

extracting a differential quantization parameter of the second block by decoding the bitstream;

deriving a predictive quantization parameter of the second block by using the quantization parameter of one or a plurality of third blocks neighboring to the second block; and generating a quantization parameter of the second block by adding the differential quantization parameter and the predictive quantization parameter of the second block, wherein in the deriving of a predictive quantization parameter, the predictive quantization parameter of the second block is derived by using a quantization parameter of a fourth block decoded before the second block in a case where the third block neighboring to the second block is located at a position beyond a boundary of the first block, and in the deriving of a predictive quantization parameter, the predictive quantization parameter is derived based on quantization parameters of a fifth block and a sixth block in a case where both the fifth block neighboring to the left side of the second block and the sixth block neighboring to the upper side of the second block out of the third blocks are located at positions not beyond the boundary of the first block, the predictive quantization parameter is derived by using the quantization parameter of the fourth block decoded before the second block instead of the quantization parameter of a neighboring block located at a position beyond the boundary and the quantization parameter of a neighboring block located at a position not beyond the boundary in a case where the one neighboring block out of the fifth block and the sixth block is located at the position beyond the boundary of the first block, and the quantization parameter of the fourth block decoded before the second block is derived as the predictive quantization parameter in a case where both the fifth block and the sixth block are located at positions beyond the boundary of the first block.

[Item 16] There is provided a moving picture decoding program for further dividing a first block acquired by dividing each picture of a moving picture into a predetermined size into one or a plurality of second blocks and decoding a bitstream in which the moving picture is coded, the moving picture decoding program causing a computer to perform:

extracting a differential quantization parameter of the second block by decoding the bitstream;

deriving a predictive quantization parameter of the second block by using the quantization parameter of one or a plurality of third blocks neighboring to the second block; and generating a quantization parameter of the second block by adding the differential quantization parameter and the predictive quantization parameter of the second block, wherein, in the deriving of a predictive quantization parameter, the predictive quantization parameter of the second block is derived by using a quantization parameter of a fourth block decoded before the second block in a case where the third block neighboring to the second block is located at a position beyond a boundary of the first block.

What is claimed is:

1. A moving picture coding device that codes moving pictures in units of a block by partitioning a first block, which is obtained by partitioning each picture of the moving pictures into predetermined sizes, into one or a plurality of second blocks, the device comprising:

a quantization parameter calculation unit configured to calculate a quantization parameter of the second block;

a predictive quantization parameter deriving unit configured to derive a predictive quantization parameter of the second block using quantization parameters of a third block adjacent to the left of the second block and a fourth block adjacent to the top of the second block;

a differential quantization parameter generation unit configured to generate a differential quantization parameter of the second block from a difference between the quantization parameter of the second block and the predictive quantization parameter of the second block; and a coding unit configured to code the differential quantization parameter of the second block, wherein the predictive quantization parameter deriving unit sets the quantization parameter of the third block as a first quantization parameter when the third block is at a position not beyond a boundary of the first block, sets a quantization parameter of a fifth block coded immediately before the second block in a decoding order as the first quantization parameter when the third block is at a position beyond the boundary of the first block so as to set the first quantization parameter having a non-zero value regardless of the position for the boundary of the first block, sets the quantization parameter of the fourth block as a second quantization parameter when the fourth block is at a position not beyond the boundary of the first block, sets the quantization parameter of the fifth block as the second quantization parameter when the fourth block is at a position beyond the boundary of the first block so as to set the second quantization parameter having a non-zero value regardless of the position for the boundary of the first block, and derives the predictive quantization parameter of the second block using both the first and second quantization parameters regardless of the position of the third block or the fourth block, or both the third and fourth blocks, with respect to the boundary of the first block.

2. A moving picture coding method of coding moving pictures in units of a block by partitioning a first block, which is obtained by partitioning each picture of the moving pictures into predetermined sizes, into one or a plurality of second blocks, the method comprising:

a quantization parameter calculation step of calculating a quantization parameter of the second block;

a predictive quantization parameter deriving step of deriving a predictive quantization parameter of the second block using quantization parameters of a third block adjacent to the left of the second block and a fourth block adjacent to the top of the second block;

a differential quantization parameter generation step of generating a differential quantization parameter of the second block from a difference between the quantization parameter of the second block and the predictive quantization parameter of the second block; and a coding step of coding the differential quantization parameter of the second block, wherein in the predictive quantization parameter deriving step, the quantization parameter of the third block is set as a first quantization parameter when the third block is at a position not beyond a boundary of the first block, a quantization parameter of a fifth block coded immediately before the second block in a decoding order is set as the first quantization parameter when the third block is at a position beyond the boundary of the first block so as to set the first quantization parameter having a non-zero value regardless of the position for the boundary of the first block, the quantization parameter of the fourth block is set as a second quantization parameter when the fourth block is at a position not beyond the boundary of the first block, the quantization parameter of the fifth block is set as the second quantization parameter when the fourth block is at a position beyond the boundary of the first block so as to set the second quantization parameter having a non-zero value regardless of the position for the boundary of the first block, and the predictive quantization parameter of the second block is derived using both the first and second quantization parameters regardless of the position of the third block or the fourth block, or both the third and fourth blocks, with respect to the boundary of the first block.

3. A recording medium having a moving picture coding program for coding moving pictures in units of a block by partitioning a first block, which is obtained by partitioning each picture of the moving pictures into predetermined sizes, into one or a plurality of second blocks, the program causing a computer to execute:

a quantization parameter calculation step of calculating a quantization parameter of the second block;

a predictive quantization parameter deriving step of deriving a predictive quantization parameter of the second block using quantization parameters of a third block adjacent to the left of the second block and a fourth block adjacent to the top of the second block;

a differential quantization parameter generation step of generating a differential quantization parameter of the second block from a difference between the quantization parameter of the second block and the predictive quantization parameter of the second block; and a coding step of coding the differential quantization parameter of the second block, wherein in the predictive quantization parameter deriving step, the quantization parameter of the third block is set as a first quantization parameter when the third block is at a position not beyond a boundary of the first block, a quantization parameter of a fifth block coded immediately before the second block in a decoding order is set as the first quantization parameter when the third block is at a position beyond the boundary of the first block so as to set the first quantization parameter having a non-zero value regardless of the position for the boundary of the first block, the quantization parameter of the fourth block is set as a second quantization parameter when the fourth block is at a position not beyond the boundary of the first block, the quantization parameter of the fifth block is set as the second quantization parameter when the fourth block is at a position beyond the boundary of the first block so as to set the second quantization parameter having a non-zero value regardless of the position for the boundary of the first block, and the predictive quantization parameter of the second block is derived using both the first and second quantization parameters regardless of the position of the third block or the fourth block, or both the third and fourth blocks, with respect to the boundary of the first block.

* * * * *